US012299321B2

(12) United States Patent
Lee et al.

(10) Patent No.: US 12,299,321 B2
(45) Date of Patent: May 13, 2025

(54) STORAGE DEVICE AND OPERATION METHOD WHICH INCLUDES A PLURALITY OF DATA PROCESSING ENGINES AND DATA PROCESSING POLICIES

(71) Applicant: SAMSUNG ELECTRONICS CO., LTD., Suwon-si (KR)

(72) Inventors: Ranhee Lee, Uiwang-si (KR); Byungchul Ko, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 17/958,593

(22) Filed: Oct. 3, 2022

(65) Prior Publication Data
US 2023/0153026 A1 May 18, 2023

(30) Foreign Application Priority Data

Nov. 15, 2021 (KR) .................. 10-2021-0157057
Mar. 10, 2022 (KR) .................. 10-2022-0029967

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)
(58) Field of Classification Search
CPC .... G06F 3/0679; G06F 3/0604; G06F 3/0656; G06F 3/0673; G06F 3/061
USPC .......................................... 711/154, 173, 103
See application file for complete search history.

(56) References Cited

U.S. PATENT DOCUMENTS

| 9,396,104 | B1* | 7/2016 | Danilak .............. G06F 12/0246 |
| 9,817,591 | B2 | 11/2017 | Hwang et al. |
| 9,864,704 | B2 | 1/2018 | Lee et al. |
| 10,108,371 | B2 | 10/2018 | Minnagadda et al. |
| 10,168,934 | B2 | 1/2019 | Cho et al. |
| 10,339,010 | B1* | 7/2019 | Talley .................. G06F 16/275 |
| 10,658,300 | B2 | 5/2020 | Kim et al. |
| 10,712,976 | B2 | 7/2020 | Sela et al. |
| 10,782,915 | B2 | 9/2020 | Kim et al. |

(Continued)

FOREIGN PATENT DOCUMENTS

| JP | 6248921 B2 | 12/2017 |
| JP | 2021-043708 A | 3/2021 |

(Continued)

*Primary Examiner* — Gautam Sain
*Assistant Examiner* — Edward Waddy, Jr.
(74) *Attorney, Agent, or Firm* — Muir Patent Law, PLLC

(57) ABSTRACT

Disclosed is an operation method of a storage device, which includes a plurality of data processing engines includes setting a first region among a plurality of regions of a host memory buffer allocated from an external host with a first data processing policy and setting a second region among the plurality of regions with a second data processing policy, performing an encoding operation on data to be stored in the first region, based on a first data processing engine corresponding to the first data processing policy, performing an encoding operation on data to be stored in the second region, based on a second data processing engine corresponding to the second data processing policy, and changing the first data processing policy of the first region to a third data processing policy based on a changed characteristic of the first region.

20 Claims, 35 Drawing Sheets

(56) References Cited

U.S. PATENT DOCUMENTS

| | | | |
|---|---|---|---|
| 10,983,722 B2 | 4/2021 | Kim et al. | |
| 11,011,243 B2 | 5/2021 | Lee et al. | |
| 11,016,846 B2 | 5/2021 | Eom et al. | |
| 11,036,640 B2 | 6/2021 | Lee et al. | |
| 11,056,173 B2 | 7/2021 | O | |
| 11,138,108 B2 | 10/2021 | Parry et al. | |
| 11,281,549 B2 | 3/2022 | Kim et al. | |
| 2016/0196179 A1 | 7/2016 | Zhao et al. | |
| 2019/0114220 A1 | 4/2019 | Stenfort | |
| 2019/0146709 A1 | 5/2019 | Im et al. | |
| 2019/0303311 A1* | 10/2019 | Bilski | G06F 13/1657 |
| 2020/0184378 A1* | 6/2020 | Chamberlain | G06F 3/067 |
| 2020/0226072 A1 | 7/2020 | Kang et al. | |
| 2021/0073404 A1 | 3/2021 | Sakata et al. | |
| 2021/0240393 A1 | 8/2021 | Jo et al. | |

FOREIGN PATENT DOCUMENTS

| | | |
|---|---|---|
| KR | 10-2018-0054394 A | 5/2018 |
| KR | 10-2019-0057779 A | 5/2019 |
| KR | 10-2019-0075363 A | 7/2019 |
| KR | 10-2019-0087897 A | 7/2019 |
| KR | 10-2020-0038723 A | 4/2020 |
| KR | 10-2020-0046264 A | 5/2020 |
| KR | 10-2020-0054402 A | 5/2020 |
| KR | 10-2020-0056538 A | 5/2020 |
| KR | 10-2020-0088713 A | 7/2020 |
| KR | 10-2020-0121645 A | 10/2020 |
| KR | 10-2021-0024430 A | 3/2021 |
| KR | 10-2021-0099291 A | 8/2021 |

\* cited by examiner

STORAGE DEVICE AND OPERATION METHOD WHICH INCLUDES A PLURALITY OF DATA PROCESSING ENGINES AND DATA PROCESSING POLICIES

CROSS-REFERENCE TO RELATED APPLICATIONS

This application claims priority under 35 U.S.C. § 119 to Korean Patent Application Nos. 10-2021-0157057, filed on Nov. 15, 2021, and 10-2022-0029967, filed on Mar. 10, 2022, in the Korean Intellectual Property Office, the disclosures of which are incorporated by reference herein in their entireties.

BACKGROUND

1. Field

Embodiments of the present disclosure described herein relate to a semiconductor memory, and more particularly, relate to a storage device and an operation method thereof.

2. Description of the Related Art

A semiconductor memory device may be classified as a volatile memory device, in which stored data disappear when a power supply is turned off, such as a static random access memory (SRAM) or a dynamic random access memory (DRAM), or a nonvolatile memory device, in which stored data are retained even when a power supply is turned off, such as a flash memory device, a phase-change RAM (PRAM), a magnetic RAM (MRAM), a resistive RAM (RRAM), or a ferroelectric RAM (FRAM).

SUMMARY

According to an embodiment, an operation method of a storage device which includes a plurality of data processing engines includes setting a first region among a plurality of regions of a host memory buffer allocated from an external host with a first data processing policy and setting a second region among the plurality of regions with a second data processing policy, performing an encoding operation on data to be stored in the first region, based on a first data processing engine corresponding to the first data processing policy from among the plurality of data processing engines, performing an encoding operation on data to be stored in the second region, based on a second data processing engine corresponding to the second data processing policy from among the plurality of data processing engines, and changing the first data processing policy of the first region to a third data processing policy based on a changed characteristic of the first region.

According to an embodiment, an operation method of a storage device which includes a plurality of data processing engines includes receiving host memory buffer allocation information from an external host, selecting a first type data processing policy of a first region among a plurality of regions of the host memory buffer based on allocation information of the host memory buffer, selecting a second type data processing policy of the first region, selecting a third type data processing policy of the first region, sending, to the first region, encoded write data obtained by performing an encoding operation on write data based on a first error detection engine corresponding to the first type data processing policy from among a plurality of data processing engines, a first error correction engine corresponding to the second type data processing policy from among the plurality of data processing engines, and a first encryption engine corresponding to the third type data processing policy from among the plurality of data processing engines, performing a decoding operation on data read from the first region based on the first error detection engine, the first error correction engine, and the first encryption engine, monitoring whether a data processing policy change condition of the first region is satisfied, and changing the first to third type data processing policies of the first region when the data processing policy change condition is satisfied.

According to an embodiment, a storage device includes a memory device, and a controller that stores information about the memory device in an external host memory buffer and to manage the external host memory buffer. The controller includes a host memory buffer manager, a host memory buffer processing engine, and a status manager. The host memory buffer manager selects a data processing policy for at least one region among a plurality of regions of the external host memory buffer, manages the at least one region and a corresponding data processing policy in a host memory buffer mapping table, and changes the data processing policy for the at least one region in response to a change signal of the status manager. The host memory buffer processing engine includes a plurality of data processing engines. The host memory buffer processing engine selects at least one engine of the plurality of data processing engines based on the host memory buffer mapping table, performs an encoding operation on data based on the at least one engine to generate encoded data, sends the encoded data to the external host memory buffer, and performs a decoding operation on data read from the external host memory buffer based on the at least one engine. The status manager monitors whether a change condition of the data processing policy for the at least one region is satisfied and outputs the change signal to the host memory buffer manager when the change condition is satisfied.

BRIEF DESCRIPTION OF THE DRAWINGS

Features will become apparent to those of skill in the art by describing in detail example embodiments with reference to the attached drawings in which.

DETAILED DESCRIPTION

Figure 1:
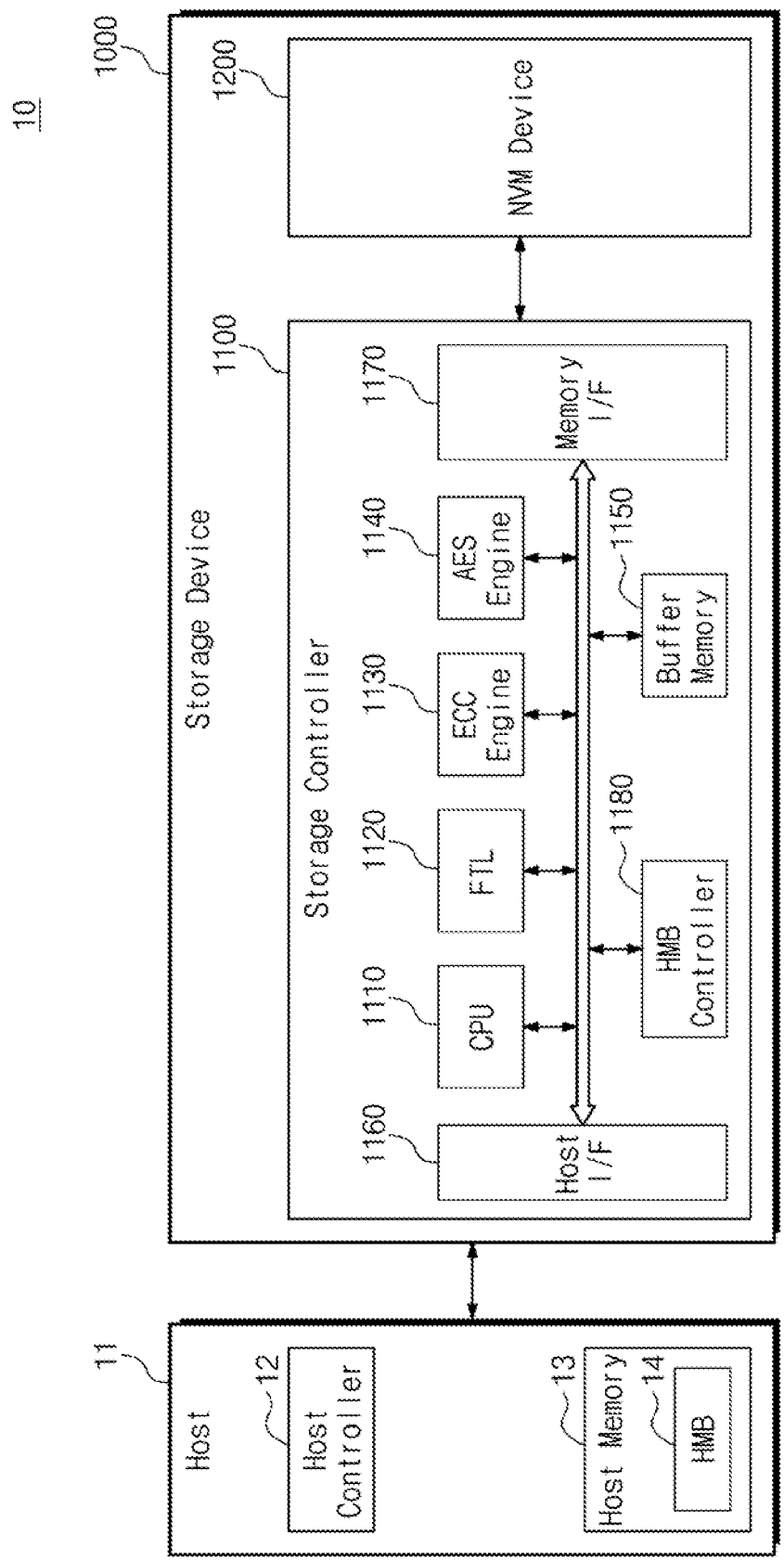
FIG. 1 is a block diagram illustrating a storage system according to an example embodiment.

FIG. 1 is a block diagram illustrating a storage system according to an example embodiment.

Referring to FIG. 1, a storage system 10 may include a host 11 and a storage device 1000. In an example embodiment, the storage system 10 may be one of information processing devices, which are configured to process a variety of information and to store the processed information, such as a personal computer (PC), a laptop, a server, a workstation, a smartphone, a tablet PC, a digital camera, and a black box.

The host 11 may control an overall operation of the storage system 10. For example, the host 11 may send, to the storage device 1000, a request RQ for storing data "DATA" in the storage device 1000 or reading data "DATA" stored in the storage device 1000. In an example embodiment, the host 11 may be a processor core, which is configured to control the storage system 10, such as a central processing unit (CPU) or an application processor, or may be a computing node connected over a network.

In an example embodiment, the host 11 may include a host controller 12 and a host memory 13. The host controller 12 may be a device configured to control an overall operation of the host 11 or to allow the host 11 to control the storage device 1000. The host memory 13 may be a buffer memory, a cache memory, or a working memory that is used in the host 11. An application program, a file system, a device driver, etc., may be loaded onto the host memory 13. Various software, which are driven in the host 11, or data may be loaded onto the host memory 13.

In an example embodiment, the host 11 may allocate a partial region of the host memory 13 for a buffer of the storage device 1000. Below, the partial region of the host memory 13 allocated for the buffer of the storage device 1000 is referred to as a "host memory buffer (HMB) 14".

In an example embodiment, the host memory buffer 14 may be allocated to allow the storage device 1000 to use the host memory 13 as a buffer. The host memory buffer 14 may be managed by the storage device 1000. Data of the storage device 1000 may be stored in the host memory buffer 14. For example, metadata or a mapping table of the storage device 1000 may be stored in the host memory buffer 14. The mapping table may include mapping information between a logical address from the host 11 and a physical address of the storage device 1000.

The storage device 1000 may operate under control of the host 11. The storage device 1000 may include a storage controller 1100 and a nonvolatile memory device 1200. Under control of the host 11, the storage controller 1100 may store data in the nonvolatile memory device 1200 or may read data stored in the nonvolatile memory device 1200. In an example embodiment, the storage controller 1100 may perform various management operations for efficiently using the nonvolatile memory device 1200.

The storage controller 1100 may include a central processing unit (CPU) 1110, a flash translation layer (FTL) 1120, an error correction code (ECC) engine 1130, an advanced encryption standard (AES) engine 1140, a buffer memory 1150, a host interface circuit 1160, a memory interface circuit 1170, and a host memory buffer controller (HMB controller) 1180.

The CPU 1110 may control an overall operation of the storage controller 1100. The FTL 1120 may perform various operations for efficiently using the nonvolatile memory device 1200. For example, the host 11 may manage a storage space of the storage device 1000 by using logical addresses. The FTL 1120 may be configured to manage address mapping between a logical address from the host 11 and a physical address of the storage device 1000. The FTL 1120 may perform a wear-leveling operation to prevent excessive degradation of a specific memory block among memory blocks of the nonvolatile memory device 1200. A lifetime of the nonvolatile memory device 1200 may be improved by the wear-leveling operation of the FTL 1120. The FTL 1120 may perform a garbage collection operation on the nonvolatile memory device 1200 to secure a free memory block.

In an example embodiment, the FTL 1120 may be implemented in the form of hardware or software. In the case where the FTL 1120 is implemented in the form of software, a program code or information associated with the FTL 1120 may be stored in the buffer memory 1150 and may be executed by the CPU 1110. In the case where the FTL 1120 is implemented in the form of hardware, a hardware accelerator configured to perform the operations of the FTL 1120 may be provided independently of the CPU 1110.

The ECC engine 1130 may perform error detection and correction on data read from the nonvolatile memory device 1200. For example, the ECC engine 1130 may generate an error correction code (or a parity bit) for data to be written in the nonvolatile memory device 1200. The generated error correction code (or parity bit) may be stored in the nonvolatile memory device 1200 together with the data to be written. Afterwards, when the written data are read from the nonvolatile memory device 1200, the ECC engine 1130 may detect and correct an error of the read data based on the read data and the corresponding error correction code (or the corresponding parity bit).

The AES engine 1140 may perform an encryption operation on data received from the host 11 or may perform a decryption operation on data received from the nonvolatile memory device 1200. In an example embodiment, the encryption operation and the decryption operation may be performed based on a symmetric-key algorithm.

The buffer memory 1150 may be a write buffer or a read buffer configured to temporarily store data input to the storage controller 1100. In another implementation, the buffer memory 1150 may be configured to store a variety of information used for the storage controller 1100 to operate. For example, the buffer memory 1150 may store a mapping table that is managed by the FTL 1120. In another implementation, the buffer memory 1150 may store software, firmware, or information that is associated with the FTL 1120. In detail, the buffer memory 1150 may store an HMB allocation table HMBAT, an HMB status table HMBST, an HMB mapping table HMBMT, and a processing meta table PMT. The buffer memory 1150 may store metadata for memory blocks.

In an example embodiment, the buffer memory 1150 may be an SRAM, but, e.g., the buffer memory 1150 may be implemented with various kinds of memory devices such as a DRAM, an MRAM, and a PRAM. For brevity of drawing and for convenience of description, an example in which the buffer memory 1150 is included in the storage controller 1100 is illustrated in FIG. 1 but, e.g., the buffer memory 1150 may be placed outside the storage controller 1100, and the storage controller 1100 may communicate with the buffer memory 1150 over a separate communication channel or interface.

The host interface circuit 1160 may communicate with the host 11 in compliance with a given interface protocol. In an example embodiment, the given interface protocol may include at least one of protocols for various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, a USB (Universal Serial Bus) interface, an SD (Secure Digital) card interface, an MMC (Multi-Media Card) interface, an eMMC (embedded Multi-Media Card) interface, a UFS (Universal Flash Storage) interface, an eUFS (embedded Universal Flash Storage) interface, or a CF (Compact Flash) card interface. The host interface circuit 1160 may receive a signal, which is based on the given interface protocol, from the host 11, and may operate based on the received signal. In another implementation, the host interface circuit 1160 may send a signal, which is based on the given interface protocol, to the host 11.

The memory interface circuit 1170 may communicate with the nonvolatile memory device 1200 in compliance with a given communication protocol. In an example embodiment, the given interface protocol may include at least one of protocols for various interfaces such as a toggle interface or an open NAND flash interface (ONFI). In an example embodiment, the memory interface circuit 1170 may communicate with the nonvolatile memory device 1200 based on the toggle interface. In this case, the memory interface circuit 1170 may communicate with the nonvolatile memory device 1200 over a plurality of channels. In an example embodiment, each of the plurality of channels may include a plurality of signal lines configured to transfer various control signals (e.g., /CE, CLE, ALE, /WE, /RE, and R/B), data signals DQ, and a data strobe signal DQS.

The HMB controller 1180 may manage the host memory buffer (HMB) 14. The HMB controller 1180 may store and manage various data, using the HMB 14 as a buffer. The HMB controller 1180 may store encoded data for the purpose of the reliability or security of data. For example, the HMB controller 1180 may perform an encoding operation on data based on a data processing policy (or algorithm). The HMB controller 1180 may store the encoded data in the HMB 14. Read data may be fetched from the HMB 14 by control of the HMB controller 1180. Thus, the HMB controller 1180 may receive the read data from the HMB 14. In the case where the read data are encoded, the HMB controller 1180 may perform a decoding operation on the read data.

In an example embodiment, the HMB controller 1180 may split and manage the HMB 14 into a plurality of regions, based on HMB allocation information provided from the host 11. The HMB controller 1180 may select a data processing policy for each of the plurality of regions. For example, the HMB controller 1180 may set different data processing policies to the plurality of regions, respectively. The HMB controller 1180 may select a data processing policy for each of the plurality of regions, based on characteristics of the plurality of regions and a variety of information.

In an example embodiment, the HMB controller 1180 may set a data processing policy for each region of the HMB 14 based on a reliability level and a security level for each region of the HMB 14. For example, the HMB controller 1180 may set a data processing policy based on a type of data to be stored in a specific region. The HMB controller 1180 may set a data processing policy based on data reliability or security that the specific region requires. The HMB controller 1180 may set a data processing policy based on a characteristic of a memory device corresponding to the specific region.

For example, the data processing policy may include an error detection policy, an error correction policy, and an encryption policy. The error detection policy may refer to a technology for checking whether data are transferred without an error. The error correction policy may refer to a technology for correcting an error of data when an error occurs in the data. The encryption policy may refer to a technology for encrypting data for the purpose of providing information protection or security to the user.

In an example embodiment, when a change condition of each of the plurality of regions is satisfied, the HMB controller 1180 may change the corresponding data processing policy. For example, the HMB controller 1180 may change a data processing policy of a specific region in operation (e.g., during a runtime). In the case where a characteristic of a memory device corresponding to a specific region changes, a type of data to be stored in the specific region changes, a required reliability level of the specific region changes, a required security level of the specific region changes, the HMB controller 1180 may determine that a change condition of a data processing policy is satisfied.

In a general storage device, a same data processing policy may be set for or applied to all regions of a host memory buffer. Thus, unlike the storage device 1000 according to the present example embodiment, the general storage device may not select a respective or different data processing policy for each region of the host memory buffer, but rather may uniformly use a same data processing policy for each region of the host memory buffer. Thus, e.g., even if only a portion of data to be stored in the host memory buffer requires a data processing policy with a high error correction capability, the general storage device may apply the data processing policy with the high error correction capability to all the data to be stored in the host memory buffer. In this case, due to the use of the data processing policy with the high error correction capability, an actual use space of the host memory buffer may decrease due to parity data. Also, because the data processing policy with the high error correction capability requires a complicated operation, a latency may increase.

However, the storage device 1000 according to the present example embodiment may select an appropriate data processing policy for each region of the HMB 14. For example, the storage device 1000 may allocate a data processing policy with a high error correction capability to a region, e.g., a first region, requiring a high data reliability level, and may allocate a data processing policy with a low error correction capability to a region, e.g., a second region, that allows for a low data reliability level. As such, the amount of parity data to be stored in the HMB 14 may decrease, and thus, an actual use space of the HMB 14 may increase. Also, as a data processing policy with a high error correction capability may be used only for partial data, and a data processing policy with a low error correction capability may be used for the remaining data, the performance of the storage device 1000 may be improved.

As described above, the storage device 1000 may select an appropriate data processing policy for each region of the HMB 14. When a change condition of an arbitrary region of the HMB 14 is satisfied, the storage device 1000 may change a data processing policy corresponding to the arbitrary region. Accordingly, the storage device 1000 may efficiently use the space of the HMB 14, and may prevent a delay due to a data processing operation. Thus, the storage device 1000 with improved performance and improved reliability may be provided.

An operation method of the host 11 and the storage device 1000 according to an example embodiment will now be described in detail with reference to the following drawings.

Figure 2:
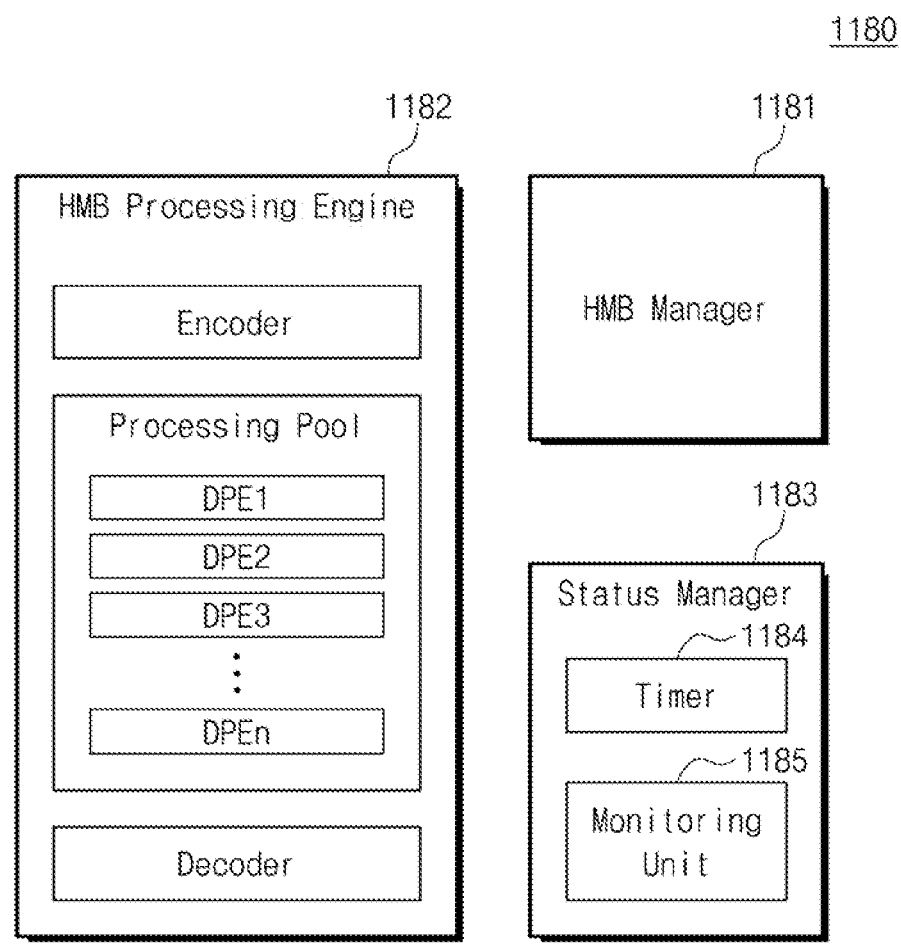
FIG. 2 is a block diagram illustrating a host memory buffer (HMB) controller of FIG. 1 in detail.

FIG. 2 is a block diagram illustrating an HMB controller of FIG. 1 in detail.

Referring to FIGS. 1 and 2, the storage device 1000 may use a resource of the host 11. For example, the storage device 1000 may manage various data by using the HMB 14 as a buffer. Accordingly, sufficient resources may be provided for the storage device 1000.

The HMB controller 1180 may include an HMB manager 1181, an HMB processing engine 1182, and a status manager 1183. The HMB manager 1181 may control an overall operation of the HMB controller 1180. For example, the HMB manager 1181 may receive HMB allocation information from the host 11, and may split the HMB 14 into a plurality of regions based on the HMB allocation information. The HMB manager 1181 may set a data processing policy for each of the plurality of regions. When a change condition of a specific region is satisfied, the HMB manager 1181 may change a data processing policy of the specific region.

The HMB manager 1181 may manage information about the HMB 14. For example, the HMB manager 1181 may generate and manage the HMB allocation table HMBAT, the HMB mapping table HMBMT, and the HMB status table HMBST.

The HMB processing engine 1182 may include a processing pool, an encoder, and a decoder.

The processing pool may include a plurality of data processing engines DPE1 to DPEn. The plurality of data processing engines DPE1 to DPEn may perform respectively different data processing policies. For example, the first data processing engine DPE1 may be associated with a first data processing policy DPP1, the second data processing engine DPE2 may be associated with a second data processing policy DPP2, and the third data processing engine DPE3 may be associated with a third data processing policy DPP3.

The data processing policy may include at least one of cyclic redundancy check (CRC) (e.g., CRC-16, CRC-32, CRC-64, CRC-128, or CRC-256), Hamming code, low density parity check (LDPC), Bose-Chaudhuri-Hocquenghem (BCH) code, Reed-Solomon (RS) code, Viterbi code, Turbo code, advanced encryption standard (AES) (e.g., AES-128, AES-192, or AES-256), secure hash algorithm (SHA), Rivest Shamir Adleman (RSA), peripheral component interconnect express integrity and data encryption (PCIe IDE), or PCIe data object exchange (DOE).

The encoder may perform an encoding operation on data, and may generate encoded data. The encoder may perform the encoding operation on data by using one data processing engine selected by the HMB manager 1181 from among the plurality of data processing engines DPE1 to DPEn. The data encoded by the encoder may be transferred to the HMB 14.

In an example, in a case where the first data processing engine DPE1 is associated with the error correction policy, the encoder may add parity to original data by performing error correction encoding using the first data processing engine DPE1. The parity may include one or more bits and may provide an error correction function.

In another example, in a case where the second data processing engine DPE2 is associated with the encryption policy, the encoder may encrypt received data by performing encryption encoding through the second data processing engine DPE2.

The decoder may perform a decoding operation on data, and may generate decoded data. The decoder may perform the decoding operation on data by using one data processing engine selected by the HMB manager 1181 from among the plurality of data processing engines DPE1 to DPEn.

As an example, in the case where the first data processing engine DPE1 is associated with the error correction policy, the decoder may perform error correction decoding by using the first data processing engine DPE1 such that an error of the data is corrected based on the parity and may remove the parity to recover the original data.

As another example, in the case where the second data processing engine DPE2 is associated with the encryption policy, the decoder may decrypt received data by performing encryption decoding through the second data processing engine DPE2.

The status manager 1183 may monitor whether a change condition of a data processing policy is satisfied. In the case where the change condition of the data processing policy is satisfied, the status manager 1183 may output, to the HMB manager 1181, a change signal indicating that the change condition is satisfied.

The status manager 1183 may include a timer 1184 and a monitoring unit 1185.

The timer 1184 may be configured to count a given time. For example, the timer 1184 may be configured to count a system clock or an operating clock to count a time elapsing from a specific time point or a given time interval. In an example embodiment, the timer 1184 may be configured to count elapsed times (e.g., elapsed time information included in the HMB status table HMBST) associated with a plurality of regions R1 to R4. In a case where a timer associated with a specific region (e.g., the first region R1) expires (in other words, a threshold time passes from a specific point in time (e.g., from a point in time when data are first written in the first region R1)), the status manager 1183 may determine that a change condition of a data processing policy corresponding to the specific region is satisfied.

The monitoring unit 1185 may collect and manage information about various states associated with a plurality of regions. For example, the monitoring unit 1185 may collect and manage environment information or attribute information of the HMB 14, e.g., the monitoring unit 1185 may manage an error rate, an elapsed time, a status of a memory device, a type of a memory device, a reliability protection level, and a ratio of invalid regions of a memory device.

In an example embodiment, the monitoring unit 1185 may determine whether the monitored states satisfy a change condition, with reference to the HMB status table HMBST. For example, in the case where a numerical value of the monitored state reaches a reference value, the change condition may be satisfied. The reference value may be selected in consideration of a level of a state in which a change condition operation is required.

Figure 3:
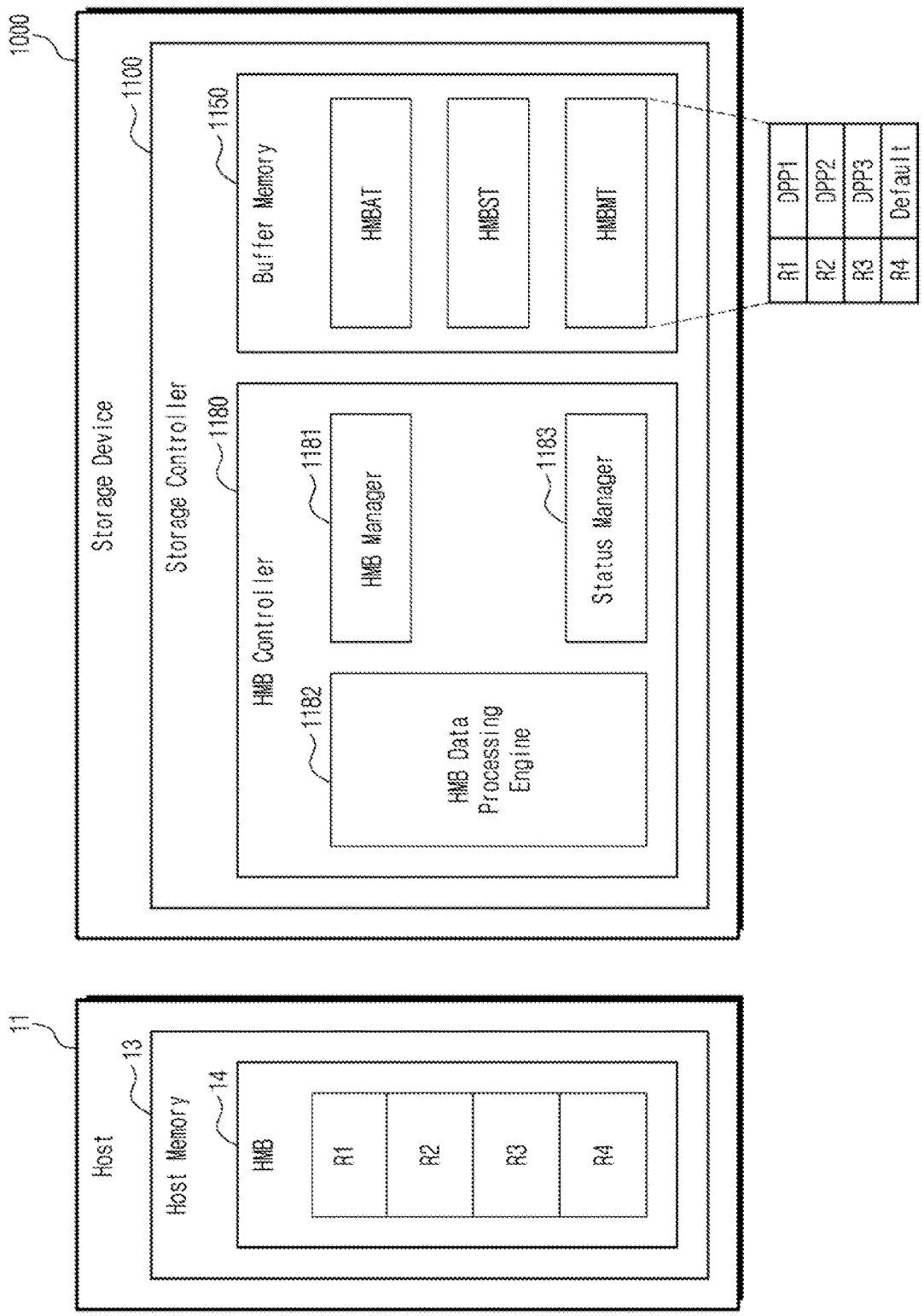
FIG. 3 is a diagram illustrating an example of a plurality of regions of an HMB and a table managed by an HMB manager.

FIG. 3 is a diagram illustrating an example of a plurality of regions of an HMB and a table managed by an HMB manager.

Referring to FIGS. 1 and 3, the HMB manager 1181 may split and manage the HMB 14 into the plurality of regions R1 to R4, based on HMB allocation information provided from the host 11. It is assumed that the HMB 14 includes the first to fourth regions R1 to R4 but, the number of regions included in the HMB 14 may be increased or decreased.

The HMB manager 1181 may manage information about the HMB 14. For example, the HMB manager 1181 may manage the HMB allocation table HMBAT, the HMB mapping table HMBMT, and the HMB status table HMBST. The HMB allocation table HMBAT, the HMB mapping table HMBMT, and the HMB status table HMBST may be stored in the buffer memory 1150 or the nonvolatile memory device 1200.

In an example embodiment, the HMB manager 1181 may generate the HMB allocation table HMBAT based on HMB allocation information, and may store the HMB allocation table HMBAT in the buffer memory 1150. The HMB manager 1181 may store allocation information about each of the plurality of regions R1 to R4 in the HMB allocation table HMBAT, and may update the information of the HMB allocation table HMBAT.

The allocation information for each region of the HMB 14 may be managed and updated for each of split regions. For example, the allocation information may include an identifier of each region, a type (or kind) of data to be stored or buffered in each region, a release priority of each region, a state of each region, a size of each region, a host memory address range of each region, a required reliability level of each region, a required security level of each region, and the like. However, e.g., the allocation information that is stored in the HMB allocation table HMBAT may include different parameters with regard to the plurality of regions R1 to R4 of the HMB 14.

The identifier may refer to an attribute to be referenced to uniquely identify each of the plurality of regions R1 to R4. However, in the case where another criterion is used to uniquely identify the plurality of regions R1 to R4, the HMB allocation table HMBAT may not include an identifier.

In an example embodiment, each of the plurality of regions R1 to R4 may be configured to store data of one type. For example, the data may include mapping data, user data, metadata (e.g., ECC data or status data), power gating data (e.g., data to be retained in power interrupt), etc. The plurality of regions R1 to R4 may store data of different types. However, e.g., another kind of data that are used in a storage device may be included as a type of data. Also, one region may store two or more types of data, two or more regions may store data of one type, or a region may be implemented regardless of a data type.

The HMB manager 1181 may generate the HMB status table HMBST, and may store and manage the HMB status table HMBST in the buffer memory 1150. The HMB manager 1181 may store degradation information or error information (e.g., status information) about each of the plurality of regions R1 to R4 in the HMB status table HMBST, and may update the information of the HMB status table HMBST.

The status information for each region of the HMB 14 may be managed and updated for each of split regions. For example, the status information for each region may include the following associated with the corresponding region: a write count, a read count, an error rate (e.g., a ratio of the number of error bits to the total number of bits of read data) detected from data stored in the corresponding region, an elapsed time, an error occurrence ratio (e.g., a ratio of an error detection count and a total HMB read request count), a read retry count, a ratio of invalid memory spaces, and an available capacity. However, e.g., the status information that is stored in the HMB status table HMBST may include any other parameters associated with the plurality of regions R1 to R4 of the HMB 14.

The HMB manager 1181 may generate the HMB mapping table HMBMT, and may store and manage the HMB mapping table HMBMT in the buffer memory 1150. The HMB manager 1181 may store mapping information about each of the regions R1 to R4 and a corresponding data processing policy, and may update the information of the HMB mapping table HMBMT.

The HMB manager 1181 may select a data processing policy for each of the regions R1 to R4, and may manage mapping information about the selected data processing policy and the corresponding region by using the HMB mapping table HMBMT. For example, the first region R1 may correspond to the first data processing policy DPP1, the second region R2 may correspond to the second data processing policy DPP2, and the third region R3 may correspond to the third data processing policy DPP3. The HMB manager 1181 may not allocate any data processing policy for the region R4. In this case, a default value associated with the fourth region R4 may be stored in the HMB mapping table HMBMT. The HMB mapping table HMBMT is illustrated in FIG. 3 merely as an example.

Figure 4:
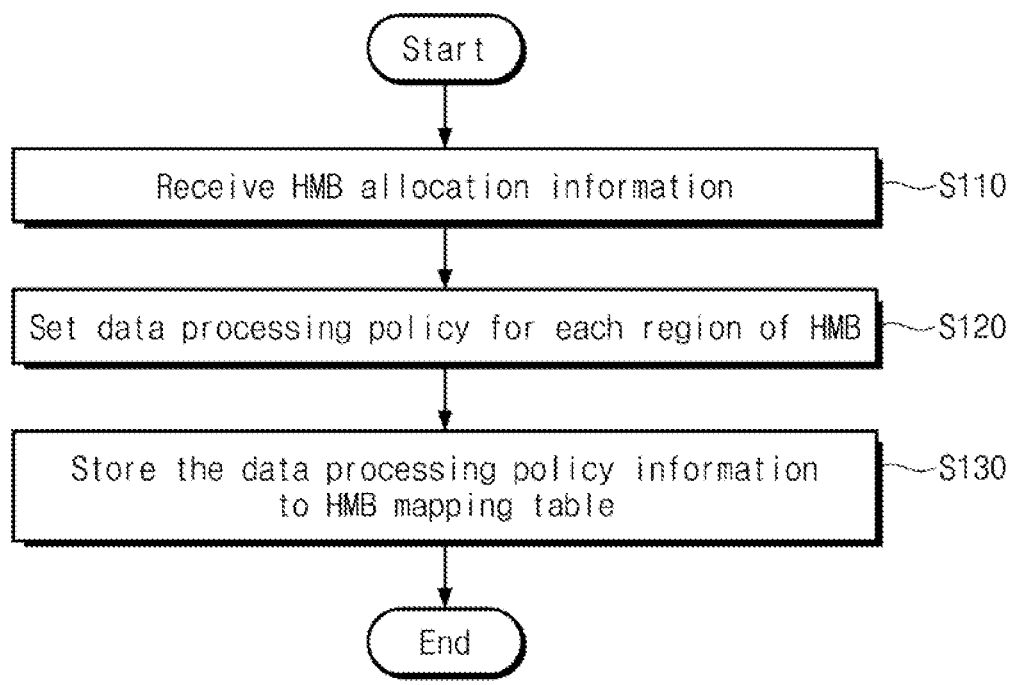
FIG. 4 is a flowchart illustrating an example of an operation of a storage device.

FIG. 4 is a flowchart illustrating an example of an operation of a storage device.

Referring to FIGS. 1, 3, and 4, in operation S110, the storage device 1000 may receive HMB allocation information from the host 11. For example, the storage device 1000 may receive HMB allocation information through a set feature command. The HMB allocation information may include HMB size information, HMB enable information, or an HMB descriptor list. The HMB descriptor list may include a plurality of HMB descriptor entries. An HMB descriptor entry may indicate a memory address space allocated for the HMB. The HMB descriptor entry may include buffer address information and buffer size information. The buffer address information may refer to address information of a host memory buffer that the HMB descriptor entry indicates. The buffer size information may indicate the number of consecutive memory pages in a memory space that the HMB descriptor entry indicates.

In an example embodiment, the storage device 1000 may recognize the HMB 14 based on the HMB allocation information. The storage device 1000 may split the HMB 14 (or a storage space of the HMB 14) into a plurality of regions, and the plurality of regions of the HMB 14 may be managed by the storage device 1000. For example, referring to FIG. 3, the storage device 1000 may split the HMB 14 into the first to fourth regions R1 to R4, based on the HMB allocation information.

In an example embodiment, a plurality of regions that are managed by the storage device 1000 may be different from a plurality of memory spaces indicated by HMB descriptor entries managed by the host 11. The storage device 1000 may recognize memory spaces indicated by the HMB descriptor entries as the HMB 14. The storage device 1000 may split and use the HMB 14 (or the storage space of the HMB 14) into a plurality of regions if necessary.

In operation S120, the storage device 1000 may set a data processing policy to each region of the HMB 14. For example, the storage device 1000 may set one of a plurality of data processing policies with respect to the plurality of regions R1 to R4. The storage device 1000 may select the first data processing policy DPP1 of the plurality of data processing policies with regard to the first region R1. The storage device 1000 may select the second data processing policy DPP2 with regard to the second region R2, and may select the third data processing policy DPP3 with regard to the third region R3. However, the storage device 1000 may not select any data processing policy with regard to the fourth region R4.

In operation S130, the storage device 1000 may store information about the data processing policy in the HMB mapping table HMBMT. For example, referring to FIG. 3, the storage device 1000 may store the first data processing policy DPP1 in the HMB mapping table HMBMT with regard to the first region R1, the storage device 1000 may store the second data processing policy DPP2 in the HMB mapping table HMBMT with regard to the second region R2, the storage device 1000 may store the third data processing policy DPP3 in the HMB mapping table HMBMT with regard to the third region R3, and the storage device 1000 may store a default in the HMB mapping table HMBMT with regard to the fourth region R4. Thus, the storage device 1000 may be configured not to apply any data processing policy to the fourth region R4, e.g., the storage device 1000 may not perform the encoding or decoding operation on data corresponding to the fourth region R4.

Figure 5:
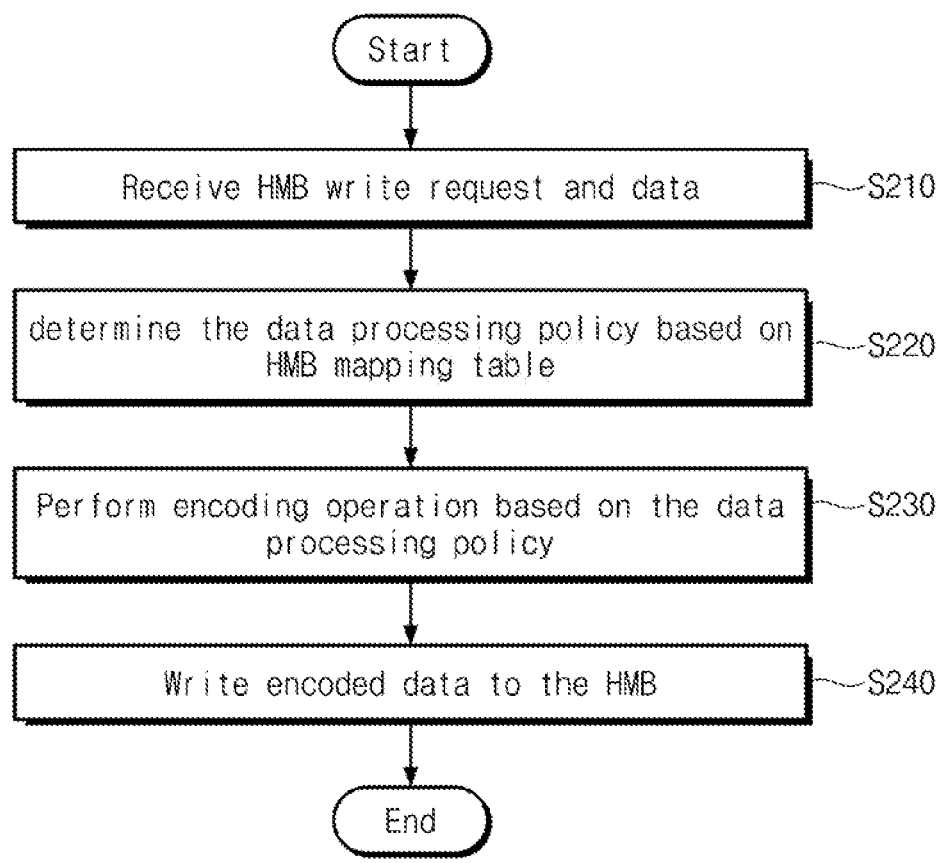
FIG. 5 is a flowchart illustrating an example of an operation of an HMB controller of FIG. 1.

FIG. 5 is a flowchart illustrating an example of an operation of an HMB controller of FIG. 1.

Referring to FIGS. 1 and 5, in operation S210, the HMB controller 1180 may receive an HMB write request and data. For example, the HMB controller 1180 may detect or receive the HMB write request for the HMB 14, which is provided from the CPU 1110 or the FTL 1120.

In operation S220, the HMB controller 1180 may check a data processing policy based on the HMB mapping table HMBMT. For example, based on the HMB write request, the HMB controller 1180 may determine a region of the HMB 14, in which data are to be stored. In detail, based on an address of the HMB 14 included in the HMB write request, the HMB controller 1180 may determine a region, in which data are to be stored, from among the plurality of regions R1 to R4 of the HMB 14. In another implementation, based on a data kind (or type) included in the HMB write request, the HMB controller 1180 may determine a region, in which data are to be stored, from among the plurality of regions R1 to R4 of the HMB 14. The HMB controller 1180 may check a data processing policy corresponding to the region of the HMB 14 from the HMB mapping table HMBMT, based on the region of the HMB 14 in which data are to be stored.

For example, it is assumed that the address included in the HMB write request indicates the first region R1 of the HMB 14. The HMB controller 1180 may determine that the first region R1 is the region in which data are to be stored, based on the address included in the HMB write request. The HMB controller 1180 may determine that a data processing policy corresponding to the first region R1 is the first data processing policy DPP1, based on the HMB mapping table HMBMT.

In operation S230, the HMB controller 1180 may perform the encoding operation based on the data processing policy thus determined. For example, the HMB controller 1180 may perform the encoding operation on the data based on the first data processing policy DPP1.

In operation S240, the HMB controller 1180 may write the encoded data in the HMB 14. For example, the HMB controller 1180 may send the write command and the encoded data to the HMB 14.

However, in the case where the region of the HMB 14 corresponding to the HMB write request is the fourth region R4 (i.e., in the case where the determined data processing policy indicates a default), the HMB controller 1180 may not perform the encoding operation on the data corresponding to the HMB write request. As such, the HMB controller 1180 may write the data, which are not encoded, in the HMB 14.

Figure 6:
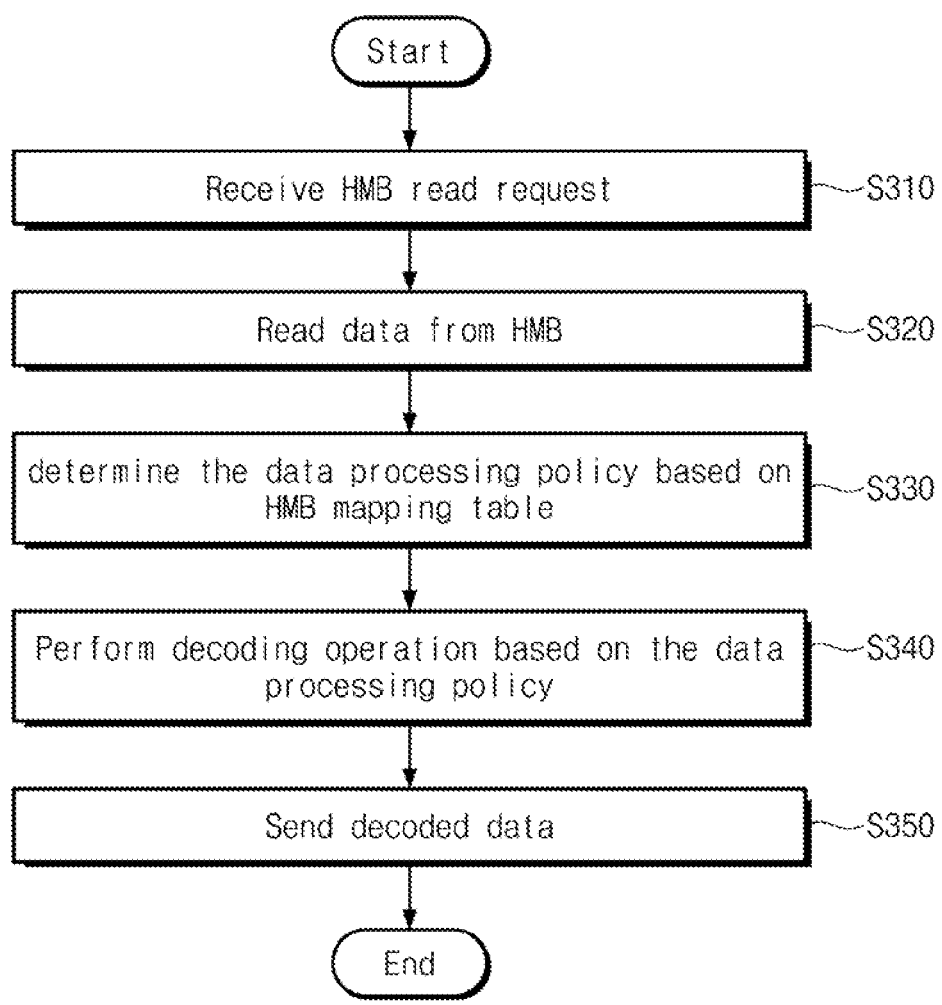
FIG. 6 is a flowchart illustrating an example of an operation of an HMB controller of FIG. 1.

FIG. 6 is a flowchart illustrating an example of an operation of an HMB controller of FIG. 1.

Referring to FIGS. 1 and 6, in operation S310, the HMB controller 1180 may receive an HMB read request. For example, the HMB controller 1180 may detect or receive the HMB read request for the HMB 14, which is provided from the CPU 1110 or the FTL 1120.

In operation S320, the HMB controller 1180 may read data from the HMB 14. For example, the HMB controller 1180 may send the read command to the HMB 14 based on the HMB read request. The HMB controller 1180 may receive data corresponding to the read command from the HMB 14. For example, the HMB controller 1180 may generate the read command based on an address of the HMB 14 included in the HMB read request. In another implementation, the HMB controller 1180 may generate the read command based on a data kind (or type) (or data kind (or type) information) included in the HMB read request.

In operation S330, the HMB controller 1180 may check a data processing policy based on the HMB mapping table HMBMT. For example, based on the HMB read request, the HMB controller 1180 may determine a region of the HMB 14, in which data are stored. In detail, based on the address of the HMB 14 included in the HMB read request, the HMB controller 1180 may determine a region, in which data are stored, from among the plurality of regions R1 to R4 of the HMB 14. In another implementation, based on the data kind (or type) (or data kind (or type) information) included in the HMB read request, the HMB controller 1180 may determine a region, in which data are stored, from among the plurality of regions R1 to R4 of the HMB 14. The HMB controller 1180 may check a data processing policy corresponding to the region of the HMB 14 from the HMB mapping table HMBMT, based on the region in which the data are stored.

For example, it is assumed that the address included in the HMB read request indicates the first region R1 of the HMB 14. The HMB controller 1180 may determine that the first region R1 is the region in which data are stored, based on the address included in the HMB read request. The HMB manager 1181 may determine that a data processing policy corresponding to the first region R1 is the first data processing policy DPP1, based on the HMB mapping table HMBMT.

In operation S340, the HMB controller 1180 may perform the decoding operation based on the data processing policy thus determined. For example, the HMB controller 1180 may perform the decoding operation on the data based on the first data processing policy DPP1.

In operation S350, the HMB controller 1180 may send the decoded data. For example, the HMB controller 1180 may send the decoded data to the CPU 1110 or the FTL 1120.

However, in the case where the region of the HMB 14 corresponding to the HMB read request is the fourth region R4 (i.e., in the case where the determined data processing policy indicates a default), the HMB controller 1180 may not perform the decoding operation on the data corresponding to the HMB read request. As such, the HMB controller 1180 may send the data, which are not decoded, to the CPU 1110 or the FTL 1120.

Figure 7:
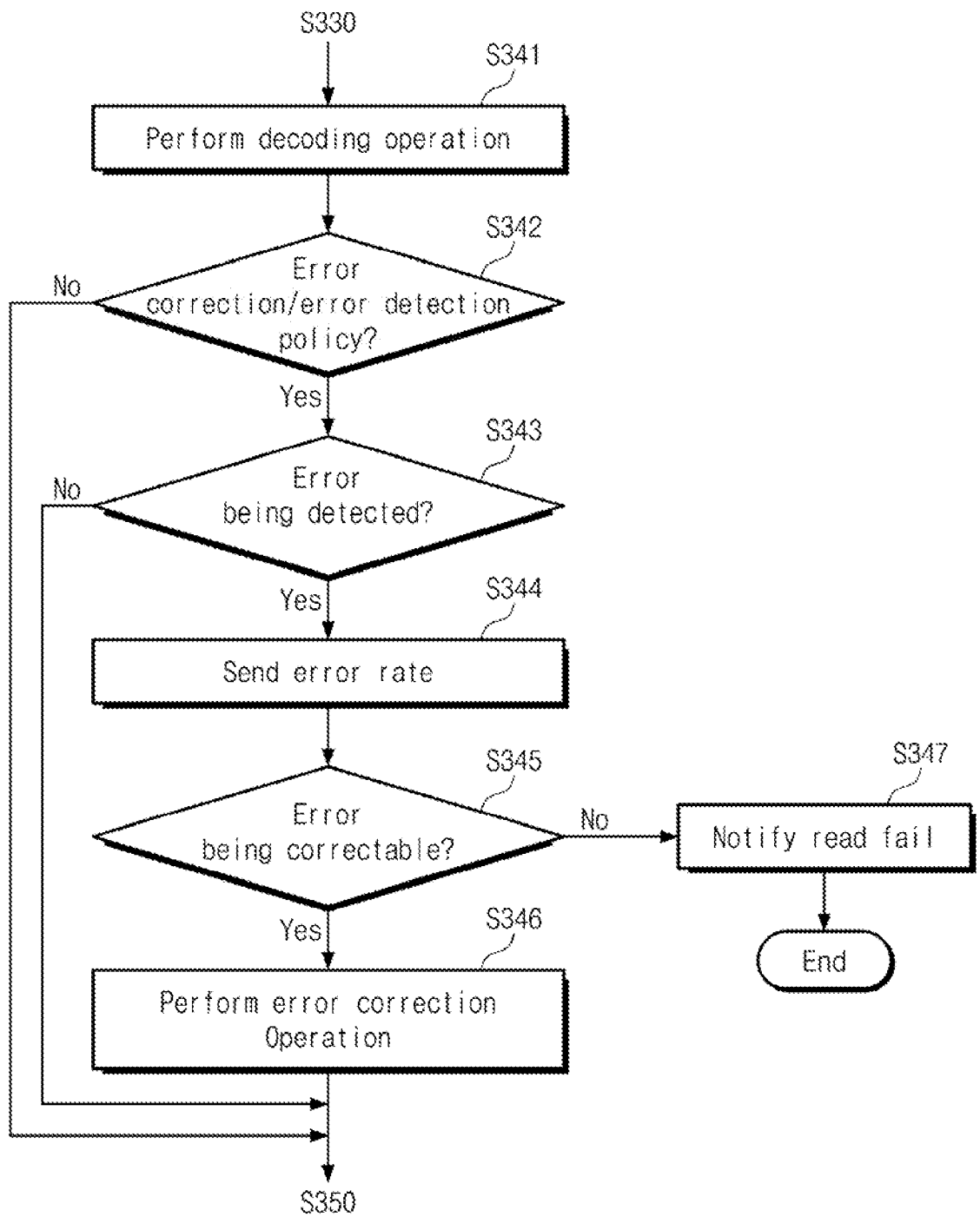
FIG. 7 is a flowchart illustrating operation S340 of FIG. 6 in detail.

FIG. 7 is a flowchart illustrating operation S340 of FIG. 6 in detail.

Referring to FIGS. 1, 6, and 7, in operation S341, the HMB controller 1180 may perform the decoding operation based on the determined data processing policy. For example, the HMB controller 1180 may recover original data by performing the decoding operation on the received data.

In operation S342, the HMB controller 1180 may determine whether the determined data processing policy is a policy associated with error correction/error detection. For example, the HMB controller 1180 may perform whether the first data processing policy DPP1 is one of policies associated with error correction/error detection. When the determined data processing policy is a policy associated with error correction/error detection, the HMB controller 1180 performs operation S343; when the determined data processing policy is not a policy associated with error correction/error detection, the HMB controller 1180 performs operation S350.

In operation S343, the HMB controller 1180 may determine whether an error is present in the read data from the HMB 14. When it is determined that an error is absent from the read data, the HMB controller 1180 performs operation S350; when it is determined that an error is present in the read data, the HMB controller 1180 performs operation S344.

In operation S344, the HMB controller 1180 may send an error rate of the read data to the status manager 1183. For example, the HMB processing engine 1182 may send the error rate of the read data to the status manager 1183 such that the status manager 1183 monitors the error rate of the read data.

In operation S345, the HMB controller 1180 may determine whether an error of the read data is correctable. For example, the HMB controller 1180 may determine whether the determined data processing policy is an error correction policy. The HMB controller 1180 may determine whether an error rate of the read data exceeds an error rate threshold value. The case where the error rate of data exceeds the error rate threshold value may mean that error correction is impossible. The case where the error rate of data is smaller than or equal to the error rate threshold value may mean that error correction is possible. In other words, the HMB controller 1180 may determine whether the number of detected errors corresponds to a maximum error, that is, the maximum number of errors correctable by using the determined data processing policy. When it is determined that the number of detected errors corresponds to the maximum error, the error correction may be determined as not possible. When it is determined that the number of detected errors does not correspond to the maximum error, the error correction may be determined as possible. When the error correction is determined as possible, the HMB controller 1180 performs operation S346; when the error correction is determined as not possible, the HMB controller 1180 performs operation S347.

In operation S346, the HMB controller 1180 may perform the error correction operation. For example, the HMB controller 1180 may correct the error based on the determined data processing policy and may generate corrected data. Afterwards, the HMB controller 1180 performs operation S350.

In operation S347, the HMB controller 1180 may notify a read fail. For example, if the error correction is determined as not possible, the HMB controller 1180 may send a fail response to the HMB read request to the CPU 1110 or the FTL 1120. The HMB controller 1180 may send a response including data corruption information or uncorrectable error information. Afterwards, the HMB controller 1180 does not perform operation S350.

Figure 8:
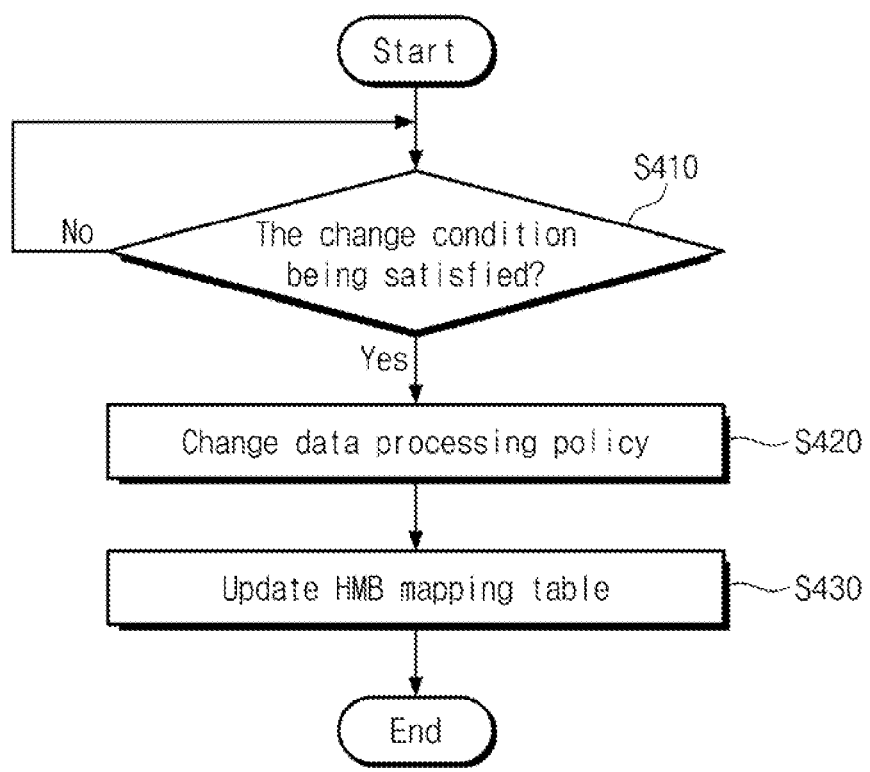
FIG. 8 is a flowchart illustrating an example of an operation of an HMB controller of FIG. 1.

FIG. 8 is a flowchart illustrating an example of an operation of an HMB controller of FIG. 1.

Referring to FIGS. 1 and 8, in operation S410, the HMB controller 1180 may determine whether a change condition for a data processing policy is satisfied. The change condition may be associated with whether a change operation for a data processing policy associated with the plurality of regions R1 to R4 is required. When it is determined that the change condition is satisfied, the HMB controller 1180 performs operation S420; when it is determined that the change condition is not satisfied, the HMB controller 1180 again performs operation S410. Thus, when the change condition is not satisfied, the HMB controller 1180 may monitor whether the change condition is satisfied.

In an example embodiment, the HMB controller 1180 may determine whether a change of a data processing policy associated with each of the plurality of regions R1 to R4 is required. Thus, the HMB controller 1180 may monitor states associated with the plurality of regions R1 to R4. The HMB controller 1180 may manage whether the monitored state satisfies the change condition. For example, the state monitored by the HMB controller 1180 may be associated with various attributes such as a lifetime of each of the plurality of regions R1 to R4, the reliability of data stored in each of the plurality of regions R1 to R4, and a state of a memory device corresponding to the plurality of regions R1 to R4.

The case where the change condition is satisfied may mean that a change of a data processing policy of a region with the satisfied change condition is required to improve an operation environment and a characteristic of the storage device 1000 or the HMB 14. The storage device 1000 may intend to change a data processing policy of a specific region for the purpose of improving an operation environment and a characteristic of the storage device 1000 or the HMB 14.

In an example embodiment, when a numerical value of the monitored state reaches a reference value, the HMB controller 1180 may determine that the monitored state satisfies the change condition. For example, according to a first condition, the HMB controller 1180 may manage a time passing from a point in time when data are first written in each of the plurality of regions R1 to R4, i.e., an elapsed time of each of the plurality of regions R1 to R4. In detail, the HMB controller 1180 may determine whether an elapsed time of each of the plurality of regions R1 to R4 exceeds a threshold time.

According to a second condition, the HMB controller 1180 may manage an error rate of each of the plurality of regions R1 to R4. In detail, the HMB controller 1180 may monitor an error rate of each of the plurality of regions R1 to R4, and may determine whether the monitored error rate exceeds a reference error rate.

According to a third condition, the HMB controller 1180 may manage allocation information of the HMB 14, which is generated by the host 11. The HMB controller 1180 may determine whether a memory space of the host memory 13 associated with the plurality of regions R1 to R4 is changed, based on the HMB mapping table HMBMT. Thus, the HMB controller 1180 may determine whether allocation information about the plurality of regions R1 to R4 is changed.

According to a fourth condition, the HMB controller 1180 may manage a memory device corresponding to the HMB 14. In detail, the HMB controller 1180 may receive information about the memory device corresponding to the HMB 14 from the host 11. The HMB controller 1180 may determine whether information about the memory device corresponding to the HMB 14 is received.

The above-described first to fourth conditions are only some of possible examples of the change condition, and the conditions may be variously changed or modified.

In an example embodiment, the change condition may include all the first to fourth conditions. For example, with regard to a specific region, the HMB controller 1180 may determine whether the first condition is satisfied, may determine whether the second condition is satisfied, may determine whether the third condition is satisfied, and may determine whether the fourth condition is satisfied. Thus, the HMB controller 1180 may monitor all the first to fourth conditions at the same time.

In an example embodiment, the change condition may include at least one of the first to fourth conditions. For example, with regard to a specific region, the HMB controller 1180 may determine whether the first condition is satisfied or may determine whether the fourth condition is satisfied. Thus, the HMB controller 1180 may monitor only one of a plurality of conditions.

In an example embodiment, when any one of the first to fourth conditions is satisfied, the HMB controller 1180 may change a data processing policy associated with the specific region. For example, in the case where the first condition is satisfied and the second to fourth conditions are not satisfied, the HMB controller 1180 may determine that the change condition is satisfied and may change the data processing policy associated with the specific region.

In an example embodiment, when at least two of the first to fourth conditions are satisfied, the HMB controller 1180 may change the data processing policy associated with the specific region. For example, when the first condition is satisfied and the second to fourth conditions are not satisfied, the HMB controller 1180 may determine that the change condition is not satisfied. In the case where the first and second conditions are satisfied and the third and fourth conditions are not satisfied, the HMB controller 1180 may determine that the change condition is satisfied and may change the data processing policy associated with the specific region.

As described above, the change condition may include all the first to fourth conditions or may include an arbitrary combination of the first to fourth conditions.

In operation S420, the HMB controller 1180 may change the data processing policy. In detail, the HMB manager 1181 may change a data processing policy of a region satisfying the change condition from among the plurality of regions R1 to R4. For example, it is assumed that the change condition of the first region R1 is satisfied. The HMB manager 1181 may change the data processing policy of the first region R1 from the first data processing policy DPP1 to a fourth data processing policy DPP4.

In operation S430, the HMB controller 1180 may update the HMB mapping table HMBMT. The HMB manager 1181 may store a newly selected data processing policy in the HMB mapping table HMBMT in association with a region. For example, because the data processing policy of the first region R1 is changed from the first data processing policy DPP1 to a fifth data processing policy DPP5, the HMB controller 1180 may store the fifth data processing policy DPP5 in the HMB mapping table HMBMT in association with the first region R1.

The HMB controller 1180 may determine whether all the regions R1 to R4 satisfy change conditions to be described below. However, for brevity of drawing and for convenience of description, below, whether a change condition of one specific region is satisfied will be described. It is assumed that one specific region is the first region R1. However, e.g., it may be well understood that the following description is applicable to the remaining regions R2 to R4.

Figure 9:
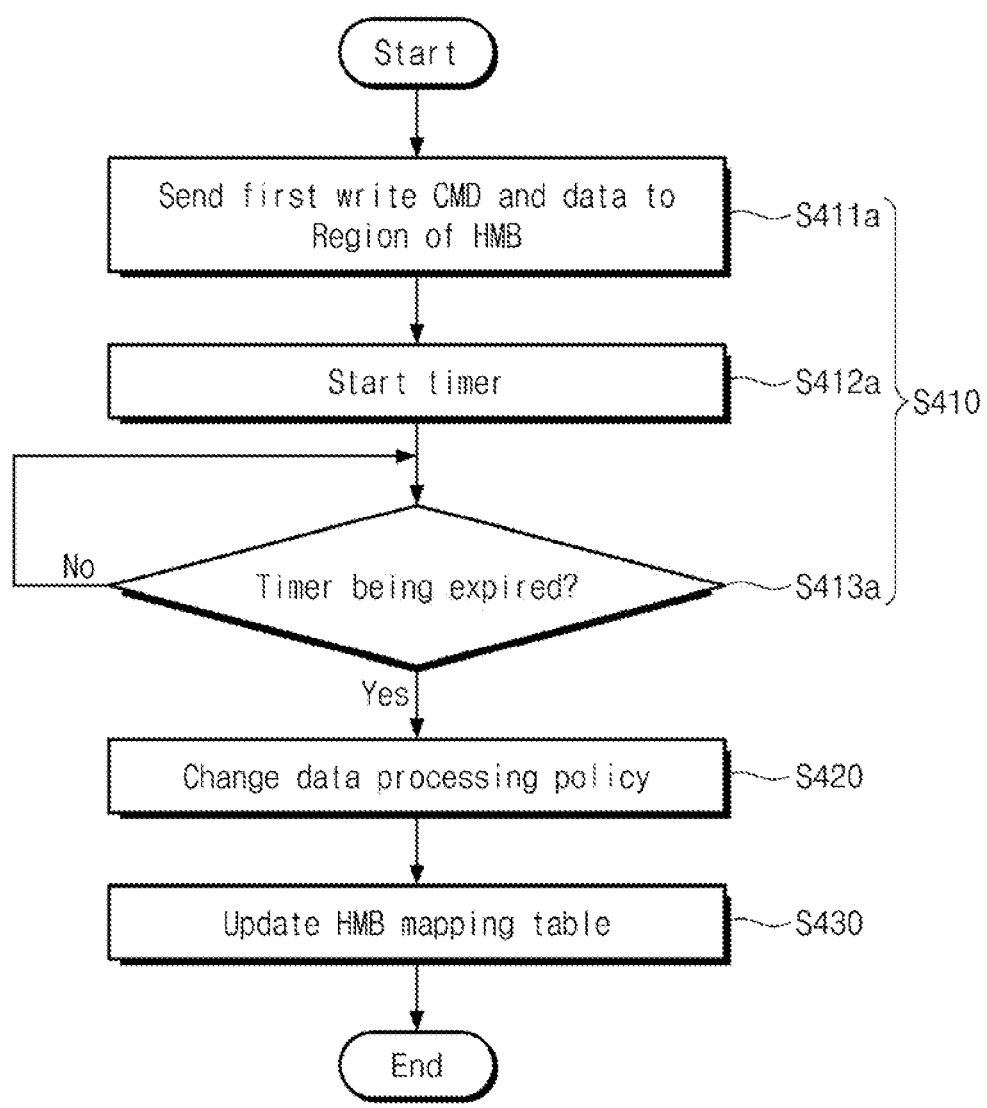
FIG. 9 is a flowchart illustrating operation S410 of FIG. 8 in detail.
Figure 10A:
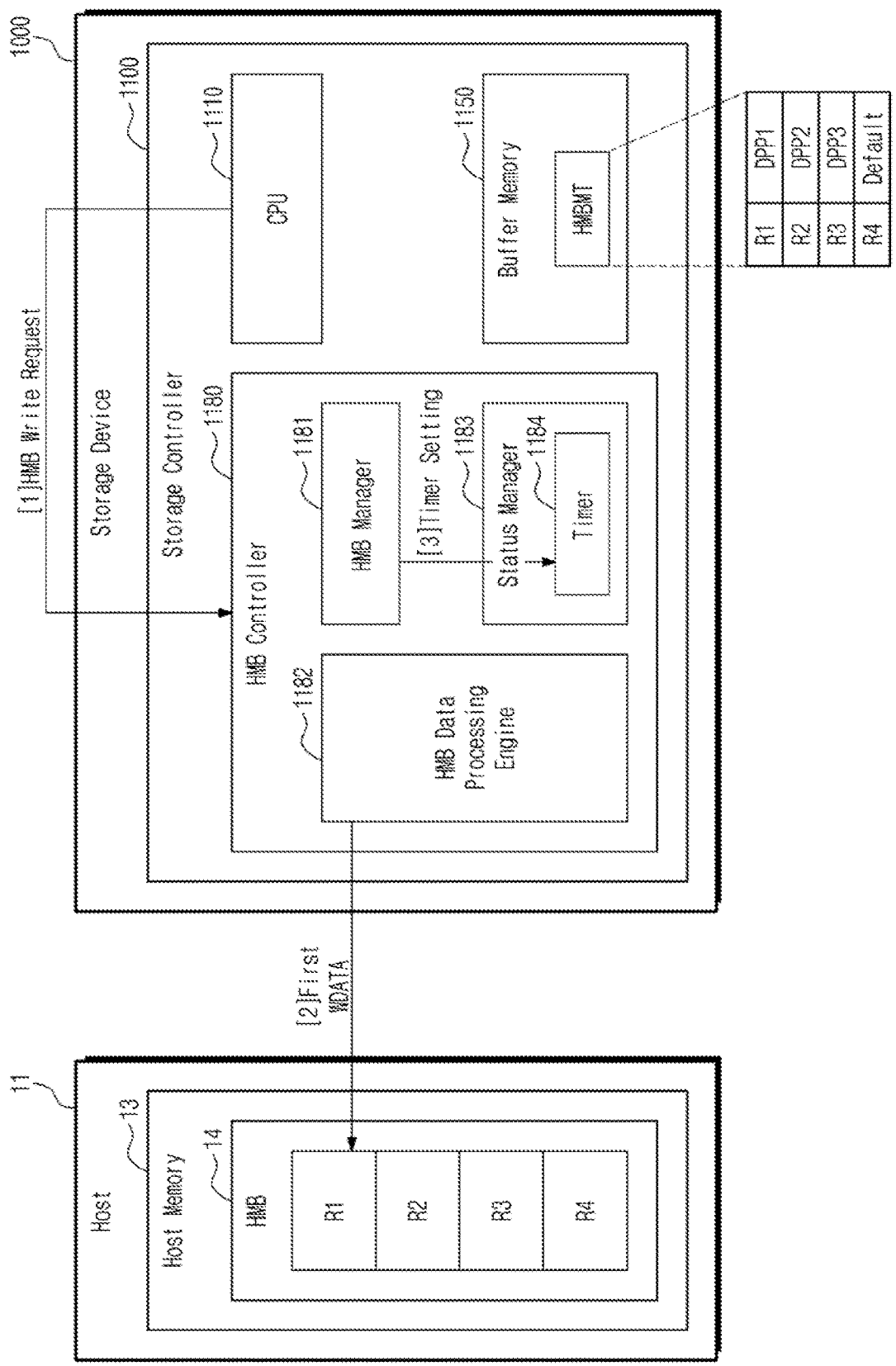
FIGS. 10A and 10B are diagrams illustrating an example of an operation of a storage device of FIG. 1.
Figure 10B:
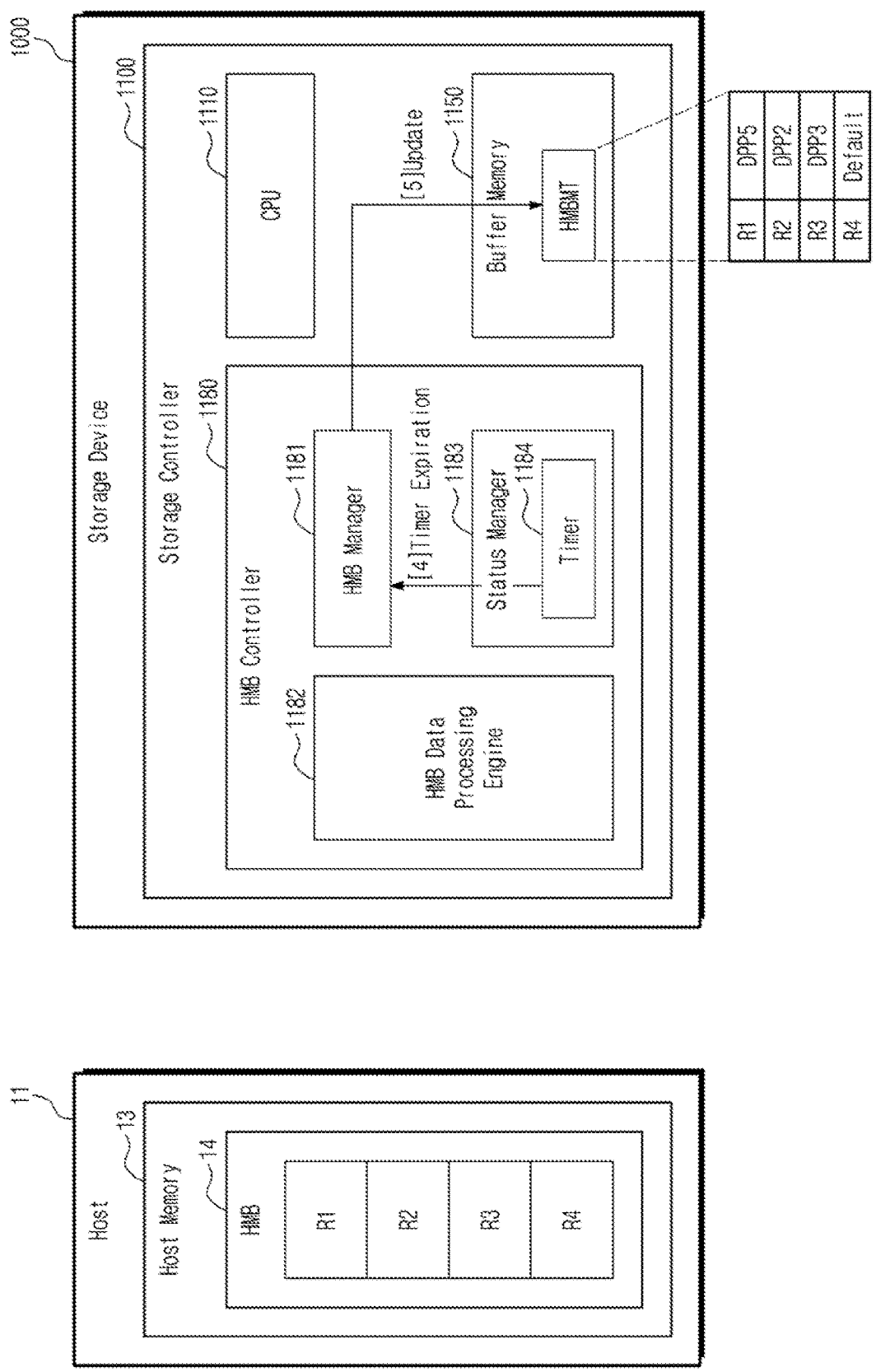

FIG. 9 is a flowchart illustrating operation S410 of FIG. 8 in detail. FIGS. 10A and 10B are diagrams illustrating an example of an operation of a storage device of FIG. 1.

Referring to FIGS. 1, 9, 10A, and 10B, operation S410 of FIG. 8 may include operation S411a to operation S413a of FIG. 9. In operation S411a, the HMB controller 1180 may send a first write command and data to a specific region of the HMB 14. For example, the CPU 1110 may send the first HMB write request for the first region R1 to the HMB controller 1180 (indicated as [1] in FIG. 10A). For example, to write data in the first region R1 for the first time, the CPU 1110 may send the HMB write request to the HMB controller 1180.

The HMB controller 1180 may send the first write data to the first region R1 (indicated as [2] in FIG. 10A). For example, the HMB processing engine 1182 may perform the encoding operation on the first write data based on the first data processing engine DPE1 corresponding to the first region R1. The HMB processing engine 1182 may send the first write command and the encoded write data to the host 11. The HMB controller 1180 may send a write command and data for the first time in a state where any data are not stored in the first region R1. Thus, the HMB controller 1180 may write data in the first region R1 for the first time.

In operation S412a, the HMB controller 1180 may start the timer 1184. The HMB controller 1180 may start a counting operation of a timer corresponding to the first region R1. In an example embodiment, the HMB manager 1181 may set a reference time of the timer 1184 corresponding to the first region R1 (indicated as [3] in FIG. 10A).

For example, the reference time may be selected based on a kind of data to be stored in the first region R1 and characteristics of a host memory device corresponding to the first region R1. The reference time may be set to change a data processing policy of the first region R1. In detail, the reference time may be set to perform the data processing policy changing operation for securing the integrity of data before the data are lost. The reference time may be a value that is determined in advance. The reference time may be fixed by a designer, a manufacturer, and/or a user, or may be selected variably. For example, the reference time may be adjustable by the HMB controller 1180 based on a state of the host memory device or a kind of data.

In operation S413*a*, the HMB controller 1180 may determine whether a timer corresponding to a region of the HMB 14 expires. For example, the HMB manager 1181 may determine whether the timer corresponding to the first region R1 expires. Thus, the HMB manager 1181 may determine whether the reference time passes from a point in time when data are written in the first region R1 for the first time. When it is determined that the timer corresponding to the first region R1 expires, the HMB manager 1181 may determine that the change condition for the first region R1 is satisfied. When the timer expires, the HMB controller 1180 may perform operation S420; when the timer does not expire, the HMB controller 1180 may continue to perform operation S413*a*. When the timer 1184 expires, the timer 1184 may output a signal indicating that the reference time passes or the timer 1184 expires, to the HMB manager 1181 (indicated as [4] in FIG. 10B).

In operation S420, the HMB controller 1180 may change the data processing policy corresponding to the first region R1. For example, the HMB manager 1181 may change the data processing policy of the first region R1 based on the signal output from the timer 1184 (i.e., based on that the reference time passes or the timer 1184 expires). The HMB manager 1181 may change the first data processing policy DPP1 of the first region R1 to the fifth data processing policy DPP5.

In operation S430, the HMB controller 1180 may update the HMB mapping table HMBMT. For example, the HMB manager 1181 may change the data processing policy of the first region R1 to the fifth data processing policy DPP5 (indicated as [5] in FIG. 10B).

Figure 11:
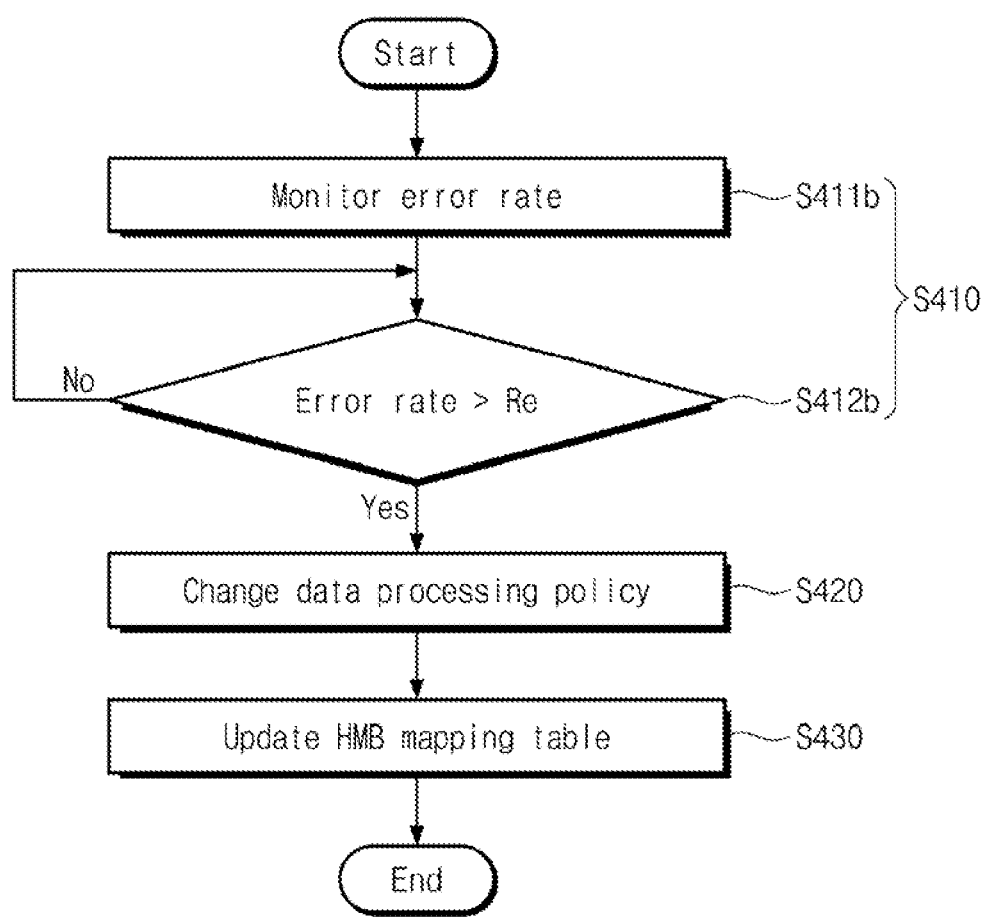
FIG. 11 is a flowchart illustrating operation S410 of FIG. 8 in detail.
Figure 12A:
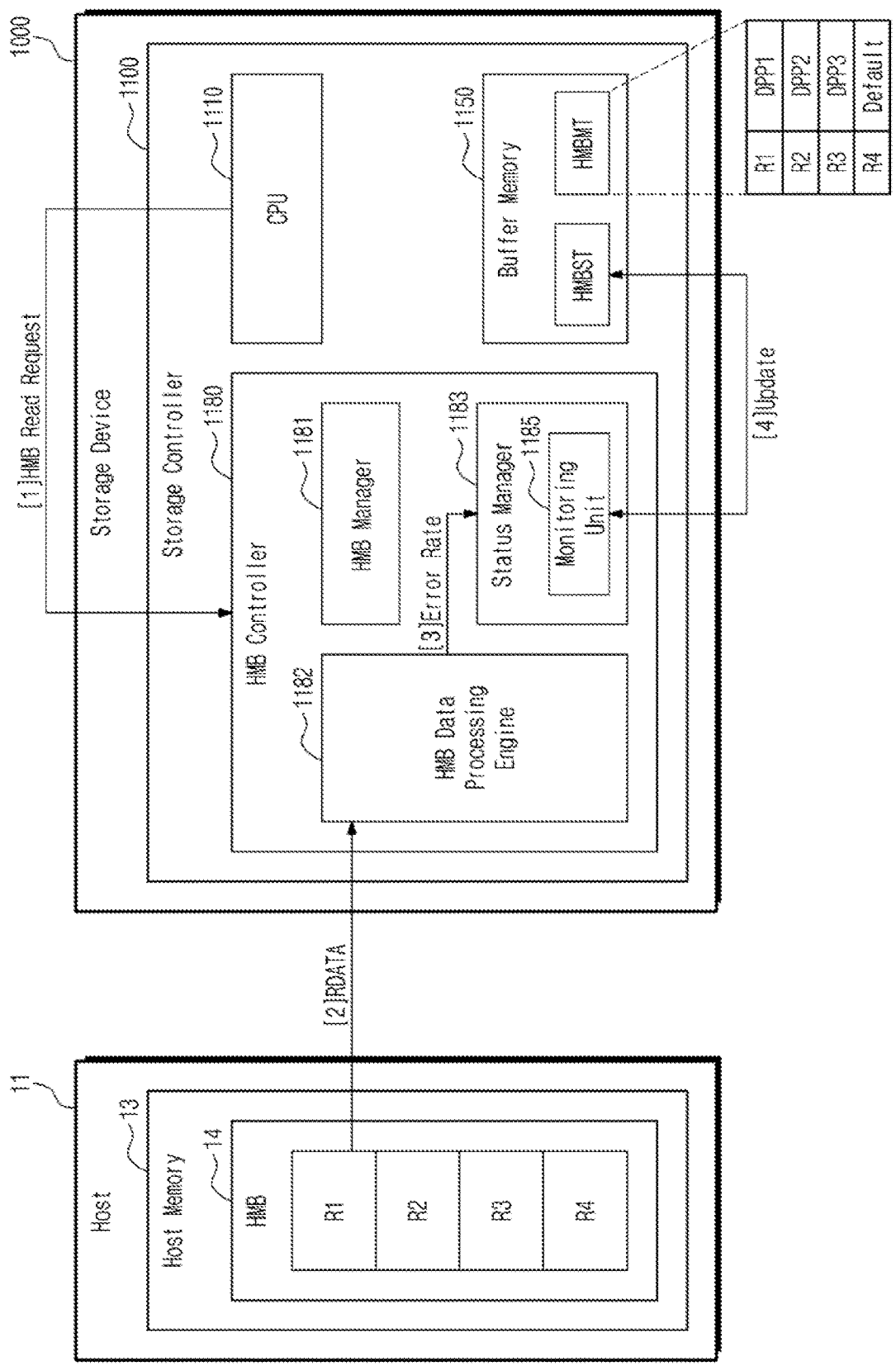
FIGS. 12A and 12B are diagrams illustrating an example of an operation of a storage device of FIG. 1.
Figure 12B:
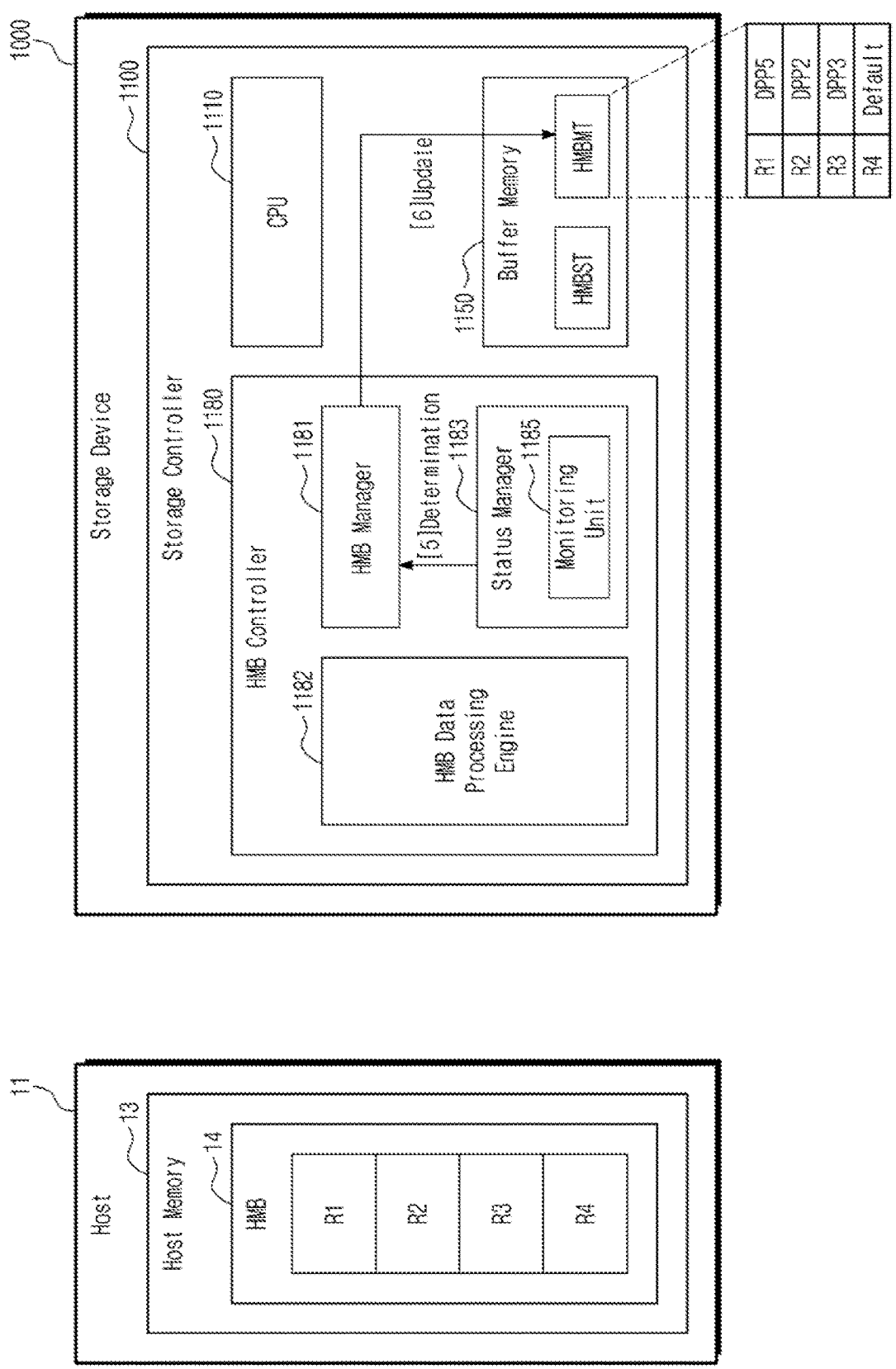

FIG. 11 is a flowchart illustrating operation S410 of FIG. 8 in detail. FIGS. 12A and 12B are diagrams illustrating an example of an operation method of a storage device of FIG. 1.

Referring to FIGS. 11, 12A, and 12B, operation S410 of FIG. 8 may include operation S411*b* and operation S412*b*.

In operation S411*b*, the HMB controller 1180 may monitor an error rate. For example, the CPU 1110 may send the HMB read request for the first region R1 to the HMB controller 1180 (indicated as [1] in FIG. 12A). The HMB processing engine 1182 may read the read data RDATA from the first region R1 (indicated as [2] in FIG. 12A). The HMB processing engine 1182 may determine whether an error is present in the read data RDATA. When an error is present in the read data RDATA, the HMB processing engine 1182 may detect an error rate. In another implementation, when an error is present in the read data RDATA, the HMB processing engine 1182 may calculate an error rate. The HMB processing engine 1182 may send the error rate to the monitoring unit 1185 (indicated as [3] in FIG. 12A). The monitoring unit 1185 may monitor the error rate. The monitoring unit 1185 may store the error rate in the HMB status table HMBST, or may update the HMB status table HMBST such that the error rate is stored (indicated as [4] in FIG. 12A).

In operation S412*b*, the HMB controller 1180 may determine whether the error rate exceeds a reference error rate Re. For example, the monitoring unit 1185 may determine whether an error rate corresponding to the first region R1 exceeds a reference error rate corresponding to the first region R1, with reference to the HMB status table HMBST. When the error rate exceeds the reference error rate, the monitoring unit 1185 performs operation S420; when the error rate does not exceed the reference error rate, the monitoring unit 1185 performs operation S412*b*. When the error rate exceeds the reference error rate, the monitoring unit 1185 may determine that the change condition is satisfied. The monitoring unit 1185 may output, to the HMB manager 1181, a signal indicating that the change condition is satisfied (indicated as [5] in FIG. 12B).

In operation S420, the HMB controller 1180 may change the data processing policy of the first region R1 from the first data processing policy DPP1 to the fifth data processing policy DPP5 in response to the signal output from the monitoring unit 1185 (i.e., based on that the error rate exceeds the reference error rate). In operation S430, the HMB controller 1180 may update the HMB mapping table HMBMT. For example, the HMB manager 1181 may change the data processing policy of the first region R1 to the fifth data processing policy DPP5 (indicated as [6] in FIG. 12B).

In an example embodiment, the storage device 1000 may monitor a state associated with the reliability and security of data in addition to the error rate. For example, the monitored state may include an elapsed time of each region of the HMB 14, an error occurrence ratio (i.e., a ratio of an error detection count and a total HMB read request count), a write count, a read count, a read retry count, a ratio of invalid memory spaces, or an available capacity.

In an example embodiment, the status manager 1183 may determine whether the monitored state satisfies the change condition. For example, in the case where a numerical value of the monitored state reaches a reference value, the change condition may be satisfied. The reference value may be selected in consideration of a reliability level or a security level that is called for for each region.

The status manager 1183 may manage an elapsed time by using the monitoring unit 1185 instead of the timer 1184. The monitoring unit 1185 may manage various times of each of the plurality of regions R1 to R4. For example, the HMB manager 1181 may manage elapsed times of the plurality of regions R1 to R4. An elapsed time indicates an elapsed time from a point in time when data are written in each region for the first time until a current or later time. The HMB manager 1181 may store a point in time when data are stored in a region for the first time, that is, a start time in the HMB status table HMB ST, as a time stamp.

The monitoring unit 1185 may calculate a difference between a current time and a start time stored in the HMB status table HMBST as the elapsed time with reference to the HMB status table HMBST. The monitoring unit 1185 may compare the calculated elapsed time and a reference time to determine whether the elapsed time exceeds the reference time. When the elapsed time exceeds the reference time, the monitoring unit 1185 may detect that the change condition of the first region R1 is satisfied. The monitoring unit 1185 may output a signal indicating that the change condition is satisfied, to the HMB manager 1181.

The monitoring unit 1185 may manage an error occurrence ratio. The monitoring unit 1185 may manage the error occurrence ratio (i.e., a ratio of an error occurrence count and an HMB read count) based on the HMB status table HMBST. The monitoring unit 1185 may calculate the error occurrence ratio whenever the HMB read operation is performed. The monitoring unit 1185 may store the error occurrence ratio in the HMB status table HMBST or may update the HMB status table HMBST such that the error occurrence ratio is stored. When the error occurrence ratio reaches a reference value (e.g., when the error occurrence ratio is higher than the reference value), the monitoring unit 1185 may output, to the HMB manager 1181, a signal indicating that the change condition is satisfied.

Figure 13:
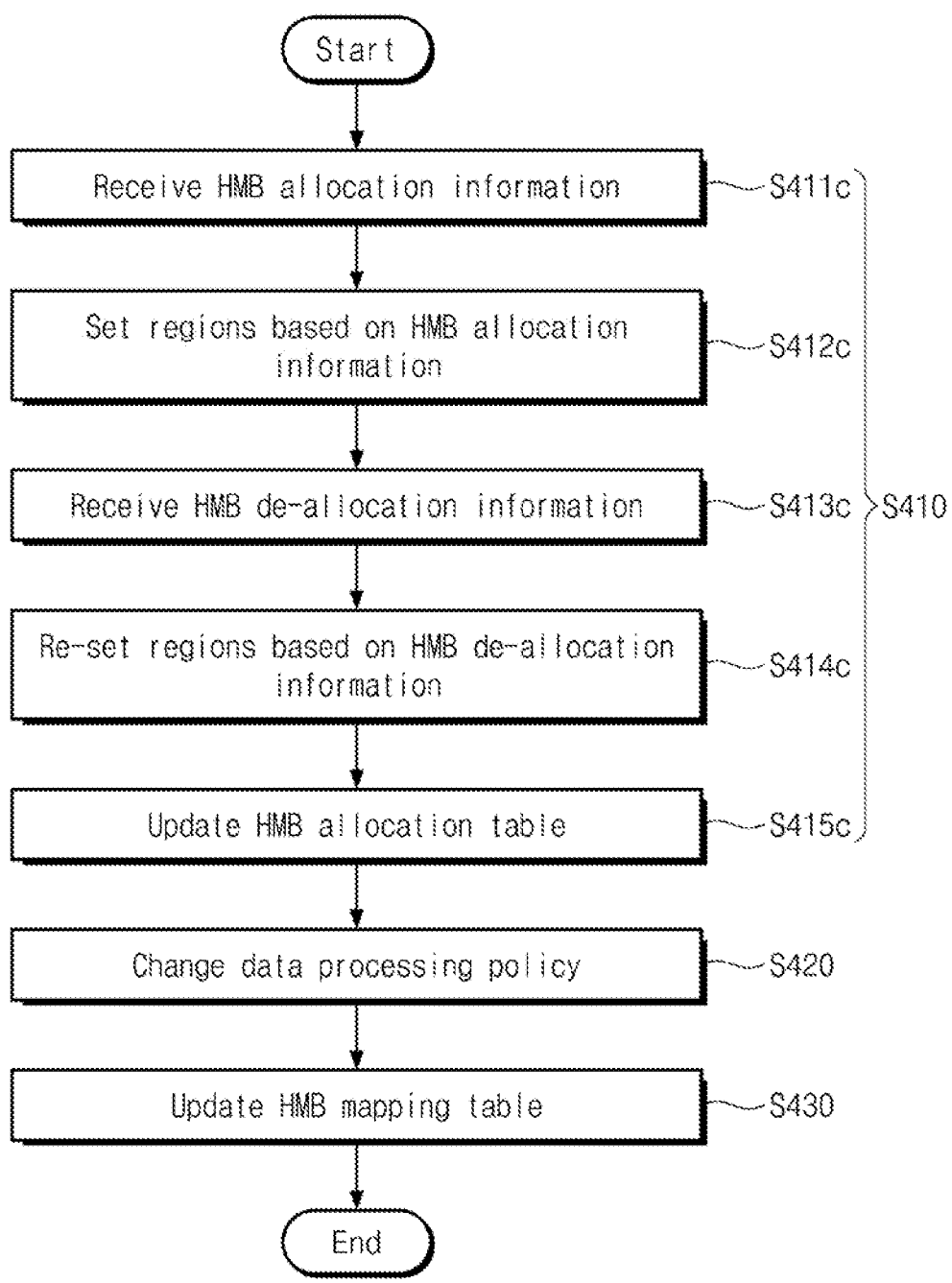
FIG. 13 is a flowchart illustrating operation S410 of FIG. 8 in detail.
Figure 14A:
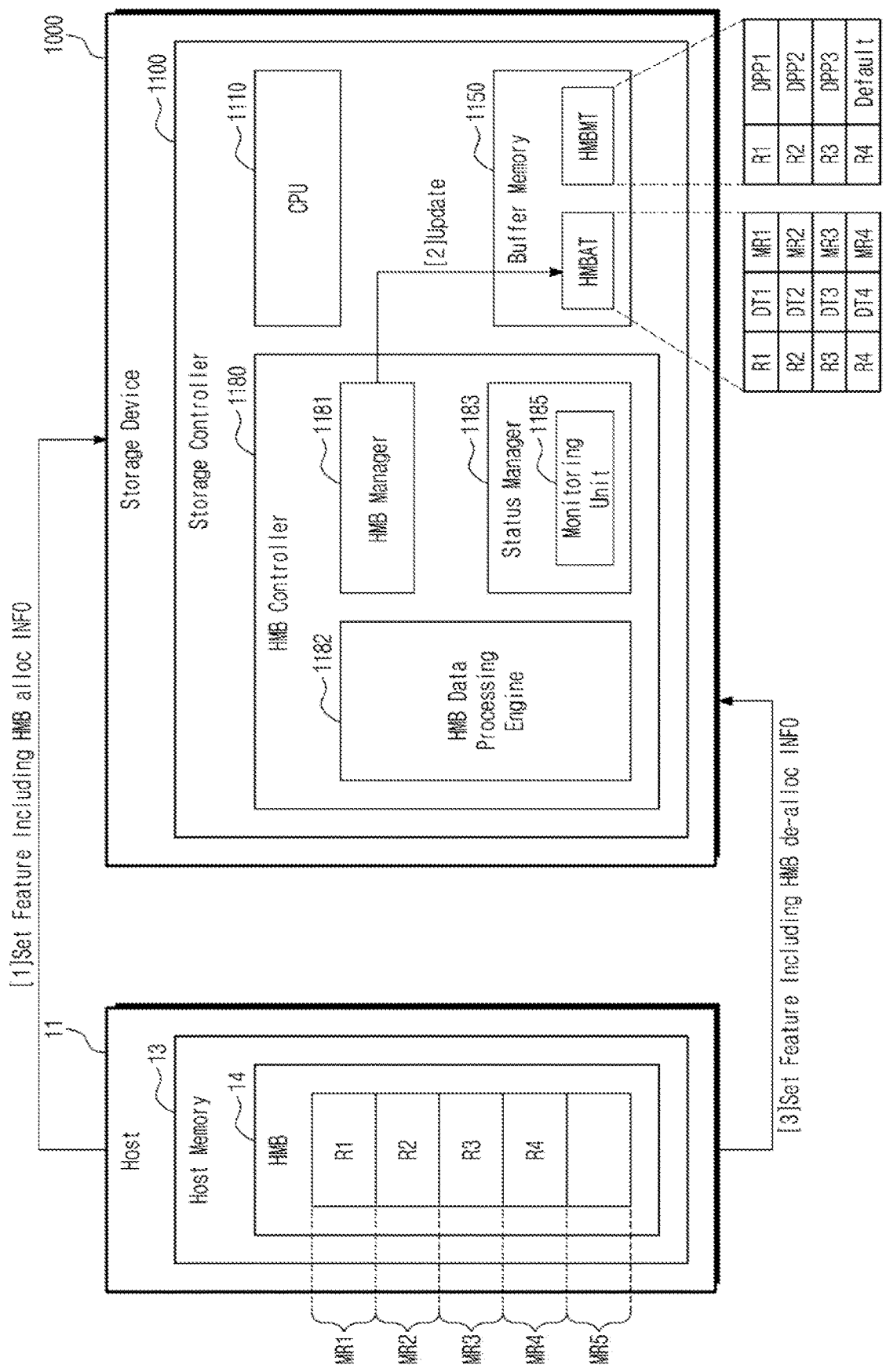
FIGS. 14A and 14B are diagrams illustrating an example of an operation of a storage device of FIG. 1.
Figure 14B:
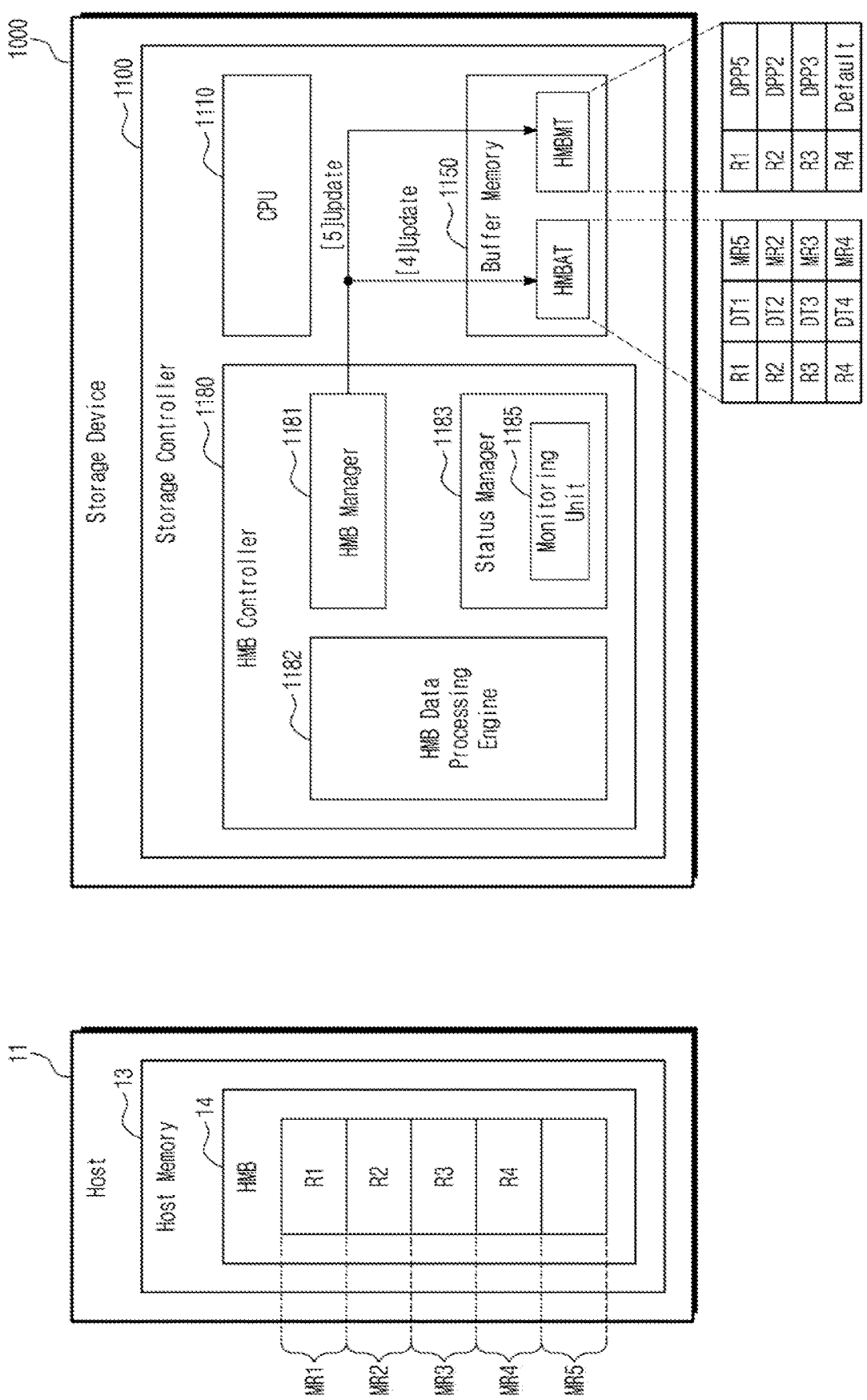

FIG. 13 is a flowchart illustrating operation S410 of FIG. 8 in detail. FIGS. 14A and 14B are diagrams illustrating an example of an operation of a storage device of FIG. 1.

Referring to FIGS. 13, 14A, and 14B, the storage device 1000 may change a data processing policy of a specific region based on an HMB allocation region change of the host 11.

The host 11 may deallocate a memory space of the HMB 14 that was previously allocated to use the storage device 1000. In another implementation, the host 11 may request a return of a previously allocated memory space of the HMB 14. For example, the host 11 may deallocate the allocated memory space of the HMB 14 by setting a memory return (MR) field included in the set feature command (e.g., a feature identifier FID indicating a host buffer memory) to "1".

The HMB manager 1181 may allocate a region corresponding to the deallocated memory space of the HMB 14 for any other memory space. For example, an unused portion of the previously allocated memory space of the HMB 14 may be allocated for a region. In another implementation, the host 11 may further allocate a new memory space of the host memory 13 for the HMB 14. For example, the host 11 may allocate a new memory space for the HMB 14 through the set feature command. The HMB manager 1181 may allocate a new memory space for a region of the deallocated memory space.

In an example embodiment, operation S410 of FIG. 8 may include operation S411c to operation S415c. In operation S411c, the storage device 1000 may receive HMB allocation information from the host 11. For example, the host 11 may send the set feature command including the HMB allocation information to the storage device 1000 (indicated as [1] in FIG. 14A). The set feature command may include first to fifth memory address ranges MR1 to MR5. For example, the first to fifth memory address ranges MR1 to MR5 may indicate address ranges of the host memory 13, which correspond to the HMB 14.

In operation S412c, the storage device 1000 may set the plurality of regions R1 to R4 based on the HMB allocation information. For example, the HMB manager 1181 may split the HMB 14 into the first to fourth regions R1 to R4 in response to the HMB allocation information. The HMB manager 1181 may allocate the first memory address range MR1 of the host memory 13 for the first region R1, may allocate the second memory address range MR2 of the host memory 13 for the second region R2, may allocate the third memory address range MR3 of the host memory 13 for the third region R3, and may allocate the fourth memory address range MR4 of the host memory 13 for the fourth region R4. The HMB manager 1181 may maintain a fifth memory address range MR5 as a free space without allocation to any region.

In an example embodiment, under control of the HMB manager 1181, a first data type DT1 may be stored in the first region R1, a second data type DT2 may be stored in the second region R2, a third data type DT3 may be stored in the third region R3, and a third data type DT4 may be stored in the fourth region R4.

In an example embodiment, the HMB manager 1181 may update the HMB mapping table HMBMT (indicated as [2] in FIG. 14A). For example, the HMB manager 1181 may store the first data type DT1 and the first memory address range MR1 in association with the first region R1 in the HMB mapping table HMBMT, may store the second data type DT2 and the second memory address range MR2 in association with the second region R2 in the HMB mapping table HMBMT, may store the third data type DT3 and the third memory address range MR3 in association with the third region R3 in the HMB mapping table HMBMT, and may store the fourth data type DT4 and the fourth memory address range MR4 in association with the fourth region R4 in the HMB mapping table HMBMT.

In operation S413c, the storage device 1000 may receive HMB deallocation information. For example, the host 11 may send the set feature command including the HMB deallocation information to the storage device 1000 (indicated as [3] in FIG. 14A). The set feature command may include deallocation information about the first memory address range MR1.

In operation S414c, the storage device 1000 may again set a plurality of regions R1 to R4 based on the HMB deallocation information. For example, the HMB manager 1181 may again set the first region R1 based on the HMB deallocation information. Because the HMB manager 1181 fails to use the first memory address range MR1, the HMB manager 1181 may set the fifth memory address range MR5, which is not allocated for any region, to the first region R1. Thus, the HMB manager 1181 may allocate the first region R1 for the fifth memory address range MR5 of the host memory 13.

In operation S415c, the HMB controller 1180 may update the HMB mapping table HMBMT. For example, the HMB manager 1181 may store the fifth memory address range MR5 in the HMB mapping table HMBMT in association with the first region R1 (indicated as [4] in FIG. 14B). In an example embodiment, because allocation information about the first region R1 is changed, the HMB manager 1181 may determine that the change condition associated with the data processing policy of the first region R1 is satisfied.

In an example embodiment, the monitoring unit 1185 may monitor allocation information of each of a plurality of regions. For example, the monitoring unit 1185 may determine whether allocation information of a specific region is changed, with reference to the HMB allocation table HMBAT. When it is determined that the allocation information of the specific region is changed, the monitoring unit 1185 may detect whether the change condition of the data processing policy is satisfied. The monitoring unit 1185 may output, to the HMB manager 1181, a signal indicating that the change condition is satisfied.

In operation S420, the HMB controller 1180 may change the data processing policy. For example, the HMB manager 1181 may change the data processing policy of the first region R1 from the first data processing policy DPP1 to the fifth data processing policy DPP5 in response to the signal output from the monitoring unit 1185, or based on that HMB allocation information about a region is changed. In operation S430, the HMB controller 1180 may update the HMB mapping table HMBMT. For example, the HMB manager 1181 may change the data processing policy of the first region R1 to the fifth data processing policy DPP5 (indicated as [5] in FIG.

Figure 15:
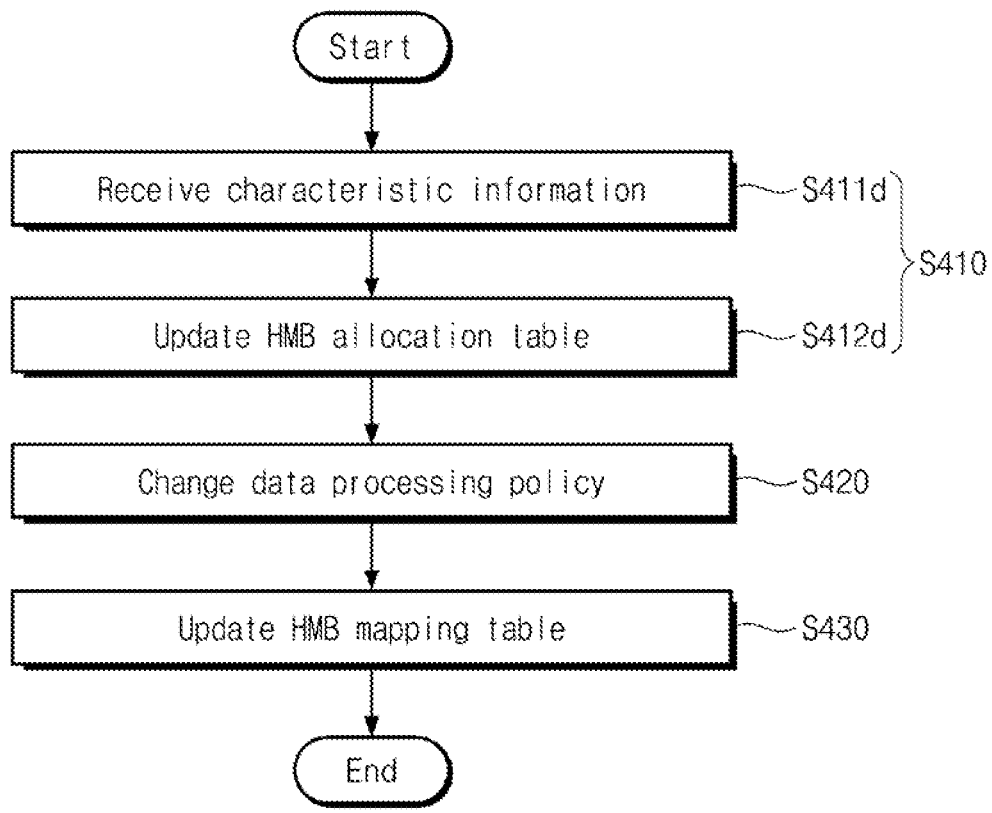
FIG. 15 is a flowchart illustrating operation S410 of FIG. 8 in detail.
Figure 16A:
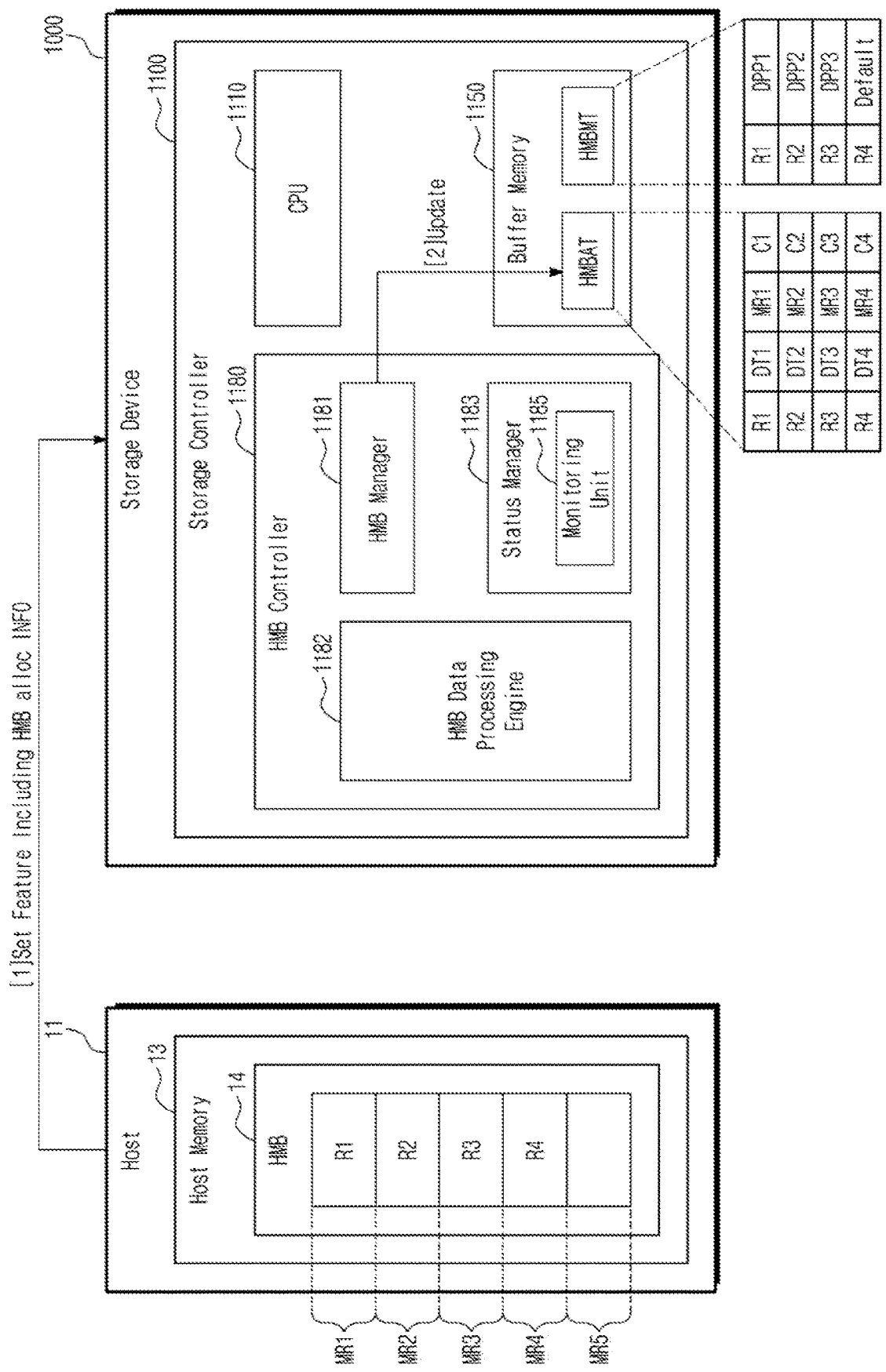
FIGS. 16A and 16B are diagrams illustrating an example of an operation of a storage device of FIG. 1.
Figure 16B:
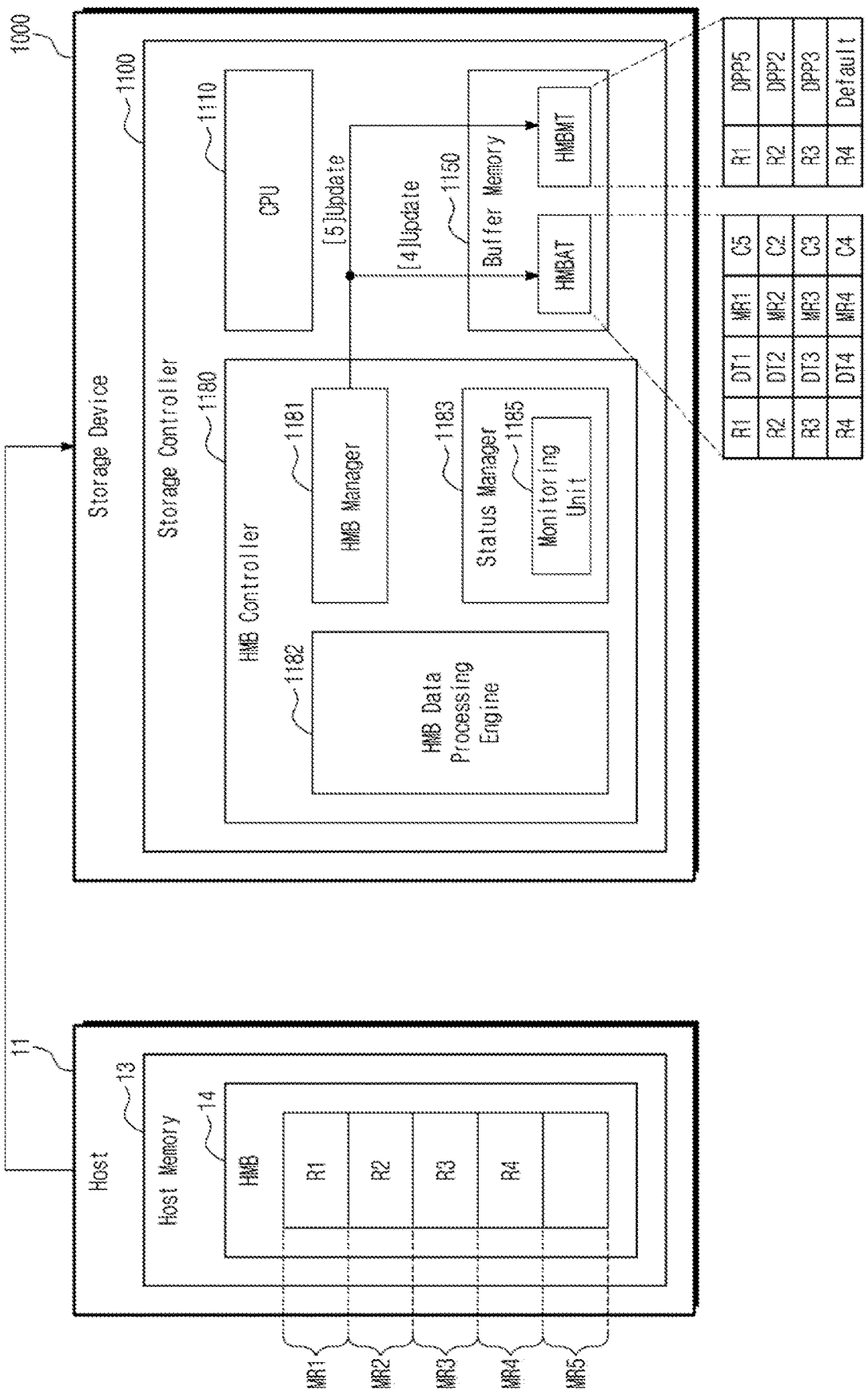

FIG. 15 is a flowchart illustrating operation S410 of FIG. 8 in detail. FIGS. 16A and 16B are diagrams illustrating an example of an operation of a storage device of FIG. 1.

Referring to FIGS. 15, 16A, and 16B, the storage device 1000 may change a data processing policy of a specific region based on characteristic information provided from the host 11.

In an example embodiment, the storage device 1000 may receive a set feature command including HMB allocation information from the host 11 in the initialization process (indicated as [1] in FIG. 16A). The set feature command may include memory address information indicating the HMB 14 in the host memory 13. For example, the set feature command may include the first to fifth memory address ranges MR1 to MR5. The set feature command may further include characteristic information about the HMB 14. For example, the characteristic information may include information about a type of a memory device corresponding to the HMB 14, a characteristic of the memory device, a reliability level of the memory device, or replacement of the memory device.

The storage device 1000 may split the HMB 14 into a plurality of regions in response to the HMB allocation information and may update the HMB allocation table HMBAT (indicated as [2] in FIG. 16A). For example, the HMB manager 1181 may store the first data type DT1, the first memory address range MR1, and a first characteristic C1 in association with the first region R1 in the HMB mapping table HMBMT, may store the second data type DT2, the second memory address range MR2, and a second characteristic C2 in association with the second region R2 in the HMB mapping table HMBMT, may store the third data type DT3, the third memory address range MR3, and a third characteristic C3 in association with the third region R3 in the HMB mapping table HMBMT, and may store the fourth data type DT4, the fourth memory address range MR4, and a fourth characteristic C4 in association with the fourth region R4 in the HMB mapping table HMBMT. The first to fourth characteristics C1 to C4 may be the characteristic information included in the set feature command. In another implementation, in the case where the characteristic information is not included in the set feature command, the first to fourth characteristics C1 to C4 may have a default.

In an example embodiment, operation S410 of FIG. 8 may include operation S411d and operation S412d. In operation S411d, the storage device 1000 may receive the characteristic information from the host 11. For example, the host 11 may send the set feature command including the characteristic information to the storage device 1000 (indicated as [3] in FIG. 16B). For example, the characteristic information may indicate changed information (e.g., a fifth characteristic C5) corresponding to the first memory address range MR1. For example, the set feature command may indicate that a type of a memory device is changed due to the replacement of the memory device corresponding to the first memory address range MR1. Thus, the fifth characteristic C5 may indicate a type of the changed memory device.

In operation S412d, the storage device 1000 may update the HMB allocation table HMBAT based on the characteristic information (indicated as [4] in FIG. 16B). For example, because the characteristic information corresponds to the first memory address range MR1 and indicates the fifth characteristic C5, the HMB manager 1181 may store the first characteristic C5 in association with the first region R1.

In an example embodiment, because the characteristic information about the first region R1 is changed, the HMB manager 1181 may determine that the change condition associated with the data processing policy of the first region R1 is satisfied.

In an example embodiment, the monitoring unit 1185 may monitor characteristic information of each of a plurality of regions. For example, the monitoring unit 1185 may determine whether characteristic information of a specific region is changed, with reference to the HMB allocation table HMBAT. When it is determined that the characteristic information of the specific region is changed, the monitoring unit 1185 may detect whether the change condition of the data processing policy is satisfied. The monitoring unit 1185 may output, to the HMB manager 1181, a signal indicating that the change condition is satisfied.

In operation S420, the HMB controller 1180 may change the data processing policy. For example, the HMB manager 1181 may change the data processing policy of the first region R1 from the first data processing policy DPP1 to the fifth data processing policy DPP5 in response to the signal output from the monitoring unit 1185 or based on that HMB allocation information about a region is changed. In operation S430, the HMB controller 1180 may update the HMB mapping table HMBMT. For example, the HMB manager 1181 may change the data processing policy of the first region R1 to the fifth data processing policy DPP5 (indicated as [5] in FIG. 16B).

Figure 17A:
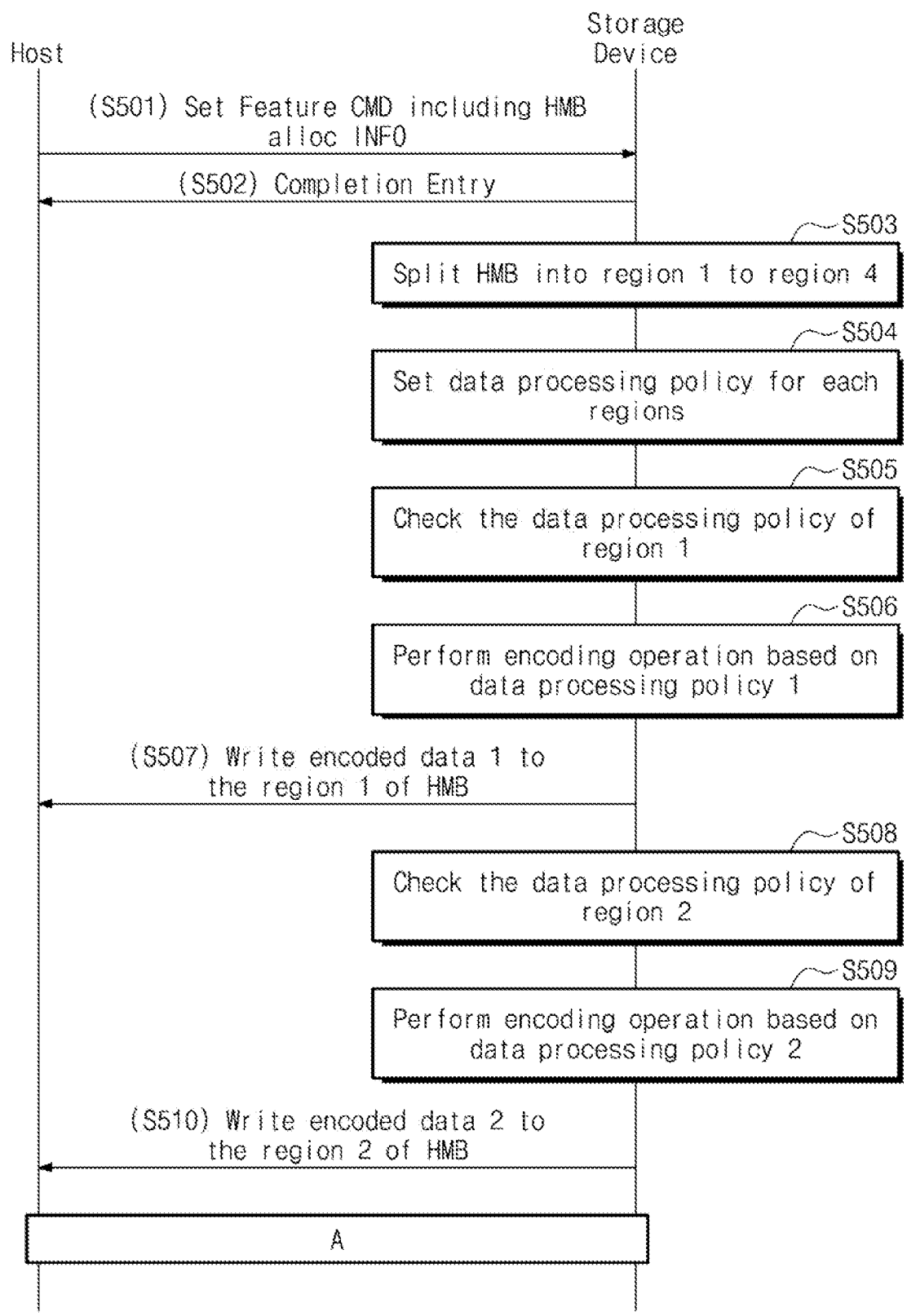
FIGS. 17A and 17B are flowcharts illustrating an example of an operation of a storage system of FIG. 1.
Figure 17B:
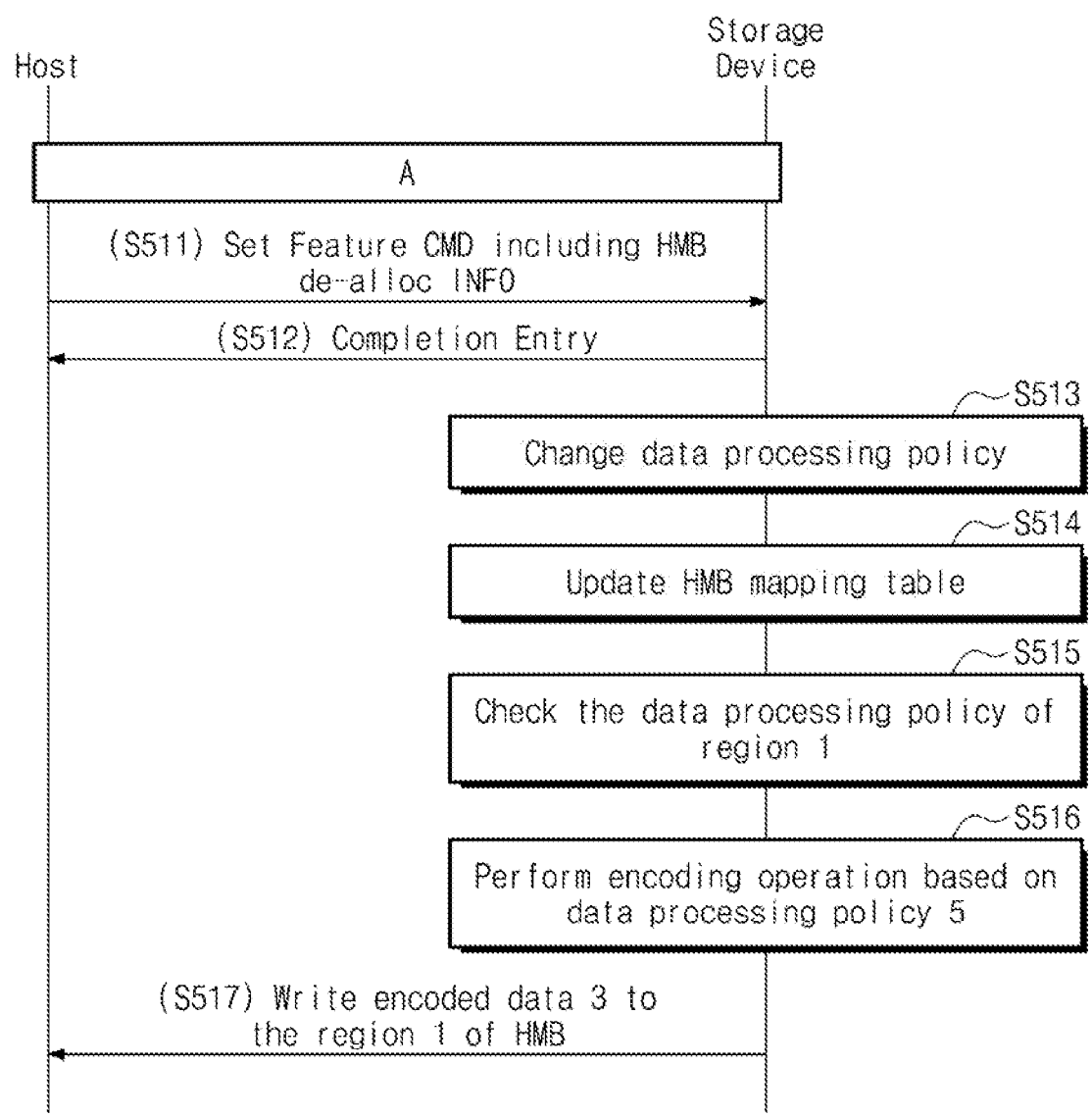
Figure 18A:
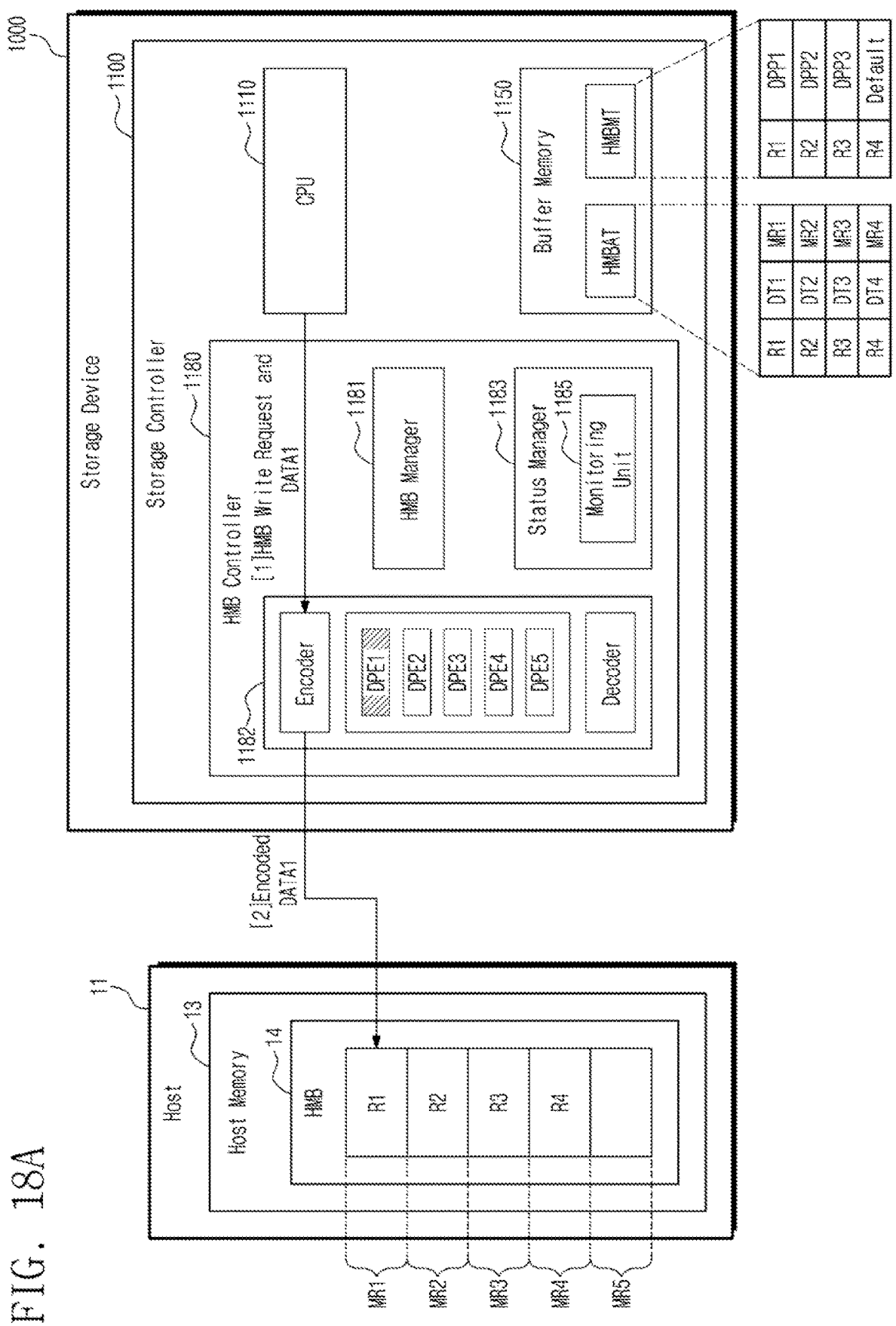
FIGS. 18A to 18C are diagrams illustrating an example of an operation of a storage system of FIG. 1.
Figure 18B:
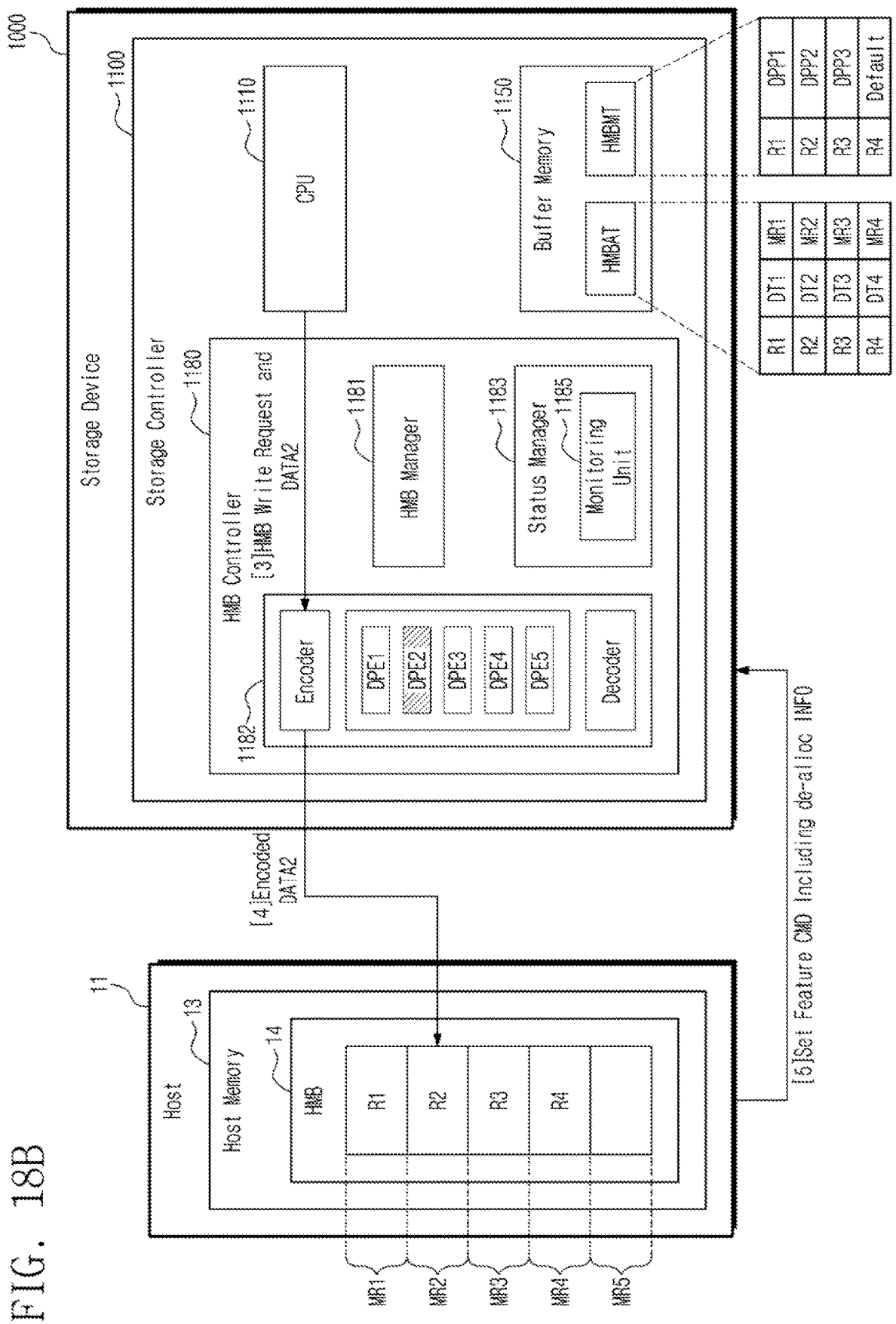
Figure 18C:
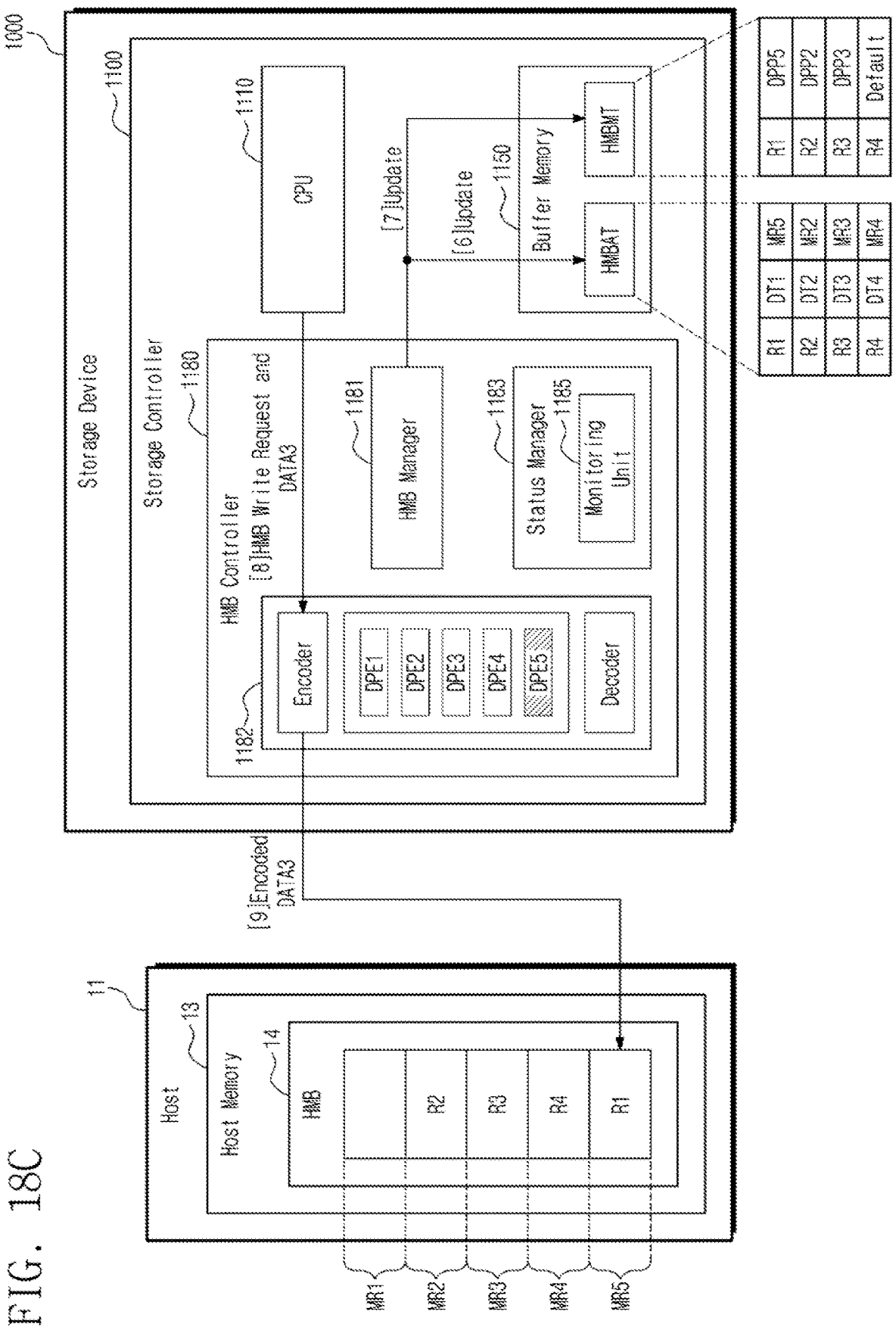

FIGS. 17A and 17B are flowcharts illustrating an example of an operation of a storage system of FIG. 1. FIGS. 18A to 18C are diagrams illustrating an example of an operation of a storage system of FIG. 1.

Referring to FIGS. 1 and 17A to 18C, in operation S501, the host 11 may send the set feature command to the storage device 1000. The set feature command may include HMB allocation information. The HMB allocation information may include host memory buffer address (or buffer address) information and buffer size information. For example, the HMB allocation information may include the first to fifth memory address ranges MR1 to MR5.

In operation S502, the storage device 1000 may send a completion entry corresponding to the set feature command to the host 11. In operation S503, the storage device 1000 may split the HMB 14 into the first to fourth regions R1 to R4. The storage device 1000 may split the HMB 14 into the plurality of regions R1 to R4, may store different kinds of data in the regions R1 to R4, and may apply different data processing policies to the regions R1 to R4.

In operation S504, the storage device 1000 may set a data processing policy for each of the plurality of regions R1 to R4. Operation S504 is the same as or similar to operation S412c, and thus, additional description will be omitted to avoid redundancy.

In operation S505, the storage device 1000 may check a data processing policy of the first region R1 based on the HMB mapping table HMBMT. For example, the CPU 1110 may send the HMB write request for the first region R1 and first data DATA1 to the HMB processing engine 1182 (indicated as [1] in FIG. 18A). The HMB controller 1180 may determine that a region of the HMB 14, in which the first data DATA1 are to be stored, is the first region R1, based on the HMB write request.

To store the first data DATA1 in the first region R1 of the HMB 14, the HMB processing engine 1182 may check which data processing policy is allocated for the first region R1. The HMB processing engine 1182 may check that the data processing policy corresponding to the first region R1 is the first data processing policy DPP1, based on the HMB mapping table HMBMT.

In operation S506, the storage device 1000 may perform the encoding operation based on the first data processing policy DPP1. For example, the HMB processing engine 1182 may perform the encoding operation on the first data DATA1 based on the first data processing policy DPP1. The HMB processing engine 1182 may generate first encoded data by performing the encoding operation by using the first data processing engine DPE1.

In operation S507, the storage device 1000 may write the first encoded data in the first region R1 of the HMB 14 (indicated as [2] in FIG. 18A). For example, the HMB processing engine 1182 may send the write command including an address of the first region R1 of the HMB 14 and the first encoded data to the host 11.

In operation S508, the storage device 1000 may check a data processing policy of the second region R2 based on the HMB mapping table HMBMT. For example, the CPU 1110 may send the HMB write request for the second region R2 and second data DATA2 to the HMB processing engine 1182 (indicated as [3] in FIG. 18B). The HMB processing engine 1182 may determine that a region of the HMB 14, in which the second data DATA2 are to be stored, is the second region R2, based on the HMB write request. To store the second data DATA2 in the second region R2 of the HMB 14, the HMB processing engine 1182 may check which data processing policy is allocated for the second region R2. The HMB processing engine 1182 may check that the data processing policy corresponding to the second region R2 is the second data processing policy DPP2, based on the HMB mapping table HMBMT.

In operation S509, the storage device 1000 may perform the encoding operation based on the second data processing policy DPP2. For example, the HMB processing engine 1182 may perform the encoding operation on the second data DATA2 based on the second data processing policy DPP2. The HMB processing engine 1182 may generate second encoded data by performing the encoding operation by using the second data processing engine DPE2.

In operation S510, the storage device 1000 may write the second encoded data in the second region R2 of the HMB 14 (indicated as [4] in FIG. 18B). For example, the HMB processing engine 1182 may send the write command including an address of the second region R2 of the HMB 14 and the second encoded data to the host 11.

In operation S511, the host 11 may send the set feature command including the HMB deallocation information to the storage device 1000. For example, the storage device 1000 may receive the set feature command including the HMB deallocation information (indicated as [5] in FIG. 18B). The HMB deallocation information may include deallocation information about the first memory address range MR1.

In operation S512, the storage device 1000 may send a completion entry corresponding to the set feature command to the host 11.

In operation S513, the storage device 1000 may change the data processing policy of the first region R1. For example, the HMB manager 1181 may again set a plurality of regions in response to the deallocation information. For example, the HMB manager 1181 may allocate not the first memory address range MR1 but the fifth memory address range MR5 for the first region R1. The HMB manager 1181 may update the HMB allocation table HMBAT. For example, the HMB manager 1181 may store the fifth memory address range MR5 in the HMB allocation table HMBAT in association with the first region R1 (indicated as [6] in FIG. 18C). Because allocation information about the first region R1 is changed, the HMB manager 1181 may determine that the change condition associated with the data processing policy of the first region R1 is satisfied. The HMB manager 1181 may change the data processing policy of the first region R1 from the first data processing policy DPP1 to the fifth data processing policy DPP5.

In operation S514, the storage device 1000 may update the HMB mapping table HMBMT. For example, the HMB manager 1181 may change the data processing policy of the first region R1 to the fifth data processing policy DPP5 (indicated as [7] in FIG. 18C).

In operation S515, the storage device 1000 may check a data processing policy of the first region R1 based on the HMB mapping table HMBMT. For example, the CPU 1110 may send the HMB write request for the first region R1 and third data DATA3 to the HMB processing engine 1182 (indicated as [8] in FIG. 18C). The HMB controller 1180 may determine that a region of the HMB 14, in which the third data DATA3 are to be stored, is the first region R1, based on the HMB write request.

To store the third data DATA3 in the first region R1 of the HMB 14, the HMB processing engine 1182 may check which data processing policy is allocated for the first region R1. The HMB processing engine 1182 may check that the data processing policy corresponding to the first region R1 is the fifth data processing policy DPP5, based on the HMB mapping table HMBMT.

In operation S516, the storage device 1000 may perform the encoding operation based on the fifth data processing policy DPP5. For example, the HMB processing engine 1182 may perform the encoding operation on the third data DATA3 based on the fifth data processing policy DPP5. The HMB processing engine 1182 may generate third encoded data by performing the encoding operation by using a fifth data processing engine DPE5.

In operation S517, the storage device 1000 may write the third encoded data in the first region R1 of the HMB 14 (indicated as [9] in FIG. 18C). For example, the HMB processing engine 1182 may send the write command including an address of the first region R1 of the HMB 14 and the third encoded data to the host 11.

As described above, the storage device 1000 according to an example embodiment may include a plurality of data processing engines. The storage device 1000 may apply different data processing engines to regions of the HMB 14, based on reliability and security information. When the change condition of a specific region is satisfied, the storage device 1000 may change a data processing policy of the specific region, based on reliability and security information. Accordingly, the storage device 1000 may efficiently use the storage space of the HMB 14 and may prevent a delay due to a data processing operation (e.g., encoding/decoding).

Figure 19:
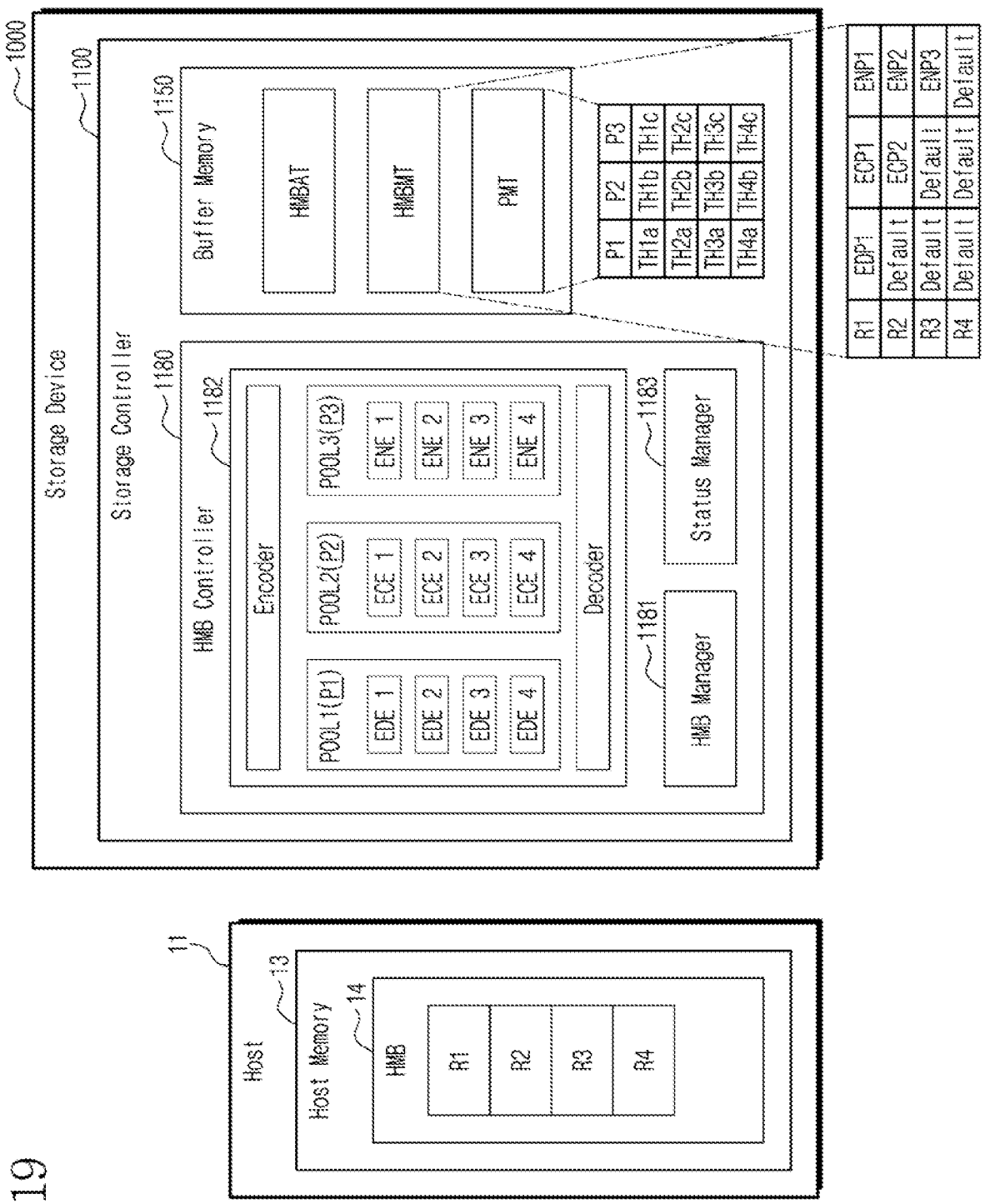
FIG. 19 is a block diagram illustrating a storage system of FIG. 1 in detail.

FIG. 19 is a block diagram illustrating a storage system of FIG. 1 in detail.

Referring to FIGS. 1 and 19, the storage device 1000 may split the HMB 14 into the plurality of regions R1 to R4.

The storage device 1000 may include the storage controller 1100. The storage controller 1100 may include the CPU 1110, the FTL 1120, the ECC engine 1130, the AES engine 1140, the buffer memory 1150, the host interface circuit 1160, the memory interface circuit 1170, and the HMB controller 1180. For convenience of description, additional description associated with the components described above will be omitted to avoid redundancy.

The HMB controller 1180 may include the HMB manager 1181, the HMB processing engine 1182, and the status manager 1183. The HMB controller 1180 may be the same as or similar to the HMB controller 1180 illustrated in FIG.

2. The HMB controller 1180 may perform the operations associated with the HMB, which are described with reference to FIGS. 1 to 18C.

The HMB processing engine 1182 may include an encoder, a decoder, and first to third processing pools P1 to P3.

Unlike the HMB processing engine 1182 of FIG. 2, the HMB processing engine 1182 of FIG. 19 may include a plurality of processing pools P1 to P3. The first processing pool P1 may include processing engines associated with a first type processing policy (e.g., an error detection policy). The second processing pool P2 may include processing engines associated with a second type processing policy (e.g., an error correction policy). The third processing pool P3 may include processing engines associated with a third type processing policy (e.g., an encryption policy).

In an example embodiment, the first processing pool P1 may include first to fourth error detection engines EDE1 to EDE4, the second processing pool P2 may include first to fourth error correction engines ECE1 to ECE4, and the third processing pool P3 may include first to fourth encryption engines ENE1 to ENE4. However, e.g., the number of pools and the number of blocks included in each pool may increase or decrease depending on the implementation.

The first processing pool P1 may include the plurality of error detection engines EDE1 to EDE4 that are different from each other. The plurality of error detection engines EDE1 to EDE4 may have different error detection capabilities. The plurality of error detection engines EDE1 to EDE4 may detect an error by using different methods (or algorithms). An error detection engine having a high error detection capability from among the plurality of error detection engines EDE1 to EDE4 may provide a high error detection capability but may provide a slow error detection speed and may have a large hardware size. An error detection engine having a low error detection capability from among the plurality of error detection engines EDE1 to EDE4 may provide a low error detection capability but may provide a fast error detection speed and may have a small hardware size.

The first processing pool P1 may align the plurality of error detection engines EDE1 to EDE4. For example, the first processing pool P1 may align error detection engines in order from the lowest error detection capability to the highest error detection capability. Thus, the error detection capability of the second error detection engine EDE2 may be higher than the error detection capability of the first error detection engine EDE1, the error detection capability of the third error detection engine EDE3 may be higher than the error detection capability of the second error detection engine EDE2, and the error detection capability of the fourth error detection engine EDE4 may be higher than the error detection capability of the third error detection engine EDE3.

For example, the error detection policy may include at least one of cyclic redundancy check (CRC), Hamming code, low density parity check (LDPC), or Bose-Chaudhuri-Hocquenghem (BCH) code. The first error detection engine EDE1 may perform the encoding/decoding operation based on a first error detection policy. Thus, the first error detection engine EDE1 may be associated with the first error detection policy (or algorithm). The second error detection engine EDE2 may be associated with a second error detection policy. The third error detection engine EDE3 may be associated with a third error detection policy. The fourth error detection engine EDE4 may be associated with a fourth error detection policy.

The second processing pool P2 may include the plurality of error correction engines ECE1 to ECE4 that are different from each other. The plurality of error correction engines ECE1 to ECE4 may have different error correction capabilities. The plurality of error correction engines ECE1 to ECE4 may correct an error by using different methods (or algorithms). An error correction engine having a high error correction capability from among the plurality of error correction engines ECE1 to ECE4 may provide a high error correction capability but may provide a slow error correction speed and may have a large hardware size. An error correction engine having a low error correction capability from among the plurality of error correction engines ECE1 to ECE4 may provide a low error correction capability but may provide a fast error correction speed and may have a small hardware size. For example, the error correction capability may mean the number of error bits correctable by an error correction engine from among bits of the data.

The second processing pool P2 may align the plurality of error correction engines ECE1 to ECE4. For example, the second processing pool P2 may align error correction engines in order from the lowest error correction capability to the highest error correction capability. Thus, the error correction capability of the second error correction engine ECE2 may be higher than the error correction capability of the first error correction engine ECE1, the error correction capability of the third error correction engine ECE3 may be higher than the error correction capability of the second error correction engine ECE2, and the error correction capability of the fourth error correction engine ECE4 may be higher than the error correction capability of the third error correction engine ECE3.

For example, the error correction policy may include at least one of Hamming code, low density parity check (LDPC), Bose-Chaudhuri-Hocquenghem (BCH) code, Reed-Solomon (RS) code, Viterbi code, or Turbo code. The first error correction engine ECE1 may perform the encoding/decoding operation based on a first error correction policy. Thus, the first error correction engine ECE1 may be associated with a first error correction policy. The second error correction engine ECE2 may be associated with a second error correction policy. The third error correction engine ECE3 may be associated with a third error correction policy. The fourth error correction engine ECE4 may be associated with a fourth error correction policy.

The third processing pool P3 may include the plurality of encryption engines ENE1 to ENE4 that are different from each other. The plurality of encryption engines ENE1 to ENE4 may have different encryption capabilities. The plurality of encryption engines ENE1 to ENE4 may perform encryption/decryption by using different methods (or algorithms). An encryption engine having a high encryption capability from among the plurality of encryption engines ENE1 to ENE4 may provide a high encryption capability but may provide a slow encryption speed and may have a large hardware size. An encryption engine having a low encryption capability from among the plurality of encryption engines ENE1 to ENE4 may provide a slow encryption capability but may provide a fast encryption speed and may have a small hardware size.

The third processing pool P3 may align the plurality of encryption engines ENE1 to ENE4. For example, the third processing pool P3 may align encryption engines in order from the lowest encryption capability to the highest encryption capability. Thus, the encryption capability of the second encryption engine ENE2 may be higher than the encryption capability of the first encryption engine ENE1, the encryption capability of the third encryption engine ENE3 may be higher than the encryption capability of the second encryption engine ENE2, and the encryption capability of the fourth encryption engine ENE4 may be higher than the encryption capability of the third encryption engine ENE3.

For example, the encryption policy may include at least one of advanced encryption standard (AES), secure hash algorithm (SHA), or Rivest Shamir Adleman (RSA). The first encryption engine ENE1 may perform the encoding/decoding operation based on a first encryption policy. Thus, the first encryption engine ENE1 may be associated with a first encryption policy. The second encryption engine ENE2 may be associated with a second encryption policy. The third encryption engine ENE3 may be associated with a third encryption policy. The fourth encryption engine ENE4 may be associated with a fourth encryption policy.

In an example embodiment, the HMB controller 1180 may set a data processing policy for each of the plurality of regions R1 to R4. The HMB controller 1180 may select the first to third type processing policies with respect to a specific region of the plurality of regions R1 to R4. For example, the first type processing policy may indicate the error detection policy, the second type processing policy may indicate the error correction policy, and the third type processing policy may indicate the encryption policy.

In an example embodiment, with regard to a specific region, the HMB controller 1180 may select one of a plurality of error detection policies, may select one of a plurality of error correction policies, and may select one of a plurality of encryption policies. Thus, with regard to a specific region, the HMB controller 1180 may select the first type processing policy in the first processing pool P1, may select the second type processing policy in the second processing pool P2, and may select the third type processing policy in the third processing pool P3.

The HMB controller 1180 may select the first to third type processing policies based on the information about the specific region. In detail, the HMB controller 1180 may select an error detection policy, an error correction policy, and an encryption policy, based on allocation information, characteristic information, status information, or mapping information about the specific region. In another implementation, the HMB controller 1180 may select the first to third type processing policies based on a required reliability level or a required security level of the specific region.

In an example embodiment, with regard to a specific region, the HMB controller 1180 may compare a required value corresponding to each of the first to third type processing policies and a threshold value to select the first to third type processing policies. The required value may be a value that is obtained by quantifying a processing capability that the specific region requires. The HMB controller 1180 may store and manage meta information about each of the first to third processing pools P1 to P3 in the processing meta table PMT. The meta information may be managed and updated in units of processing pool. For example, the meta information may include the number of engines for each pool, threshold values, etc. The threshold values may be values that are determined in advance. The threshold values may be fixed by a designer, a manufacturer, and/or a user, or may be selected variably.

For example, the HMB manager 1181 may manage the processing meta table PMT. The HMB manager 1181 may store first to fourth threshold values TH1$a$ to TH4$a$ in association with the first processing pool P1. The first error detection policy may correspond to the first threshold value TH1$a$; the second error detection policy may correspond to the second threshold value TH2$a$; the third error detection policy may correspond to the third threshold value TH3$a$; the fourth error detection policy may correspond to the fourth threshold value TH4$a$. The HMB manager 1181 may store first to fourth threshold values TH1$b$ to TH4$b$ in association with the second processing pool P2. The first error correction policy may correspond to the first threshold value TH1$b$; the second error correction policy may correspond to the second threshold value TH2$b$; the third error correction policy may correspond to the third threshold value TH3$b$; the fourth error correction policy may correspond to the fourth threshold value TH4$b$. The HMB manager 1181 may store first to fourth threshold values TH1$c$ to TH4$c$ in association with the third processing pool P3. The first encryption policy may correspond to the first threshold value TH1$c$; the second encryption policy may correspond to the second threshold value TH2$c$; the third encryption policy may correspond to the third threshold value TH3$c$; the fourth encryption policy may correspond to the fourth threshold value TH4$c$.

Referring to the HMB mapping table HMBMT of FIG. 3, the HMB controller 1180 may store one data processing policy in the HMB mapping table HMBMT for each of a plurality of regions. However, referring to the HMB mapping table HMBMT of FIG. 19, the HMB controller 1180 may store a plurality of data processing policies in the HMB mapping table HMBMT for each of a plurality of regions. Thus, the HMB controller 1180 may apply a plurality of data processing policies to data to be stored in each region.

In an example embodiment, the HMB controller 1180 may store and manage mapping information about each of the plurality of regions R1 to R4 in the HMB mapping table HMBMT. The mapping information for each region of the HMB 14 may be managed and updated for each of split regions. For example, the mapping information may include an error detection policy, an error correction policy, and an encryption policy of each region. However, e.g., the mapping information that is stored in the HMB mapping table HMBMT may include different parameters with regard to the plurality of regions R1 to R4 of the HMB 14.

For example, an error detection policy corresponding to the first region R1 may be a first error detection policy EDP1, an error correction policy corresponding to the first region R1 may be a first error correction policy ECP1, and an encryption policy corresponding to the first region R1 may be a first encryption policy ENP1. An error detection policy corresponding to the second region R2 may be a default (i.e., the HMB controller 1180 may not select the error detection policy with respect to the second region R2), an error correction policy corresponding to the second region R2 may be a second error correction policy ECP2, and an encryption policy corresponding to the second region R2 may be a second encryption policy ENP2. An error detection policy corresponding to the third region R3 may be a default (i.e., the HMB controller 1180 may not select the error detection policy with respect to the third region R3), the error correction policy corresponding to the third region R3 may be a default (i.e., the HMB controller 1180 may not select the error correction policy with respect to the third region R3), and an encryption policy corresponding to the third region R3 may be a third encryption policy ENP3 An error detection policy corresponding to the fourth region R4 may be a default (i.e., the HMB controller 1180 may not select the error detection policy with respect to the fourth region R4), the error correction policy corresponding to the fourth region R4 may be a default (i.e., the HMB controller 1180 may not select the error correction policy with respect to the fourth region R4), and an encryption policy corresponding to the fourth region R4 may be a default (i.e., the HMB controller 1180 may not select the encryption policy with respect to the fourth region R4).

As described above, the HMB controller 1180 may not select any data processing policy with respect to the plurality of regions R1 to R4. In another implementation, the HMB controller 1180 may select one or more data processing policies for each of the plurality of regions R1 to R4.

In an example embodiment, the storage device 1000 may perform the HMB write operation on the second region R2. For example, the CPU 1110 may send the HMB write request for the second region R2 to the HMB processing engine 1182. The HMB processing engine 1182 may send the encoded write data to the second region R2. In detail, the HMB processing engine 1182 may check a data processing policy corresponding to the second region R2 based on the HMB mapping table HMBMT. The HMB processing engine 1182 may determine that the error correction policy of the second region R2 is the second error correction policy ECP2 and the encryption policy of the second region R2 is the second encryption policy ENP2.

The HMB processing engine 1182 may first generate intermediate data by performing the encoding operation on the write data based on the second error correction engine ECE2. The HMB processing engine 1182 may generate encoded write data by performing the encoding operation on the intermediate data based on the second encryption policy ENP2. The HMB processing engine 1182 may send the write command and the encoded write data to the host 11. Thus, the HMB processing engine 1182 may write the encoded write data in the second region R2. An example in which the encoding operation associated with encryption is performed after the encoding operation associated with error correction is performed is described. The order of encoding operations of data processing policies may change depending on the implementation.

In an example embodiment, the storage device 1000 may perform the HMB read operation on the second region R2. For example, the CPU 1110 may send the HMB read request for the second region R2 to the HMB controller 1180. The HMB processing engine 1182 may read the read data from the second region R2. The HMB processing engine 1182 may check a data processing policy corresponding to the second region R2 based on the HMB mapping table HMBMT. The HMB processing engine 1182 may determine that the error correction policy of the second region R2 is the second error correction policy ECP2 and the encryption policy of the second region R2 is the second encryption policy ENP2.

The HMB processing engine 1182 may generate intermediate data by performing the decoding operation on the read data based on the second encryption engine ENE2. The HMB processing engine 1182 may determine whether an error is present in the intermediate data. When an error is present in the intermediate data, the HMB processing engine 1182 may perform the error correction operation on the intermediate data based on the second error correction engine ECE2. Thus, the HMB processing engine 1182 may generate corrected read data by performing the error correction operation on the intermediate data based on the second error correction engine ECE2. The HMB processing engine 1182 may send the corrected read data to the CPU 1110.

Figure 20:
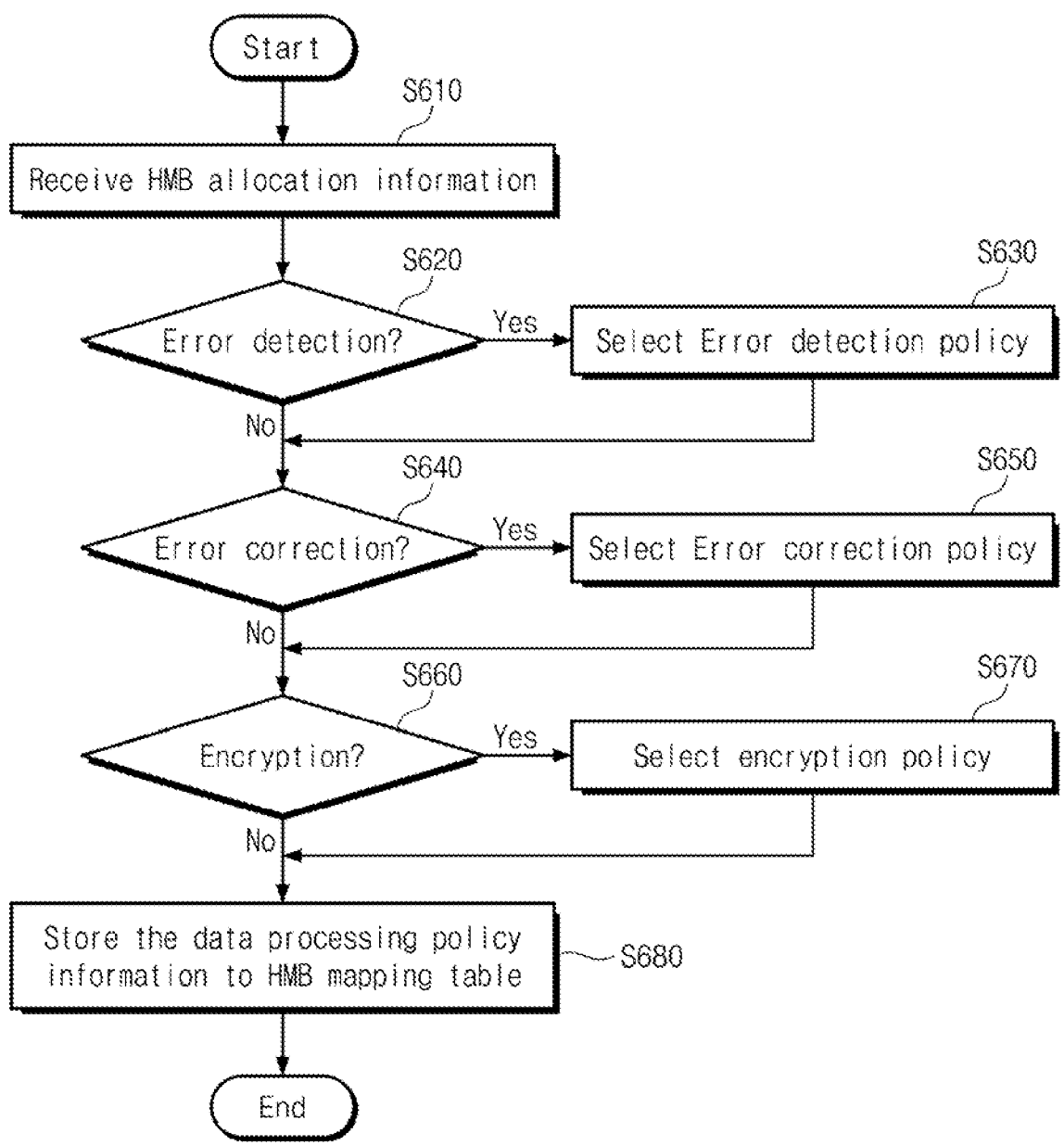
FIG. 20 is a flowchart illustrating an example of an operation of an HMB controller of FIG. 19.

FIG. 20 is a flowchart illustrating an example of an operation of an HMB controller of FIG. 19.

Referring to FIGS. 1, 19, and 20, in operation S610, the HMB controller 1180 may receive HMB allocation information from the host 11. Operation S610 is the same as or similar to operation S110 of FIG. 4, and thus, additional description will be omitted to avoid redundancy. The HMB controller 1180 may split the HMB 14 into the first to fourth regions R1 to R4, based on the HMB allocation information. The HMB controller 1180 may select a data processing policy for each of the plurality of regions R1 to R4.

In an example embodiment, the HMB manager 1181 may perform operation S620 to operation S670 to be described below, with respect to all the regions R1 to R4. However, for brevity of drawing and for convenience of description, below, whether a change condition of one specific region is satisfied will be described. It is assumed that one specific region is the first region R1. However, e.g., it may be well understood that the following description is applicable to the remaining regions R2 to R4.

In detail, in operation S620, the HMB controller 1180 may determine whether to apply an error detection policy to the specific region. For example, the HMB manager 1181 may determine whether to select an error detection policy based on information about the first region R1. The HMB manager 1181 may determine whether to apply an error detection policy to data stored in the first region R1, with reference to allocation information, characteristic information, status information, or mapping information of the first region R1. When the error detection policy is determined as being applied, the HMB controller 1180 performs operation S630; when the error detection policy is determined as being not applied, the HMB controller 1180 performs operation S640.

In operation S630, the HMB controller 1180 may select an error detection policy for the specific region. For example, the HMB manager 1181 may select one to be applied to the first region R1 from among the plurality of error detection policies EDP1 to EDP4 based on the information about the first region R1. Thus, the HMB manager 1181 may select the first error detection policy EDP1 to be applied to the first region R1 with reference to the allocation information, the characteristic information, the status information, or the mapping information of the first region R1.

In operation S640, the HMB controller 1180 may determine whether to apply an error correction policy to the specific region. For example, the HMB manager 1181 may determine whether to select an error correction policy based on the information about the first region R1. The HMB manager 1181 may determine whether to apply an error correction policy to data stored in the first region R1, with reference to the allocation information, the characteristic information, the status information, or the mapping information of the first region R1. When the error correction policy is determined as being applied, the HMB controller 1180 performs operation S650; when the error correction policy is determined as being not applied, the HMB controller 1180 performs operation S660.

In operation S650, the HMB controller 1180 may select an error correction policy for the specific region. For example, the HMB manager 1181 may select one to be applied to the first region R1 from among the plurality of error correction policies ECP1 to ECP4 based on the information about the first region R1. Thus, the HMB manager 1181 may select the first error correction policy ECP1 to be applied to the first region R1 with reference to the allocation information, the characteristic information, the status information, or the mapping information of the first region R1.

In operation S660, the HMB controller 1180 may determine whether to apply an encryption policy to the specific region. For example, the HMB manager 1181 may determine whether to select an encryption policy based on the information about the first region R1. The HMB manager 1181 may determine whether to apply an encryption policy to data stored in the first region R1, with reference to the allocation information, the characteristic information, the status information, or the mapping information of the first region R1. When the encryption policy is determined as being applied, the HMB controller 1180 performs operation S670; when the encryption policy is determined as being not applied, the HMB controller 1180 performs operation S680.

In operation S670, the HMB controller 1180 may select an encryption policy for the specific region. For example, the HMB manager 1181 may select one to be applied to the first region R1 from among the plurality of encryption policies ENP1 to ENP4 based on the information about the first region R1. Thus, the HMB manager 1181 may select the first encryption policy ENP1 to be applied to the first region R1 with reference to the allocation information, the characteristic information, the status information, or the mapping information of the first region R1.

In operation S680, the HMB controller 1180 may store information about data processing policies in the HMB mapping table HMBMT. For example, the HMB manager 1181 may store the first error detection policy EDP1, the first error correction policy ECP1, and the first encryption policy ENP1 in the HMB mapping table HMBMT in association with the first region R1. The HMB manager 1181 may store the second error correction policy ECP2 and the second encryption policy ENP2 in the HMB mapping table HMBMT in association with the second region R2. The HMB manager 1181 may store the third encryption policy ENP3 in the HMB mapping table HMBMT in association with the third region R3.

Figure 21A:
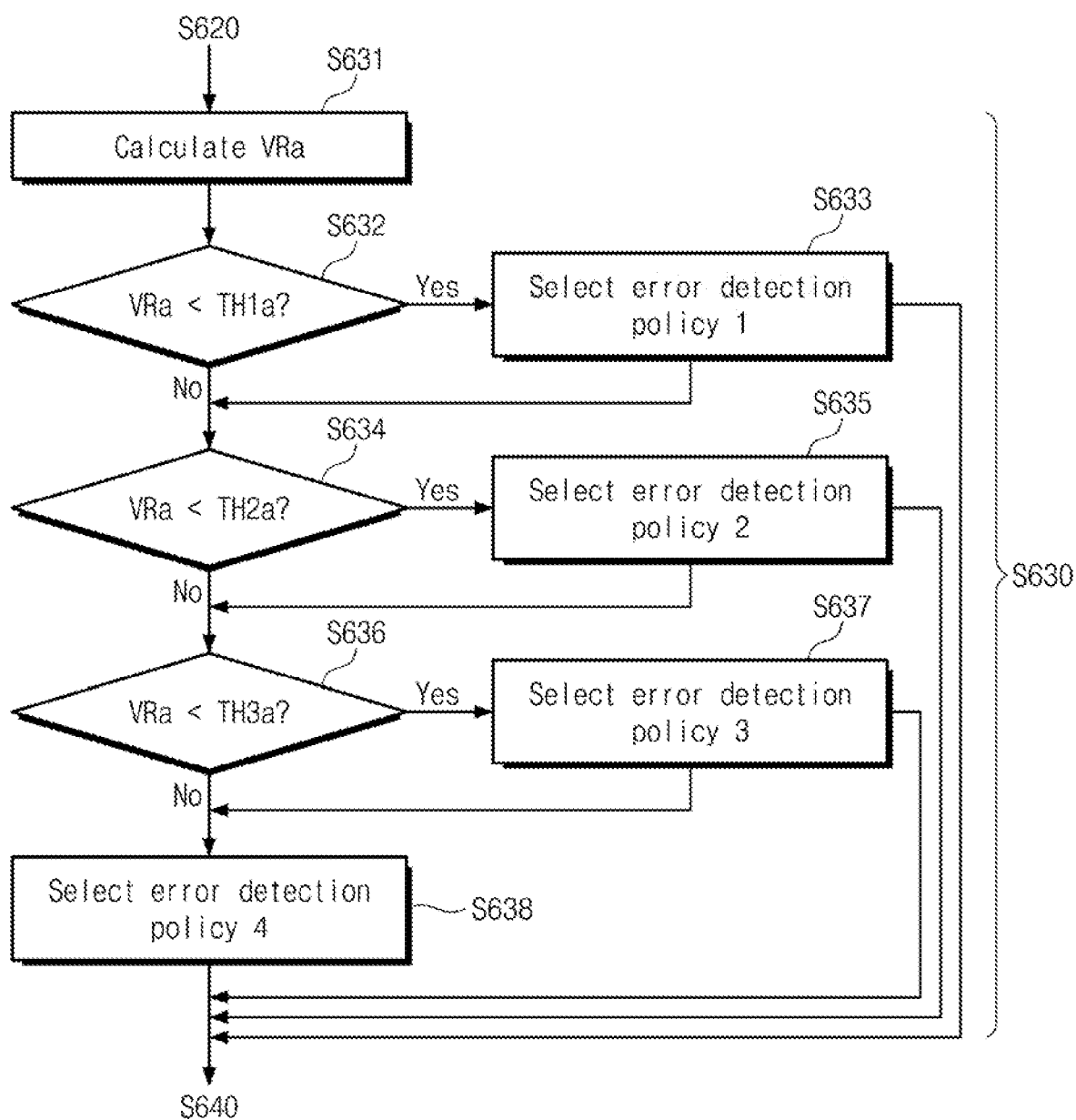
FIG. 21A is a flowchart illustrating operation S630 of FIG. 20 in detail.

FIG. 21A is a flowchart illustrating operation S630 of FIG. 20 in detail.

Referring to FIGS. 1, 19, 20, and 21A, the HMB manager 1181 may select one error detection policy to be applied to a specific region from among a plurality of error detection policies. The HMB manager 1181 may determine an error detection policy based on information about the specific region. In detail, the HMB manager 1181 may select an error detection policy, based on allocation information, characteristic information, status information, or mapping information about the specific region.

In an example embodiment, the HMB manager 1181 may select an error detection policy corresponding to the specific region by calculating a detection requirement value VRa associated with the specific region, and comparing the detection requirement value VRa and threshold values corresponding to a plurality of error detection policies. In an example embodiment, the detection requirement value VRa may be a value indicating an error detection capability that the specific region requires. The detection requirement value VRa may be a factor indicating a level of an error detection capability that the specific region requires. For example, the detection requirement value VRa of the first region R1 may be a value that is obtained by quantifying a required error detection capability calculated based on pieces of information of the first region R1.

In an example embodiment, the HMB manager 1181 may manage threshold values corresponding to the plurality of error detection policies. The threshold values corresponding to the plurality of error detection policies may be values that are determined in advance. The threshold values corresponding to the plurality of error detection policies may be fixed by a designer, a manufacturer, and/or a user, or may be selected variably.

Operation S630 of FIG. 21A may include operation S631 to operation S638. In operation S631, the HMB manager 1181 may calculate the detection requirement value VRa. For example, the detection requirement value VRa may be used to select one from the plurality of error detection policies EDP1 to EDP4. The detection requirement value VRa may be calculated based on the information about the specific region. For example, the HMB manager 1181 may calculate the detection requirement value VRa based on allocation information, characteristic information, status information, or mapping information about the specific region.

In operation S632, the HMB manager 1181 may compare the detection requirement value VRa and a first threshold value TH1a. When the detection requirement value VRa is smaller than the first threshold value TH1a, the HMB manager 1181 performs operation S633; when the detection requirement value VRa is greater than or equal to the first threshold value TH1a, the HMB manager 1181 performs operation S634.

In operation S633, the HMB manager 1181 may select the first error detection policy EDP1. Thus, the HMB manager 1181 may select the first error detection policy EDP1 as the first type processing policy of the first region R1. Afterwards, the HMB manager 1181 performs operation S640.

In operation S634, the HMB manager 1181 may compare the detection requirement value VRa and a second threshold value TH2a. When the detection requirement value VRa is smaller than the second threshold value TH2a, the HMB manager 1181 performs operation S635; when the detection requirement value VRa is greater than or equal to the second threshold value TH2a, the HMB manager 1181 performs operation S636.

In operation S635, the HMB manager 1181 may select the second error detection policy EDP2. Thus, the HMB manager 1181 may select the second error detection policy EDP2 as the first type processing policy of the first region R1. Afterwards, the HMB manager 1181 performs operation S640.

In operation S636, the HMB manager 1181 may compare the detection requirement value VRa and a third threshold value TH3a. When the detection requirement value VRa is smaller than the third threshold value TH3a, the HMB manager 1181 performs operation S637; when the detection requirement value VRa is greater than or equal to the third threshold value TH3a, the HMB manager 1181 performs operation S638.

In operation S637, the HMB manager 1181 may select the third error detection policy EDP3. Thus, the HMB manager 1181 may select the third error detection policy EDP3 as the first type processing policy of the first region R1. Afterwards, the HMB manager 1181 performs operation S640.

In operation S638, the HMB manager 1181 may select the fourth error detection policy EDP4. Thus, the HMB manager 1181 may select the fourth error detection policy EDP4 as the first type processing policy of the first region R1. Afterwards, the HMB manager 1181 performs operation S640.

Figure 21B:
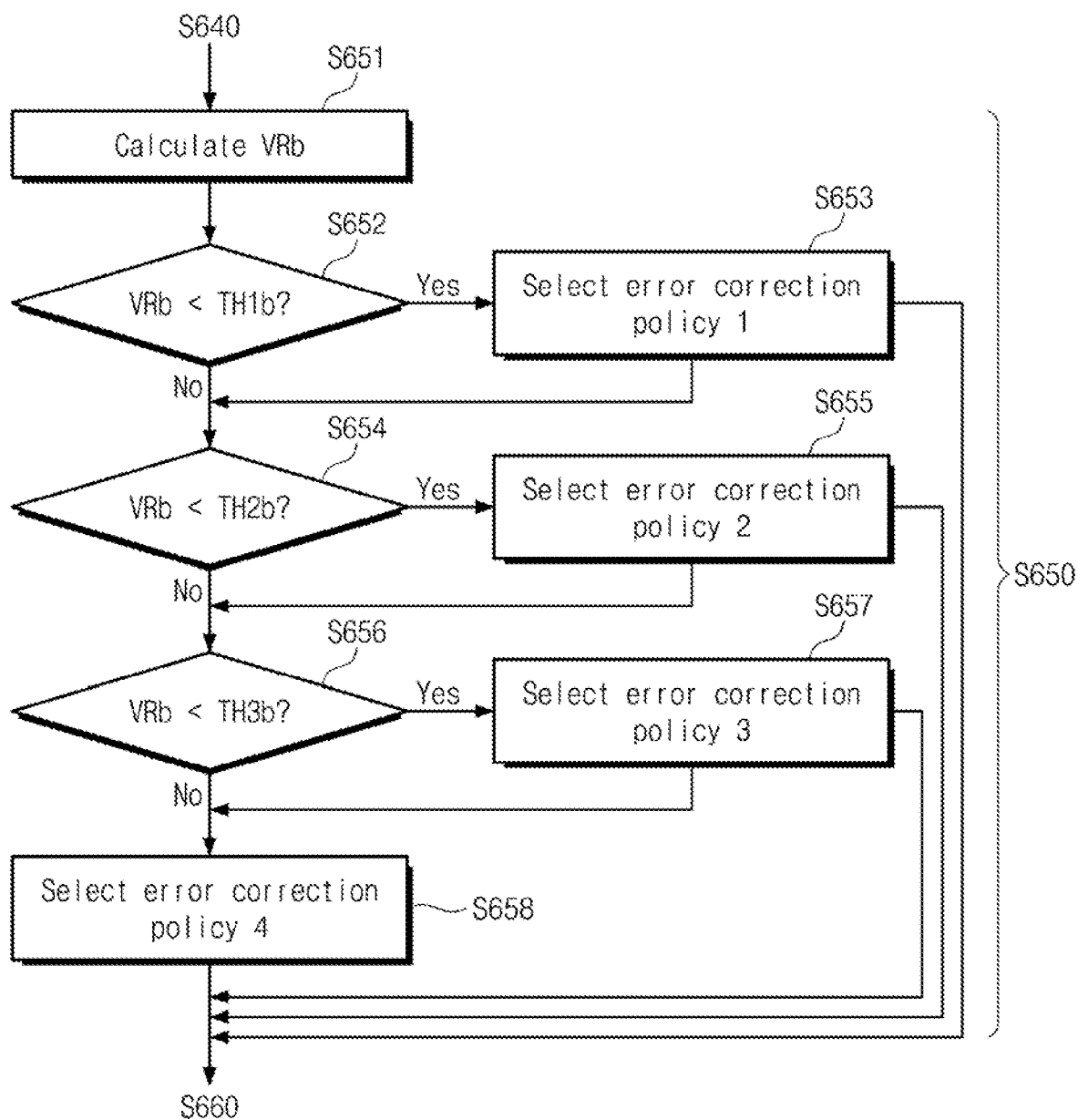
FIG. 21B is a flowchart illustrating operation S650 of FIG. 20 in detail.

FIG. 21B is a flowchart illustrating operation S650 of FIG. 20 in detail.

Referring to FIGS. 1, 19, 20, and 21B, the HMB manager 1181 may select one error correction policy to be applied to a specific region from among a plurality of error correction policies. In detail, the HMB manager 1181 may select an error correction policy, based on allocation information, characteristic information, status information, or mapping information about the specific region.

In an example embodiment, the HMB manager 1181 may select an error correction policy corresponding to the specific region by calculating a correction requirement value VRb associated with the specific region, and comparing the correction requirement value VRb and threshold values corresponding to a plurality of error correction policies. In an example embodiment, the correction requirement value VRb may be a value indicating an error correction capability that the specific region requires. For example, the correction requirement value VRb of the first region R1 may be a value that is obtained by quantifying a required error correction capability calculated based on pieces of information of the first region R1.

Operation S650 of FIG. 21B may include operation S651 to operation S658. In operation S651, the HMB manager 1181 may calculate the correction requirement value VRb. For example, the correction requirement value VRb may be used to select one from the plurality of error correction policies ECP1 to ECP4. The correction requirement value VRb may be calculated based on the information about the specific region. For example, the HMB manager 1181 may calculate the correction requirement value VRb based on allocation information, characteristic information, status information, or mapping information about the specific region.

In operation S652, the HMB manager 1181 may compare the correction requirement value VRb and a first threshold value TH1$b$. When the correction requirement value VRb is smaller than the first threshold value TH1$b$, the HMB manager 1181 performs operation S653; when the correction requirement value VRb is greater than or equal to the first threshold value TH1$b$, the HMB manager 1181 performs operation S654.

In operation S653, the HMB manager 1181 may select the first error correction policy ECP1. Thus, the HMB manager 1181 may select the first error correction policy ECP1 as the second type processing policy of the first region R1. Afterwards, the HMB manager 1181 performs operation S660.

In operation S654, the HMB manager 1181 may compare the correction requirement value VRb and a second threshold value TH2$b$. When the correction requirement value VRb is smaller than the second threshold value TH2$b$, the HMB manager 1181 performs operation S655; when the correction requirement value VRb is greater than or equal to the second threshold value TH2$b$, the HMB manager 1181 performs operation S656.

In operation S655, the HMB manager 1181 may select the second error correction policy ECP2. Thus, the HMB manager 1181 may select the second error correction policy ECP2 as the second type processing policy of the first region R1. Afterwards, the HMB manager 1181 performs operation S660.

In operation S656, the HMB manager 1181 may compare the correction requirement value VRb and a third threshold value TH3$b$. When the correction requirement value VRb is smaller than the third threshold value TH3$b$, the HMB manager 1181 performs operation S657; when the correction requirement value VRb is greater than or equal to the third threshold value TH3$b$, the HMB manager 1181 performs operation S658.

In operation S657, the HMB manager 1181 may select the third error correction policy ECP3. Thus, the HMB manager 1181 may select the third error correction policy ECP3 as the second type processing policy of the first region R1. Afterwards, the HMB manager 1181 performs operation S660.

In operation S658, the HMB manager 1181 may select the fourth error correction policy ECP4. Thus, the HMB manager 1181 may select the fourth error correction policy ECP4 as the second type processing policy of the first region R1. Afterwards, the HMB manager 1181 performs operation S660.

Figure 21C:
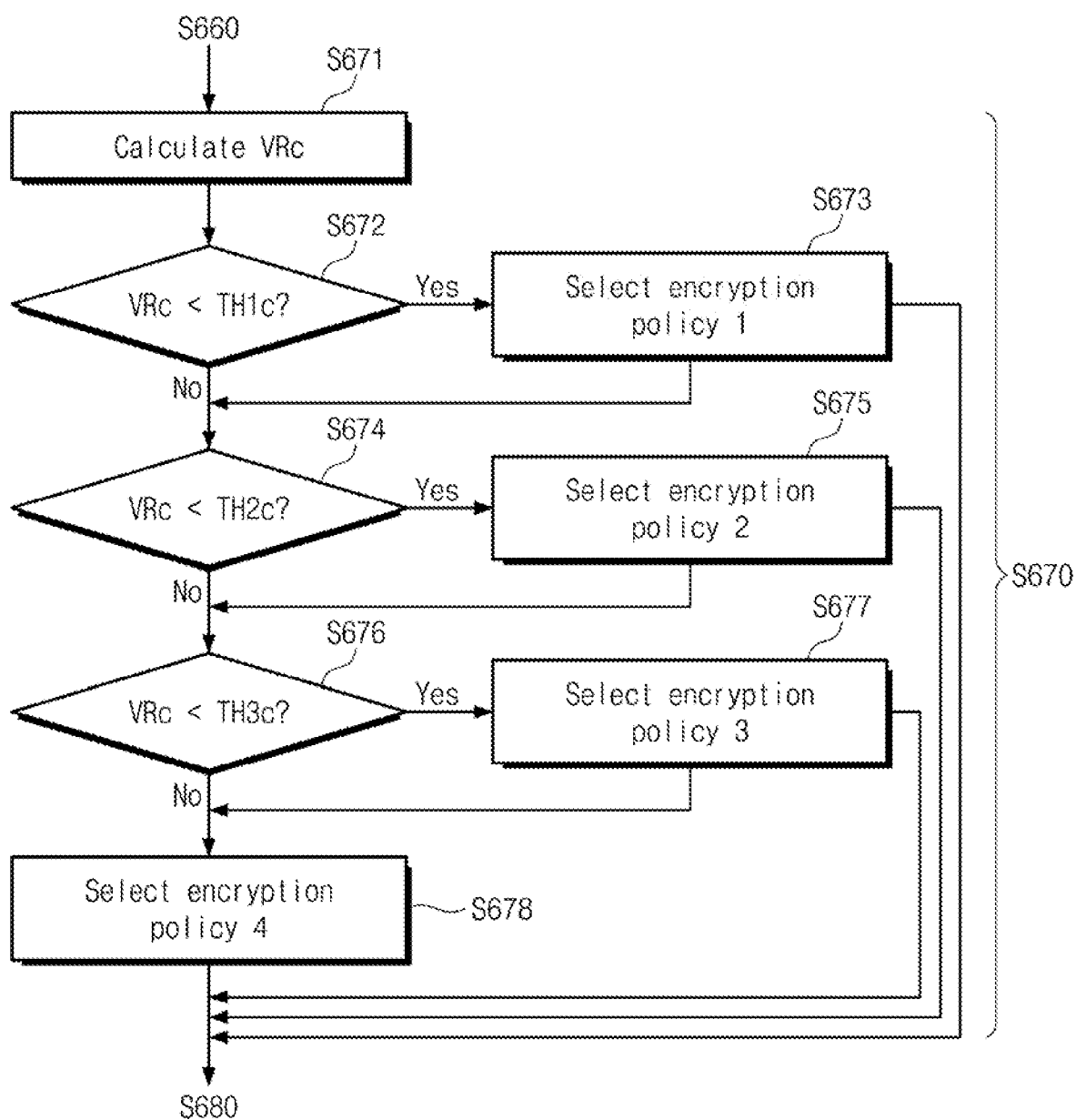
FIG. 21C is a flowchart illustrating operation S670 of FIG. 20 in detail.

FIG. 21C is a flowchart illustrating operation S670 of FIG. 20 in detail.

Referring to FIGS. 1, 19, 20, and 21C, the HMB manager 1181 may select one encryption policy to be applied to a specific region from among a plurality of encryption policies. In detail, the HMB manager 1181 may select an encryption policy, based on allocation information, characteristic information, status information, or mapping information about the specific region.

In an example embodiment, the HMB manager 1181 may select an encryption policy corresponding to the specific region by calculating an encryption requirement value VRc associated with the specific region, and comparing the encryption requirement value VRc and threshold values corresponding to a plurality of encryption policies. In an example embodiment, the encryption requirement value VRc may be a value indicating an encryption capability that the specific region requires. For example, the encryption requirement value VRc of the first region R1 may be a value that is obtained by quantifying a required encryption capability calculated based on pieces of information of the first region R1.

Operation S670 of FIG. 21C may include operation S671 to operation S678. In operation S671, the HMB manager 1181 may calculate the encryption requirement value VRc. For example, the encryption requirement value VRc may be used to select one from the plurality of encryption policies ENP1 to ENP4. The encryption requirement value VRc may be calculated based on the information about the specific region. For example, the HMB manager 1181 may calculate the encryption requirement value VRc based on allocation information, characteristic information, status information, or mapping information about the specific region.

In operation S672, the HMB manager 1181 may compare the encryption requirement value VRc and a first threshold value TH1$c$. When the encryption requirement value VRc is smaller than the first threshold value TH1$c$, the HMB manager 1181 performs operation S673; when the encryption requirement value VRc is greater than or equal to the first threshold value TH1$c$, the HMB manager 1181 performs operation S674.

In operation S673, the HMB manager 1181 may select the first encryption policy ENP1. Thus, the HMB manager 1181 may select the first encryption policy ENP1 as the third type processing policy of the first region R1. Afterwards, the HMB manager 1181 performs operation S680.

In operation S674, the HMB manager 1181 may compare the encryption requirement value VRc and a second threshold value TH2$c$. When the encryption requirement value VRc is smaller than the second threshold value TH2$c$, the HMB manager 1181 performs operation S675; when the encryption requirement value VRc is greater than or equal to the second threshold value TH2$c$, the HMB manager 1181 performs operation S676.

In operation S675, the HMB manager 1181 may select the second encryption policy ENP2. Thus, the HMB manager 1181 may select the second encryption policy ENP2 as the third type processing policy of the first region R1. Afterwards, the HMB manager 1181 performs operation S680.

In operation S676, the HMB manager 1181 may compare the encryption requirement value VRc and a third threshold value TH3c. When the encryption requirement value VRc is smaller than the third threshold value TH3c, the HMB manager 1181 performs operation S677; when the encryption requirement value VRc is greater than or equal to the third threshold value TH3c, the HMB manager 1181 performs operation S678.

In operation S677, the HMB manager 1181 may select the third encryption policy ENP3. Thus, the HMB manager 1181 may select the third encryption policy ENP3 as the third type processing policy of the first region R1. Afterwards, the HMB manager 1181 performs operation S680.

In operation S678, the HMB manager 1181 may select the fourth encryption policy ENP4. Thus, the HMB manager 1181 may select the fourth encryption policy ENP4 as the third type processing policy of the first region R1. Afterwards, the HMB manager 1181 performs operation S680.

Figure 22:
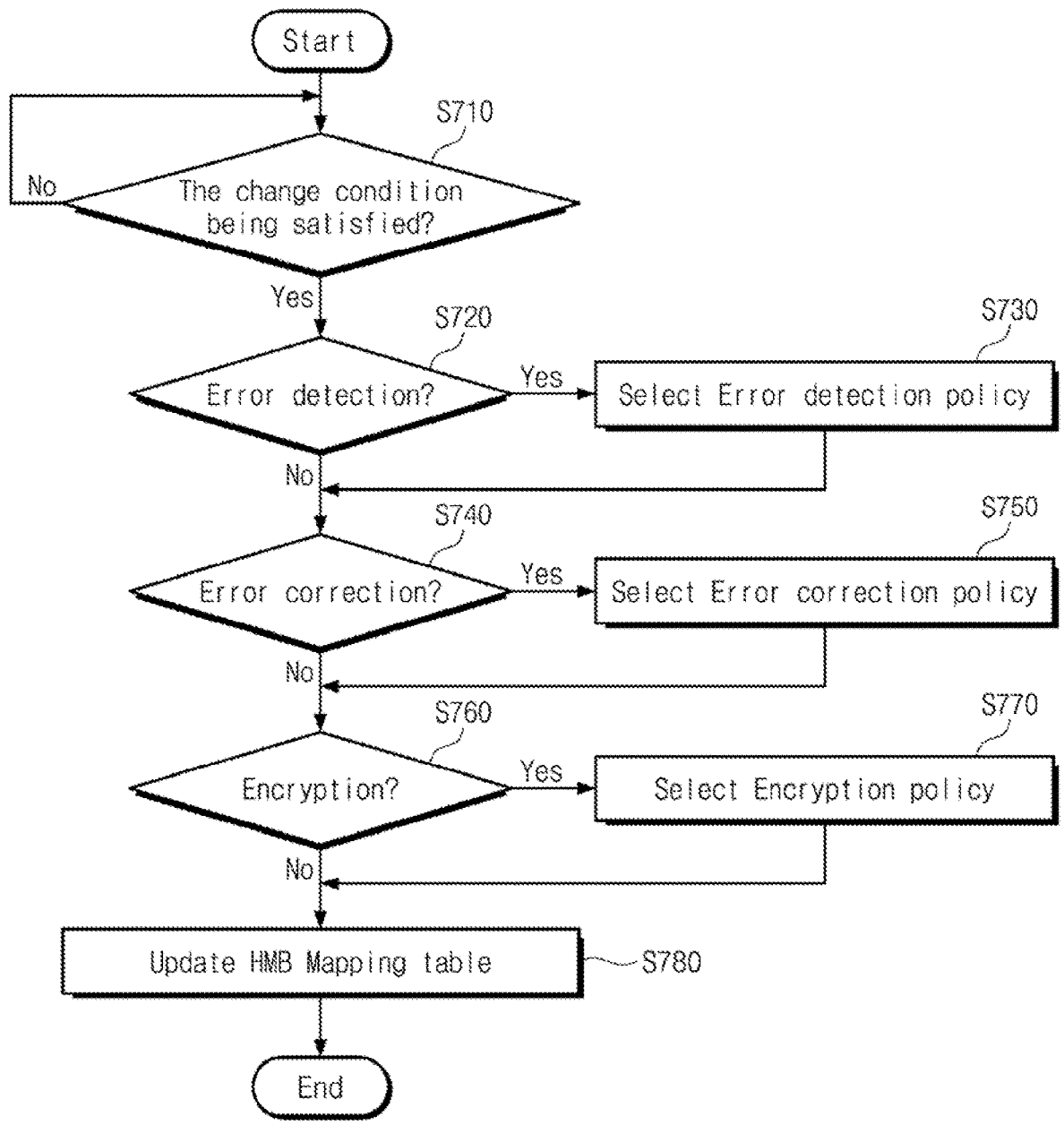
FIG. 22 is a flowchart illustrating an example of an operation method of an HMB controller of FIG. 19.

FIG. 22 is a flowchart illustrating an example of an operation method of an HMB controller of FIG. 19.

Referring to FIGS. 1, 19, and 22, in operation S710, the HMB controller 1180 may determine whether a change condition for a data processing policy is satisfied. When it is determined that the change condition is satisfied, the HMB controller 1180 performs operation S720; when it is determined that the change condition is not satisfied, the HMB controller 1180 again performs operation S710. Operation S710 is similar to operation S410 of FIG. 8, and thus, additional description will be omitted to avoid redundancy.

In operation S720, the HMB controller 1180 may determine whether to change an error detection policy of a specific region. For example, the HMB controller 1180 may determine whether to change an error detection policy based on information about the first region R1. The HMB manager 1181 may determine whether to change an error detection policy to be applied to data stored in the first region R1, with reference to allocation information, characteristic information, status information, or mapping information of the first region R1. When the error detection policy is determined as being changed, the HMB controller 1180 performs operation S730; when the error detection policy is determined as being not changed, the HMB controller 1180 performs operation S740.

In operation S730, the HMB controller 1180 may select an error detection policy for the specific region. For example, the HMB controller 1180 may select the fourth error detection policy EDP4 as the first type processing policy of the first region R1. Operation S730 is similar to operation S630 of FIG. 20, and thus, additional description will be omitted to avoid redundancy.

In operation S740, the HMB controller 1180 may determine whether to change an error correction policy of the specific region. For example, the HMB controller 1180 may determine whether to change an error correction policy based on the information about the first region R1. The HMB manager 1181 may determine whether to change an error correction policy to be applied to data stored in the first region R1, with reference to allocation information, characteristic information, status information, or mapping information of the first region R1. When the error correction policy is determined as being changed, the HMB controller 1180 performs operation S750; when the error correction policy is determined as being not changed, the HMB controller 1180 performs operation S760.

In operation S750, the storage device 1000 may select an error correction policy for the specific region. For example, the HMB controller 1180 may select the fourth error correction policy ECP4 as the second type processing policy of the first region R1. Operation S750 is similar to operation S650 of FIG. 20, and thus, additional description will be omitted to avoid redundancy.

In operation S760, the HMB controller 1180 may determine whether to change an encryption policy of the specific region. For example, the HMB controller 1180 may determine whether to change an encryption policy based on the information about the first region R1. The HMB manager 1181 may determine whether to change an encryption policy to be applied to data stored in the first region R1, with reference to the allocation information, the characteristic information, the status information, or the mapping information of the first region R1. When the encryption policy is determined as being changed, the HMB controller 1180 performs operation S770; when the encryption policy is determined as being not changed, the HMB controller 1180 performs operation S780.

In operation S770, the storage device 1000 may select an encryption policy for the specific region. For example, the HMB controller 1180 may select the fourth encryption policy ENP4 as the third type processing policy of the first region R1. Operation S770 is similar to operation S670 of FIG. 20, and thus, additional description will be omitted to avoid redundancy.

In operation S780, the storage device 1000 may update the HMB mapping table HMBMT. For example, the HMB controller 1180 may store the fourth error detection policy EDP4 as the first type processing policy of the first region R1, the fourth error correction policy ECP4 as the second type processing policy of the first region R1, and the fourth encryption policy ENP4 as the third type processing policy of the first region R1 in the HMB mapping table HMBMT.

Figure 23:
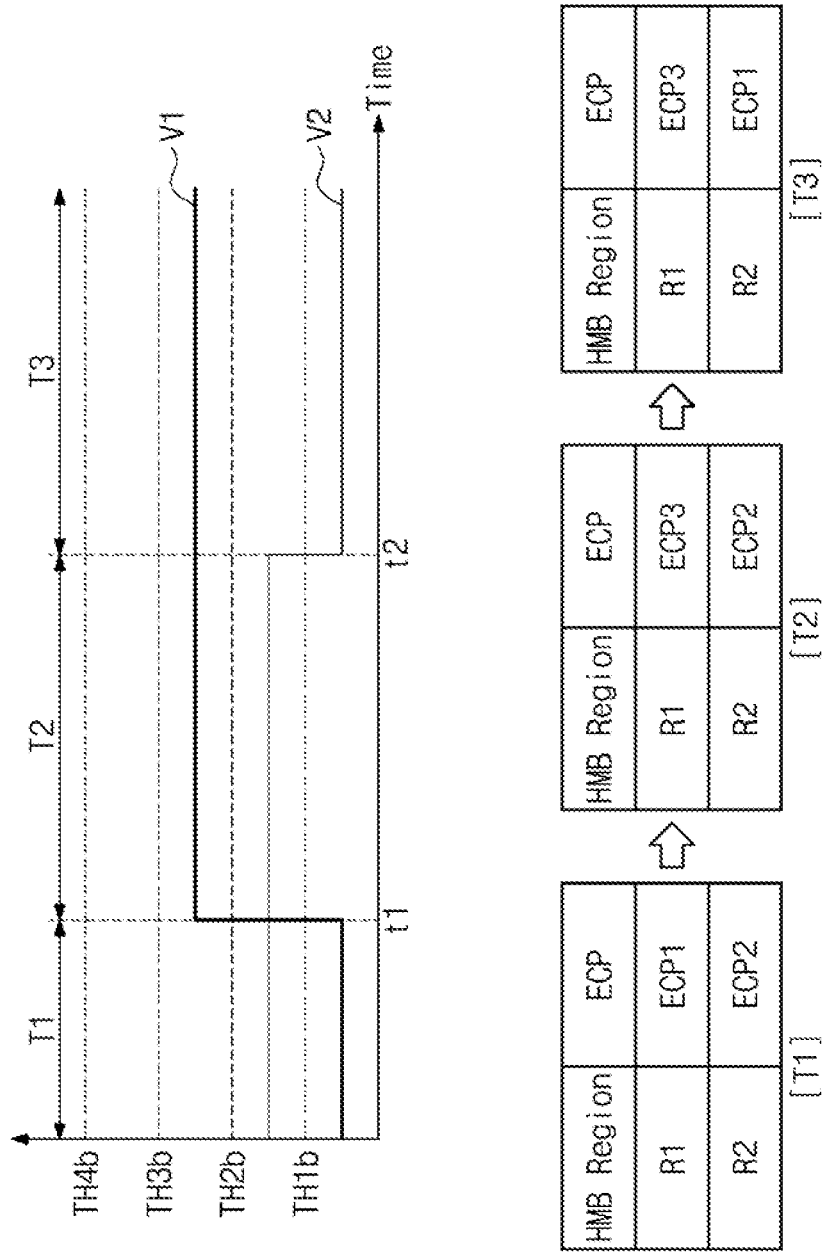
FIG. 23 is a diagram illustrating an operation of a storage device of FIG. 19.

FIG. 23 is a diagram illustrating an operation of a storage device of FIG. 19.

Below, the description will be given with reference to FIGS. 1, 19, and 23. For brevity of drawing and for convenience of description, only the second type processing policy associated with the first and second regions R1 and R2 of a plurality of regions is illustrated in FIG. 23. In the graph of FIG. 23, a horizontal axis represents a time, and a vertical axis represents a correction requirement value. In the graph of FIG. 23, a bold line V1 indicates a correction requirement value of the first region R1, and a solid line V2 indicates a correction requirement value of the second region R2.

In an example embodiment, the storage device 1000 may change a data processing policy to be applied to each of the plurality of regions over time. For example, as a change condition of a data processing policy of the first region R1 is satisfied at a first point in time t1, the storage device 1000 may change the second type processing policy of the first region R1. As a change condition of a data processing policy of the second region R2 is satisfied at a second point in time t2, the storage device 1000 may change the second type processing policy of the second region R2.

In a first time period T1, the correction requirement value of the first region R1 may be smaller than the first threshold value TH1b, and the correction requirement value of the second region R2 may be greater than the first threshold value TH1b and may be smaller than the second threshold value TH2b. In a second time period T2, the correction requirement value of the first region R1 may be greater than the second threshold value TH2b, and the correction requirement value of the second region R2 may be smaller than the second threshold value TH2b. In a third time period T3, the correction requirement value of the first region R1 may be greater than the second threshold value TH2b and may be smaller than the third threshold value TH3b, and the correction requirement value of the second region R2 may be smaller than the first threshold value TH1b.

In the first time period T1, the second type processing policy (e.g., error correction policy) of the first region R1 may be the first error correction policy ECP1, and the second type processing policy of the second region R2 may be the second error correction policy ECP2. In the second time period T2, the second type processing policy of the first region R1 may be the third error correction policy ECP3, and the second type processing policy of the second region R2 may be the second error correction policy ECP2. In the third time period T3, the second type processing policy of the first region R1 may be the third error correction policy ECP3, and the second type processing policy of the second region R2 may be the first error correction policy ECP1.

Figure 24:
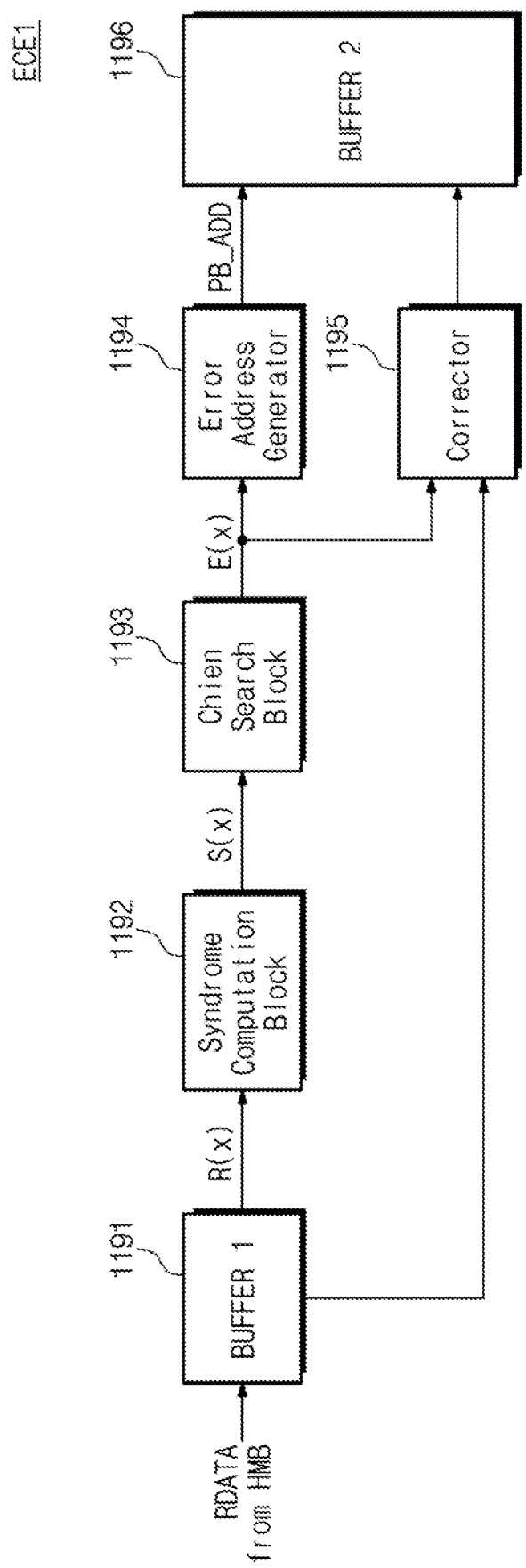
FIG. 24 is a block diagram illustrating an example of a first error correction engine of FIG. 19.

FIG. 24 is a block diagram illustrating an example of a first error correction engine of FIG. 19.

Referring to FIG. 24, the first error correction engine ECE1 may generate a syndrome from read data and may detect an error location by using the syndrome. Herein, the description will be given under assumption that a BCH code scheme is applied to the first error correction engine ECE1, but it may be well understood that various different error correction code schemes capable of detecting an error location may be applied. The first error correction engine ECE1 may include a first buffer 1191, a syndrome computation block 1192, a Chien search block 1193, an error address generator 1194, a corrector 1195, and a second buffer 1196.

The first buffer 1191 stores read data R(x) of a codeword unit transferred from the HMB 14. The read data R(x) stored in the first buffer 1191 may be provided to the syndrome computation block 1192.

The syndrome computation block 1192 receives the read data R(x) to compute a syndrome S(x). For example, the syndrome S(x) may be computed by multiplying a parity detection polynomial H(x) and the read data R(x) together. The parity detection polynomial H(x) may be generated by using a root of a generation polynomial G(x). Whether an error is present in the read data R(x) is detected through the syndrome S(x). The syndrome S(x) includes all error information of the read data R(x). Thus, the syndrome S(x) includes a location and a pattern of an error and a size of the error. Accordingly, the syndrome S(x) may be used to perform the following operations on the read data R(x): an operation of detecting an error bit, an operation of detecting whether an error is correctable, and an operation of correcting an error.

The Chien search block 1193 may generate an error correction vector E(x) by using the syndrome S(x). The syndrome S(x) computed by the syndrome computation block 1192 may be transferred to a key equation solver (KES) block (not illustrated). An error location polynomial σ(x) and an error pattern polynomial ω(x) may be generated from the syndrome S(x) by the KES block. The Chien search block 1193 computes a root of the error location polynomial. A size of an error corresponding to each of error locations found through the error location polynomial is computed. Upon obtaining error locations and error sizes of the read data R(x) through the Chien search algorithm, the Chien search block 1193 outputs the error correction vector E(x) for correcting the error. The error correction vector E(x) includes error location information in the transferred codeword.

The error address generator 1194 may generate address information of partial data to be overwritten on a page buffer by using the error correction vector E(x). The error address generator 1194 may generate a page buffer address PB_ADD corresponding to a location of the page buffer to be overwritten with corrected data.

The corrector 1195 corrects data in which an error exists, by using the error correction vector E(x). The corrector 1195 may correct an error included in the read data R(x) by performing an XOR operation on the read data R(x) stored in the first buffer 1191 and the error correction vector E(x) computed by the Chien search block 1193. The error-corrected data may be stored in the second buffer 1196.

Figure 25:
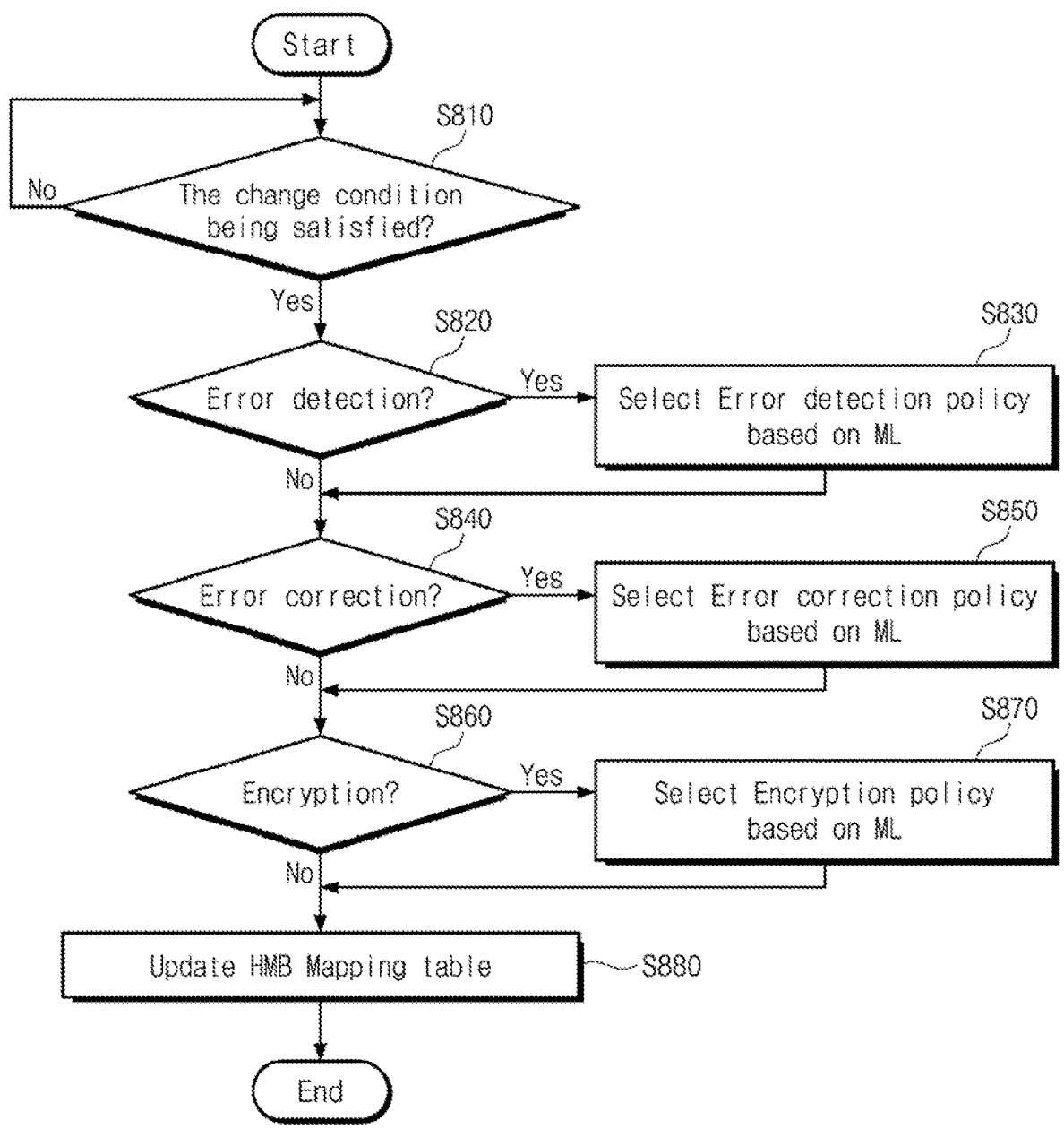
FIG. 25 is a flowchart illustrating an example of an operation of an HMB controller of FIG. 19.

FIG. 25 is a flowchart illustrating an example of an operation of an HMB controller of FIG. 19.

Referring to FIGS. 1, 19, and 25, operation S810, operation S820, operation S840, operation S860, and operation S880 may be performed to be the same as operation SS710, operation S720, operation S740, operation S760, and operation S780 of FIG. 22. Thus, additional description will be omitted to avoid redundancy.

In an example embodiment, the HMB controller 1180 may select a data processing policy for a specific region based on machine learning. For example, the HMB manager 1181 may be implemented with a machine learning accelerator configured to perform various machine learning. In another implementation, the HMB manager 1181 may be implemented in the form of software designed to perform various machine learning; in this case, the HMB manager 1181 may be driven by a processor or the CPU 1110.

In an example embodiment, the HMB controller 1180 may calculate a requirement value for a specific region based on a machine learning model. The machine learning model may be a model trained in advance through the machine learning. The machine learning may include one of various machine learning schemes such as a Siamese network, a deep neural network, a convolution neural network, and an auto-encoder. The HMB controller 1180 may select the best data processing policy for each of the plurality of regions by using the machine learning model.

In operation S830, the HMB controller 1180 may select an error detection policy for the specific region based on the machine learning. For example, machine learning logic may calculate a detection requirement value based on the information about the specific region. The HMB manager 1181 may select an error detection policy based on the detection requirement value calculated by the machine learning logic.

In operation S850, the HMB controller 1180 may select an error correction policy for the specific region based on the machine learning. For example, the machine learning logic may calculate a correction requirement value based on the information about the specific region. The HMB manager 1181 may select an error correction policy based on the correction requirement value calculated by the machine learning logic.

In operation S870, the HMB controller 1180 may select an encryption policy for the specific region based on the machine learning. For example, the machine learning logic may calculate an encryption requirement value based on the information about the specific region. The HMB manager 1181 may select an encryption policy based on the encryption requirement value calculated by the machine learning logic.

Figure 26:
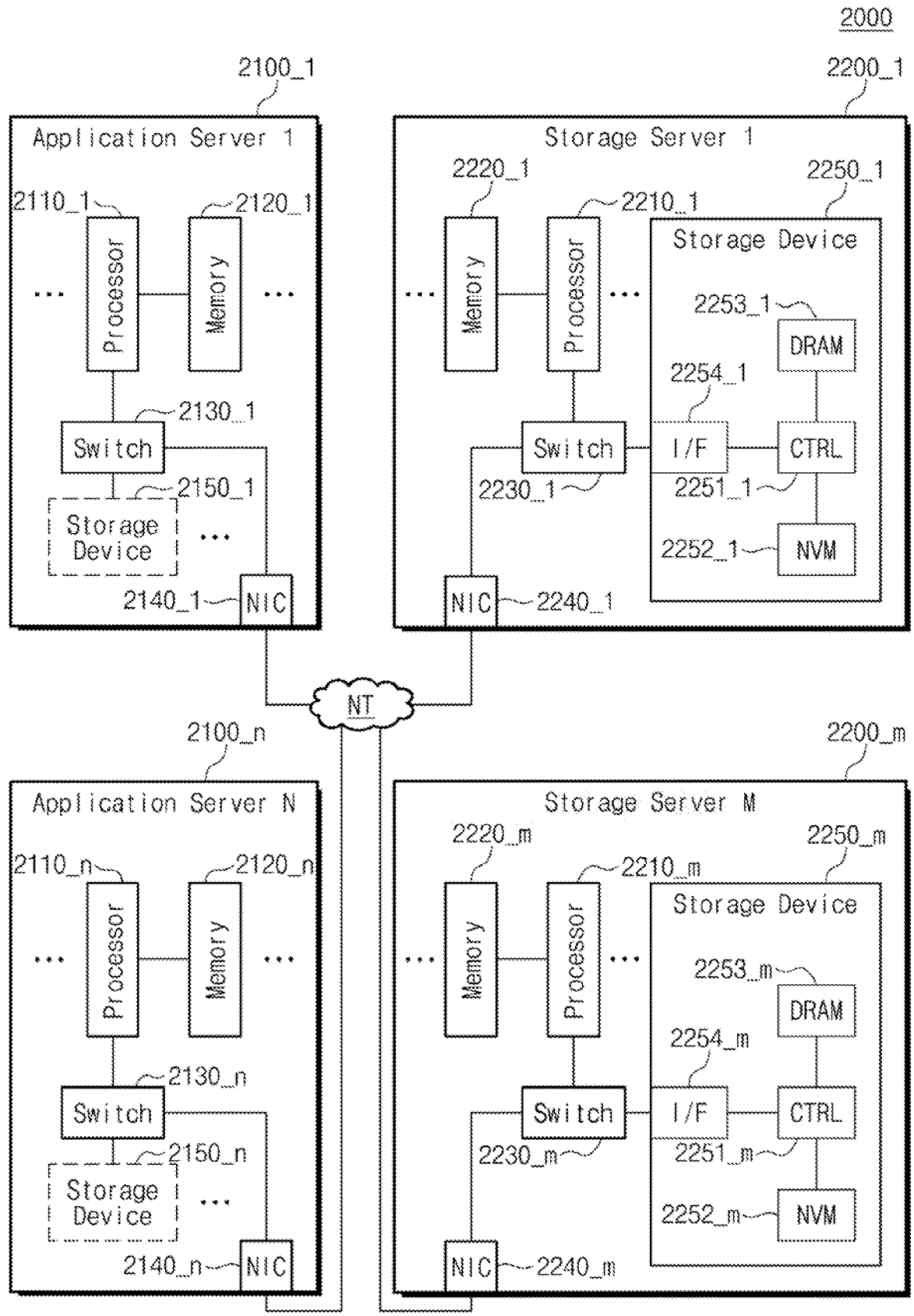
FIG. 26 is a block diagram illustrating an example of a data center to which a storage device according to an example embodiment is applied.

FIG. 26 is a diagram of a data center 2000 to which a memory device is applied, according to an example embodiment.

Referring to FIG. 26, the data center 2000 may be a facility that collects various types of pieces of data and provides services and be referred to as a data storage center.

The data center 2000 may be a system for operating a search engine and a database, and may be a computing system used by companies, such as banks, or government agencies.

The data center 2000 may include application servers 2100_1 to 2100_n and storage servers 2200_1 to 2200_m. The number of application servers 2100_1 to 2100_n and the number of storage servers 2200_1 to 2200_m may be variously selected according to embodiments. The number of application servers 2100_1 to 2100_n may be different from the number of storage servers 2200_1 to 2200_m.

Below, for convenience of description, an embodiment of the first storage server 2200_1 will be described. Each of the other storage servers 2200_2 to 2200_m and the plurality of application servers 2100_1 to 2100_n may have a similar configuration or structure of the first storage server 2200_1.

The storage server 2200_1 may include a processor 2210_1, a memory 2220_1, a network interface card (NIC) 2240_1, and a storage device 2250_1. The processor 2210_1 may control all operations of the storage server 2200_1, access the memory 2220_1, and execute instructions and/or data loaded in the memory 2220_1. The memory 2220_1 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM).

In some example embodiments, the numbers of processors 2210_1 and memories 2220_1 included in the storage server 2200_1 may be variously selected. In an example embodiment, the processor 2210_1 and the memory 2220_1 may provide a processor-memory pair. In an example embodiment, the number of processors 2210_1 may be different from the number of memories 2220_1. The processor 2210_1 may include a single-core processor or a multi-core processor.

The switch 2230_1 may selectively connect the processor 2210_1 to the storage device 2250_1 or selectively connect the NIC 2240_1 to the storage device 2250_1 via the control of the processor 2210_1.

The NIC 2240_1 may be configured to connect the first storage server 2200_1 with the network NT. In an example embodiment, the NIC 2240_1 may include a network interface card and a network adaptor. The NIC 2240_1 may be connected to the network NT by a wired interface, a wireless interface, a Bluetooth interface, or an optical interface. The NIC 2240_1 may include an internal memory, a digital signal processor (DSP), and a host bus interface and be connected to the processor 2210_1 and/or the switch 2230_1 through the host bus interface. The host bus interface may be implemented as one of the above-described examples of the interface 2254_1 such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface. In an example embodiment, the NIC 2240_1 may be integrated with at least one of the processor 2210_1, the switch 2230_1, or the storage device 2250_1.

The storage device 2250_1 may be store or read out data under the control of the processor 2210_1. The storage device 2250_1 may include a controller 2251_1, a nonvolatile memory 2252_1, DRAM 2253_1, and an interface 2254_1. In an example embodiment, the storage device 2250_1 may include a secure element (SE) for security or privacy.

The controller 2251_1 may control all operations of the storage device 2250_1. In an example embodiment, the controller 2251_1 may include SRAM. The controller 2251_1 may write data to the nonvolatile memory 2252_1 in response to a write command or read data from the nonvolatile memory 2252_1 in response to a read command. In an example embodiment, the controller 2251_1 may be configured to control the nonvolatile memory 2252_1 based on a Toggle interface or an ONFI interface.

The DRAM 2253_1 may temporarily store (or buffer) data to be written to the nonvolatile memory 2252_1 or data read from the nonvolatile memory 2252_1. Also, the DRAM 2253_1 may store data used for the controller 2251_1 to operate, such as metadata or mapping data. The interface 2254_1 may provide a physical connection between the processor 2210_1, the memory 2220_1, the network interface card (NIC) 2240_1, and the controller 2251_1. In an example embodiment, the interface 2254_1 may be implemented using a direct attached storage (DAS) scheme in which the storage device 2250_1 is directly connected with a dedicated cable. In an example embodiment, the interface 2254_1 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The above configuration of the storage server 2200_1 is merely an example. The above configuration of the storage server 2200_1 may be applied to each of other storage servers or the plurality of application servers. In an example embodiment, in each of the plurality of application servers 2100_1 to 2100_n, the storage device may be selectively omitted.

The application servers 2100_1 to 2100_n may communicate with the storage servers 2200_1 to 2200_m through a network NT. The network NT may be implemented by using a fiber channel (FC) or Ethernet. In this case, the FC may be a medium used for relatively high-speed data transmission and use an optical switch with high performance and high availability. The storage servers 2200_1 to 2200_m may be provided as file storages, block storages, or object storages according to an access method of the network NT.

In an example embodiment, the network NT may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network NT may be a general network, such as a TCP/IP network. For example, the network NT may be implemented according to a protocol, such as FC over Ethernet (FCoE), network attached storage (NAS), and NVMe over Fabrics (NVMe-oF).

In an example embodiment, at least one of the plurality of application servers 2100_1 to 2100_n may be configured to access to at least other one of the plurality of application servers 2100_1 to 2100_n or at least one of the plurality of storage servers 2200_1 to 2200_m.

For example, the application server 2100_1 may store data, which is requested by a user or a client to be stored, in one of the storage servers 2200_1 to 2200_m through the network NT. Also, the application server 2100_1 may obtain data, which is requested by the user or the client to be read, from one of the storage servers 2200_1 to 2200_m through the network NT. For example, the application server 2100_1 may be implemented as a web server or a database management system (DBMS).

The application server 2100_1 may access a memory 2120_n or a storage device 2150_n, which is included in another application server 2100_n, through the network NT. In another implementation, the application server 2100_1 may access memories 2220_1 to 2220_m or storage devices 2250_1 to 2250_m, which are included in the storage servers 2200_1 to 2200_m, through the network NT. Thus, the application server 2100_1 may perform various operations on data stored in application servers 2100_1 to 2100_n and/or the storage servers 2200_1 to 2200_m. For example, the application server 2100_1 may execute an instruction for moving or copying data between the application servers 2100_1 to 2100_n and/or the storage servers 2200_1 to 2200_m. In this case, the data may be moved from the storage devices 2250_1 to 2250_m of the storage servers 2200_1 to 2200_m to the memories 2120_1 to 2120_n of the application servers 2100_1 to 2100_n directly or through the memories 2220_1 to 2220_m of the storage servers 2200_1 to 2200_m. The data moved through the network NT may be data encrypted for security or privacy.

In an example embodiment, the storage servers 2200_1 to 2200_m or the storage devices 2150_1 to 2150_n and 2250_1 to 2250_m may include an HMB controller according to an example embodiment. Thus, at least one of the storage servers 2200_1 to 2200_m or the storage devices 2150_1 to 2150_n and 2250_1 to 2250_m may set a data processing policy to be applied to each region of a host buffer memory based on the methods described with reference to FIGS. 1 to 25, may perform an encoding/decoding operation based on the set data processing policy, and may change a data processing policy of each region when a change condition is satisfied.

In the above embodiments, components according to the present disclosure are described by using the terms "first," "second," "third," etc. However, the terms "first," "second," "third," etc., may be used to distinguish components from each other and do not limit the present disclosure. For example, the terms "first," "second," "third," etc., are not to be interpreted as necessarily requiring an order or a numerical meaning of any form.

In the above embodiments, components according to embodiments of the present disclosure may be referenced by using the term "unit," "module," "layer," or "block." The "unit," "module," "layer," or "block" may be implemented with various hardware devices, such as an integrated circuit, an application specific IC (ASCI), a field programmable gate array (FPGA), and a complex programmable logic device (CPLD), software, such as firmware and applications driven in hardware devices, or a combination of a hardware device and software. Also, the blocks may include circuits implemented with semiconductor elements in an integrated circuit, or circuits enrolled as an intellectual property (IP).

By way of summation and review, as various electronic devices are used by many people and a large amount of data are generated, a large amount of resources have been required to process and manage data in a storage device. For example, in the case where the amount of data increases, the amount of metadata associated with the data may also increase. In this case, a memory of a sufficient capacity may be required to buffer the data and the metadata. As another example, in the case where the amount of data increases, a processor of a high arithmetic capability may be required to process the data and a large amount of arithmetic operations. However, various issues, such as costs, a device size, and limit on design, may make it difficult to implement a storage device having sufficient resources. For this reason, it may be advantageous to use an existing resource for the purpose of providing sufficient resources for the storage device.

As described above, a storage device may manage a host memory buffer, may select a data processing policy for each of a plurality of regions of the host memory buffer, and may change a data processing policy based on a changed characteristic. Accordingly, a storage device, which has improved performance and manages a storage space efficiently, and an operation method thereof are provided.

As described above, embodiments may provide a storage device that efficiently manages a storage space with improved performance by selecting and changing a data processing policy for each of a plurality of regions of a host memory buffer, and an operation method thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An operation method of a storage device which includes a plurality of data processing engines, the method comprising:
    setting a first region, among a plurality of regions of a host memory buffer allocated from an external host, with a first data processing policy, and setting a second region among the plurality of regions with a second data processing policy;
    performing an encoding operation on data to be stored in the first region, based on a first data processing engine, corresponding to the first data processing policy, from among the plurality of data processing engines;
    performing an encoding operation on data to be stored in the second region, based on a second data processing engine, corresponding to the second data processing policy, from among the plurality of data processing engines; and
    changing the first data processing policy of the first region to a third data processing policy based on a changed characteristic of the first region.

2. The method as claimed in claim 1, further comprising, after changing the first data processing policy of the first region to the third data processing policy: performing an encoding operation on data stored in the first region, based on a third data processing engine, corresponding to the third data processing policy, from among the plurality of data processing engines.

3. The method as claimed in claim 1, wherein the setting of the first region with the first data processing policy and the second region with the second data processing policy includes:
    receiving host memory buffer allocation information from the external host;
    setting the first region with the first data processing policy based on information of the first region, and setting the second region with the second data processing policy based on information of the second region; and storing the first region and the first data processing policy in a host memory buffer mapping table, and storing the second region and the second data processing policy in the host memory buffer mapping table.

4. The method as claimed in claim 3, wherein:
the information of the first region includes characteristic information about a memory device corresponding to the first region, a type of data to be stored in the first region, a required reliability level of the first region, or a required security level of the first region, and
the information of the second region includes characteristic information about a memory device corresponding to the second region, a type of data to be stored in the second region, a required reliability level of the second region, or a required security level of the second region.

5. The method as claimed in claim 1, further comprising monitoring whether a change condition of a data processing policy associated with each of the plurality of regions is satisfied.

6. The method as claimed in claim 5, wherein the monitoring includes:
sending write data to at least one region of the plurality of regions for a first period of time;
starting a timer corresponding to the at least one region;
determining whether the timer expires; and
changing the data processing policy associated with the at least one region in response to the timer expiring.

7. The method as claimed in claim 5, wherein the monitoring includes:
monitoring an error rate associated with at least one region of the plurality of regions;
determining whether the error rate exceeds a reference error rate; and
changing the data processing policy associated with the at least one region in response to the error rate exceeding the reference error rate, wherein the error rate indicates an error ratio of data read from the at least one region.

8. The method as claimed in claim 5, wherein the monitoring includes:
receiving host memory buffer deallocation information from the external host;
re-allocating at least one region of the plurality of regions based on the deallocation information; and
changing the data processing policy associated with the at least one region.

9. The method as claimed in claim 5, wherein the monitoring includes:
receiving changed characteristic information about at least one region of the plurality of regions from the external host; and
changing the data processing policy associated with the at least one region.

10. The method as claimed in claim 1, wherein the first and second data processing policies include at least one of cyclic redundancy check (CRC), Hamming code, low density parity check (LDPC), Bose-Chaudhuri-Hocquenghem (BCH) code, Reed-Solomon (RS) code, Viterbi code, Turbo code, advanced encryption standard (AES), secure hash algorithm (SHA), Rivest Shamir Adleman (RSA), peripheral component interconnect express integrity and data encryption (PCIe IDE), or PCIe data object exchange (DOE).

11. The method as claimed in claim 1, wherein the setting of the first region with the first data processing policy and the second region with the second data processing policy includes:
setting a first type data processing policy of the first region to a first error detection policy;
setting a second type data processing policy of the first region to a first error correction policy;
setting a third type data processing policy of the first region to a first encryption policy;
setting a first type data processing policy of the second region to a second error detection policy;
setting a second type data processing policy of the second region to a second error correction policy; and
setting a third type data processing policy of the second region to a second encryption policy.

12. The method as claimed in claim 11, wherein the changing of the first data processing policy of the first region to the third data processing policy based on the changed characteristic of the first region includes:
changing the first type data processing policy of the first region to a third error detection policy;
changing the second type data processing policy of the first region to a third error correction policy; and
changing the third type data processing policy of the second region to a third encryption policy.

13. An operation method of a storage device which includes a plurality of data processing engines, the method comprising:
receiving host memory buffer allocation information from an external host that has a host memory buffer;
selecting a first type data processing policy of a first region among a plurality of regions of the host memory buffer based on the host memory buffer allocation information; selecting a second type data processing policy of the first region;
selecting a third type data processing policy of the first region;
sending, to the first region, encoded write data obtained by performing an encoding operation on write data based on; a first error detection engine corresponding to the first type data processing policy from among a plurality of data processing engines, a first error correction engine corresponding to the second type data processing policy from among the plurality of data processing engines, and a first encryption engine corresponding to the third type data processing policy from among the plurality of data processing engines;
performing a decoding operation on data read from the first region based on the first error detection engine, the first error correction engine, and the first encryption engine;
monitoring whether a data processing policy change condition of the first region is satisfied; and
changing the first to third type data processing policies of the first region in response to the data processing policy change condition being satisfied.

14. The method as claimed in claim 13, wherein:
the selecting of the first type data processing policy of the first region includes:
determining whether to apply the first type data processing policy of the first region; and
for a case in which the first type data processing policy of the first region is determined as being applied, selecting one of a plurality of error detection policies as the first type data processing policy of the first region,
the selecting of the second type data processing policy of the first region includes:
determining whether to apply the second type data processing policy of the first region; and
for a case in which the second type data processing policy of the first region is determined as being applied, selecting one of a plurality of error correction policies as the second type data processing policy of the first region, and the selecting of the third type data processing policy of the first region includes:
  determining whether to apply the third type data processing policy of the first region; and
  when for a case in which the third type data processing policy of the first region is determined as being applied, selecting one of a plurality of encryption policies as the third type data processing policy of the first region.

15. The method as claimed in claim 14, wherein:
  the selecting of one of a plurality of error detection policies as the first type data processing policy of the first region includes selecting one of cyclic redundancy check (CRC), Hamming code, low density parity check (LDPC), or Bose-Chaudhuri-Hocquenghem (BCH) code,
  the selecting of one of a plurality of error correction policies as the second type data processing policy of the first region includes selecting one of Hamming code, low density parity check (LDPC), Bose-Chaudhuri-Hocquenghem (BCH) code, Reed-Solomon (RS) code, Viterbi code, or Turbo code, and
  the selecting of one of a plurality of encryption policies as the third type data processing policy of the first region includes selecting one of advanced encryption standard (AES), secure hash algorithm (SHA), or Rivest Shamir Adleman (RSA).

16. The method as claimed in claim 14, wherein the selecting of the one of the plurality of error detection policies as the first type data processing policy of the first region includes:
  calculating a detection requirement value of the first region;
  comparing the detection requirement value with a first threshold value corresponding to a first error detection policy of a plurality of error detection policies;
  for a case in which the detection requirement value is smaller than the first threshold value, selecting the first error detection policy as the first type data processing policy of the first region;
  for a case in which the detection requirement value is greater than or equal to the first threshold value, comparing the detection requirement value with a second threshold value corresponding to a second error detection policy of the plurality of error detection policies;
  for a case in which the detection requirement value is smaller than the second threshold value, selecting the second error detection policy as the first type data processing policy of the first region;
  for a case in which the detection requirement value is greater than or equal to the second threshold value, comparing the detection requirement value with a third threshold value corresponding to a third error detection policy of the plurality of error detection policies;
  for a case in which the detection requirement value is smaller than the third threshold value, selecting the third error detection policy as the first type data processing policy of the first region; and
  for a case in which the detection requirement value is greater than or equal to the third threshold value, selecting a fourth error detection policy as the first type data processing policy of the first region.

17. The method as claimed in claim 13, wherein the monitoring whether the data processing policy change condition of the first region is satisfied includes:
  determining whether a timer corresponding to the first region expires; determining whether an error rate of the first region exceeds a reference error rate;
  receiving deallocation information from the external host; and
  receiving changed characteristic information of the first region from the external host.

18. The method as claimed in claim 13, wherein the changing of the first to third type data processing policies of the first region includes:
  determining whether to change the first type data processing policy of the first region;
  for a case in which the first type data processing policy of the first region is determined as being changed, selecting one of a plurality of error detection policies as the first type data processing policy of the first region;
  determining whether to change the second type data processing policy of the first region;
  for a case in which the second type data processing policy of the first region is determined as being changed, selecting one of a plurality of error correction policies as the second type data processing policy of the first region;
  determining whether to change the third type data processing policy of the first region; and
  for a case in which the third type data processing policy of the first region is determined as being changed, selecting one of a plurality of encryption policies as the third type data processing policy of the first region.

19. A storage device, comprising:
  a memory device; and
  a controller configured to store information about the memory device in an external host memory buffer and to manage the external host memory buffer, wherein:
  the controller includes a host memory buffer manager, a host memory buffer processing engine, and a status manager,
  the host memory buffer manager is configured to:
    select a data processing policy for at least one region among a plurality of regions of the external host memory buffer;
    manage the at least one region and a corresponding data processing policy in a host memory buffer mapping table; and
    change the data processing policy for the at least one region in response to a change signal of the status manager;
  the host memory buffer processing engine includes a plurality of data processing engines, and is configured to:
    select at least one data processing engine of the plurality of data processing engines based on the host memory buffer mapping table;
    perform an encoding operation on data based on the at least one data processing engine to generate encoded data;
    send the encoded data to the external host memory buffer; and
    perform a decoding operation on data read from the external host memory buffer based on the at least one data processing engine, and the status manager is configured to:
monitor whether a change condition of the data processing policy for the at least one region is satisfied; and
output the change signal to the host memory buffer manager in response to the change condition being satisfied.

20. The storage device as claimed in claim 19, wherein the change condition is satisfied when a timer corresponding to the at least one region expires, when an error rate of the at least one region exceeds a reference error rate, when deallocation information is received from an external host, or when changed characteristic information of the at least one region is received from the external host.

\* \* \* \* \*